INVENTORS
HERBERT J. GREENBERG
ALAN G. KONHEIM
BY Francis J. Thomas
ATTORNEY

FLIP-FLOP

"AND" GATE

"OR" GATE

INVERTER

AMPLIFIER

DELAY CIRCUIT

SINGLE-SHOT MULTIVIBRATOR

RING COUNTER

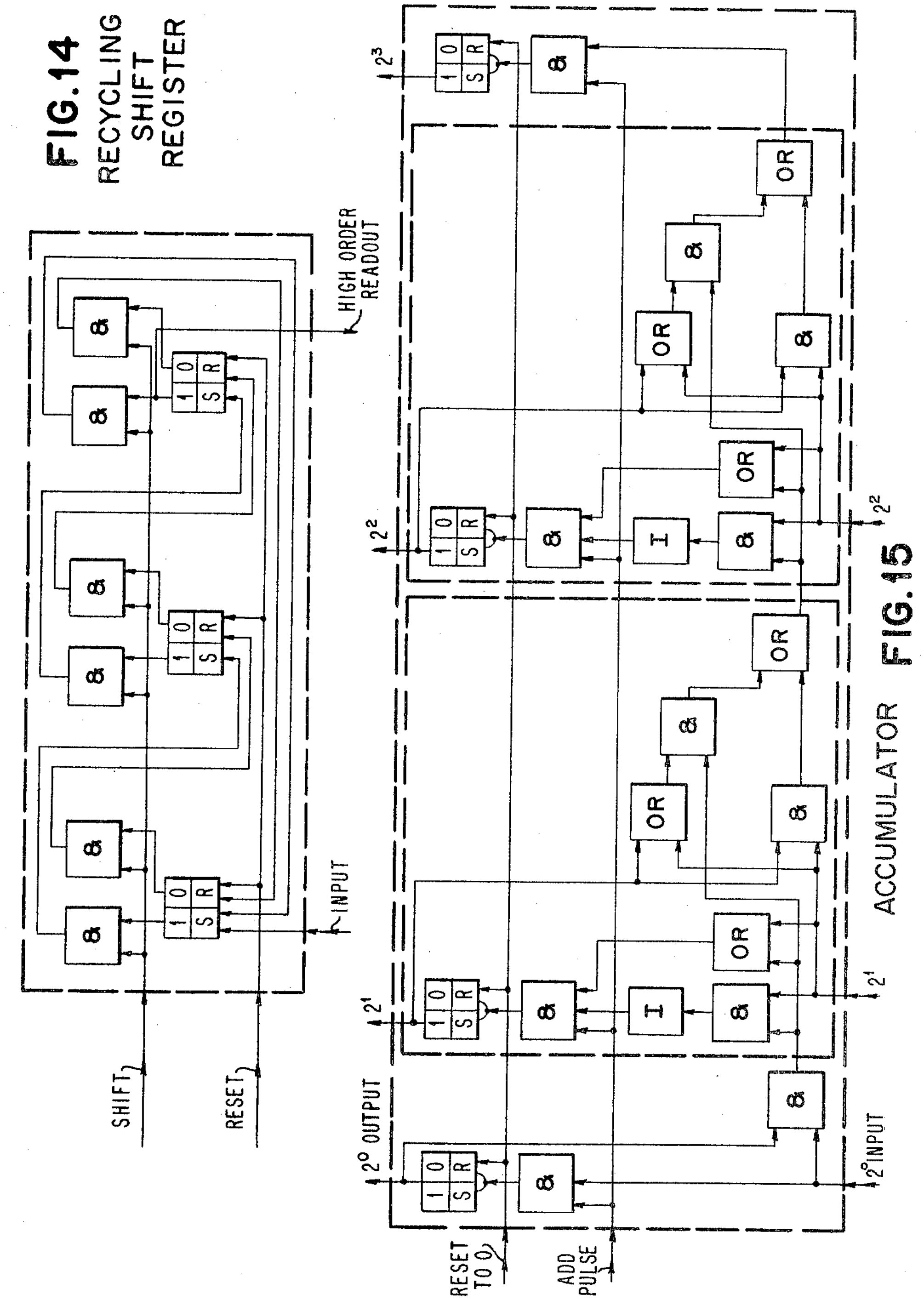
FIG.14 RECYCLING SHIFT REGISTER, FIG.15 ACCUMULATOR

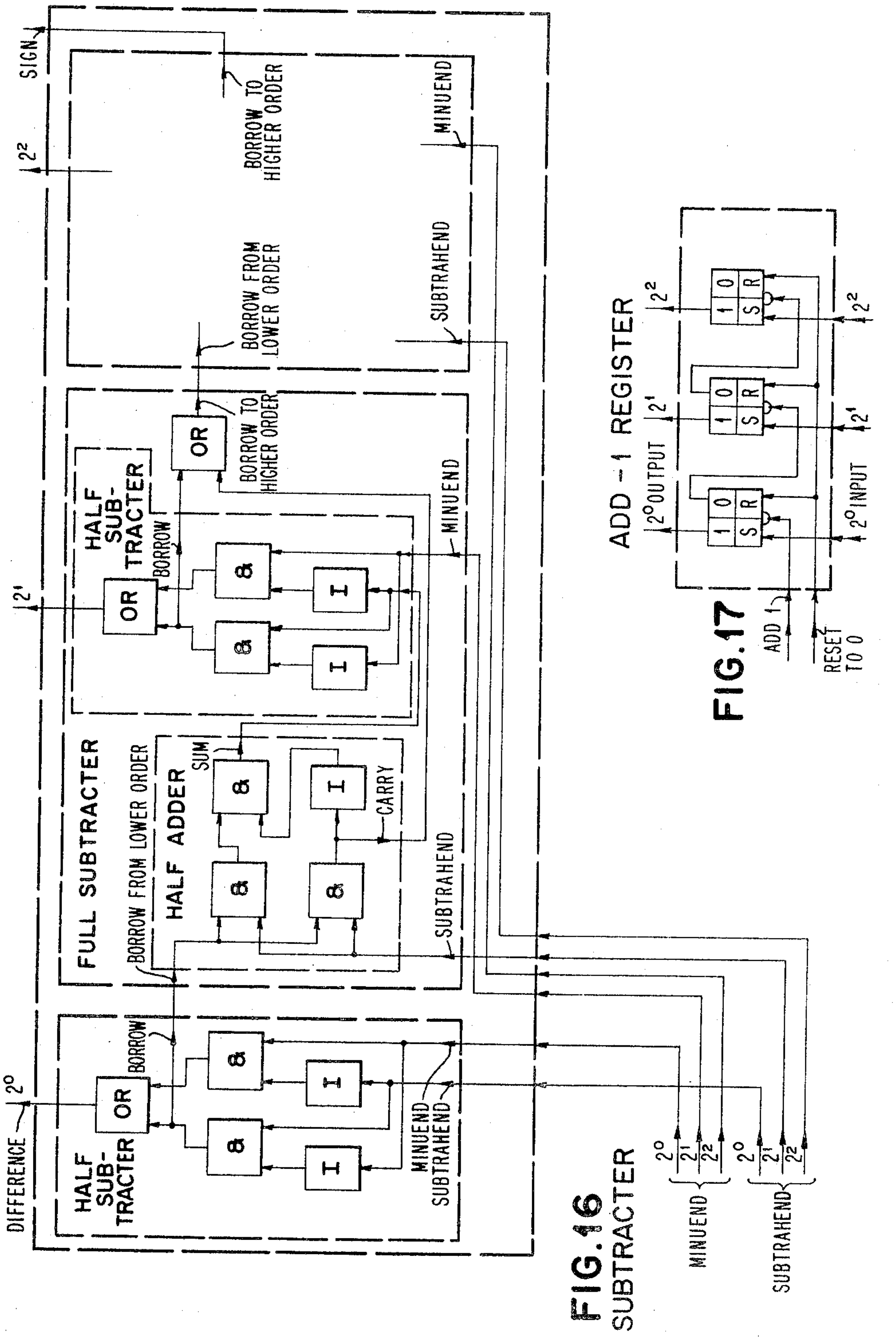
FIG. 16 SUBTRACTER, FIG. 17

FIG. 27

PATTERN | AUTO-CORRELATION FUNCTION | LINEAR FUNCTIONAL MASK

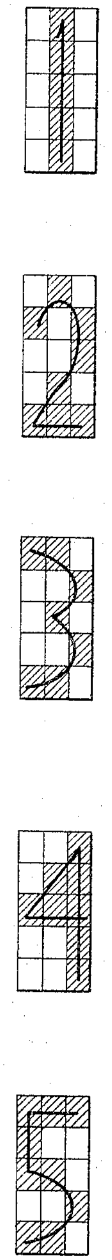

Pattern 1 — Auto-correlation function

| | | | | |
|---|---|---|---|---|
| | | 5 | 0 | 0 |
| 0 | 0 | 4 | 0 | 0 |
| 0 | 0 | 3 | 0 | 0 |
| 0 | 0 | 2 | 0 | 0 |
| 0 | 0 | 1 | 0 | 0 |

Pattern 1 — Linear functional mask

| | | | | |
|---|---|---|---|---|
| | | -4 | -12 | -6 |
| -3 | -14 | 14 | -10 | -5 |
| -4 | -7 | 10 | -9 | -2 |
| -3 | -3 | 4 | -5 | -3 |
| 0 | -3 | 1 | -3 | 0 |

Pattern 2 — Auto-correlation function

| | | | | |
|---|---|---|---|---|
| | | 8 | 2 | 2 |
| 0 | 3 | 2 | 2 | 1 |
| 1 | 2 | 1 | 2 | 0 |
| 1 | 1 | 3 | 1 | 1 |
| 0 | 1 | 1 | 1 | 0 |

Pattern 2 — Linear functional mask

| | | | | |
|---|---|---|---|---|
| | | -3 | -9 | 17 |
| -15 | 2 | -15 | 0 | -4 |
| 6 | 7 | -29 | 2 | -9 |
| 5 | 5 | 25 | 0 | 9 |
| -4 | 5 | -7 | 9 | 0 |

Pattern 3 — Auto-correlation function

| | | | | |
|---|---|---|---|---|
| | | 7 | 2 | 0 |
| 1 | 2 | 0 | 2 | 1 |
| 0 | 1 | 3 | 1 | 0 |
| 1 | 1 | 0 | 1 | 1 |
| 0 | 1 | 2 | 1 | 0 |

Pattern 3 — Linear functional mask

| | | | | |
|---|---|---|---|---|
| | | 4 | -5 | -10 |
| 1 | 3 | -32 | 7 | 3 |
| -8 | -7 | 5 | -5 | -7 |
| 11 | 9 | -20 | -1 | 7 |
| -4 | 2 | 10 | 6 | 0 |

Pattern 4 — Auto-correlation function

| | | | | |
|---|---|---|---|---|
| | | 8 | 3 | 1 |
| 1 | 3 | 5 | 2 | 1 |
| 1 | 1 | 3 | 2 | 1 |
| 0 | 0 | 2 | 1 | 0 |
| 0 | 0 | 1 | 0 | 0 |

Pattern 4 — Linear functional mask

| | | | | |
|---|---|---|---|---|
| | | -18 | 31 | -23 |
| 2 | 35 | 23 | 19 | -24 |
| 15 | -41 | -13 | -0 | -3 |
| -21 | -21 | -6 | 11 | -22 |
| -23 | -27 | -8 | -13 | -9 |

Pattern 5 — Auto-correlation function

| | | | | |
|---|---|---|---|---|
| | | 9 | 4 | 1 |
| 2 | 2 | 2 | 2 | 1 |
| 1 | 3 | 4 | 2 | 1 |
| 0 | 0 | 2 | 2 | 1 |
| 1 | 2 | 2 | 1 | 0 |

Pattern 5 — Linear functional mask

| | | | | |
|---|---|---|---|---|
| | | -18 | 22 | -13 |
| 20 | -25 | -23 | -10 | -17 |
| 11 | 17 | 16 | -2 | 9 |
| -24 | -34 | 9 | 16 | 5 |
| 12 | 17 | 2 | 1 | -4 |

FIG. 28
PATTERN | AUTO-CORRELATION FUNCTION | LINEAR FUNCTIONAL MASK
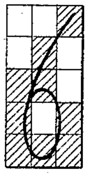
| | | | | |
|---|---|---|---|---|
| | | 9 | 3 | 2 |
| 1 | 4 | 4 | 2 | 2 |
| 1 | 3 | 2 | 3 | 1 |
| 1 | 1 | 2 | 1 | 0 |
| 1 | 1 | 1 | 0 | 0 |
| | | | | |
|---|---|---|---|---|
| | | -23 | 14 | -13 |
| 3 | 40 | 1 | -10 | 6 |
| 5 | 19 | -22 | 23 | 6 |
| 12 | -16 | -6 | -12 | -26 |
| 26 | 3 | -11 | -30 | -7 |
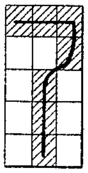
| | | | | |
|---|---|---|---|---|
| | | 7 | 2 | 1 |
| 0 | 1 | 3 | 1 | 1 |
| 0 | 2 | 2 | 1 | 0 |
| 0 | 2 | 1 | 1 | 0 |
| 0 | 1 | 1 | 1 | 0 |
| | | | | |
|---|---|---|---|---|
| | | -1 | 24 | -14 |
| -24 | -20 | -0 | -16 | -0 |
| -14 | 24 | -15 | -4 | -10 |
| -16 | 28 | -18 | -0 | -16 |
| -4 | 12 | -11 | 12 | -4 |
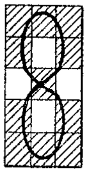
| | | | | |
|---|---|---|---|---|
| | | 11 | 4 | 4 |
| 2 | 4 | 4 | 4 | 2 |
| 1 | 2 | 4 | 2 | 1 |
| 2 | 2 | 4 | 2 | 2 |
| 1 | 2 | 3 | 2 | 1 |
| | | | | |
|---|---|---|---|---|
| | | -28 | 10 | 16 |
| 10 | 7 | -12 | 11 | -8 |
| -4 | -12 | 1 | -19 | -7 |
| 19 | 13 | 19 | 6 | 5 |
| 17 | 19 | 21 | 12 | 10 |
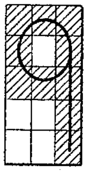
| | | | | |
|---|---|---|---|---|
| | | 10 | 4 | 3 |
| 2 | 2 | 6 | 3 | 3 |
| 1 | 2 | 5 | 3 | 3 |
| 0 | 0 | 2 | 1 | 2 |
| 0 | 0 | 1 | 1 | 1 |
| | | | | |
|---|---|---|---|---|
| | | -27 | 31 | 7 |
| 3 | -11 | 1 | 7 | 15 |
| -1 | -2 | 10 | 9 | 27 |
| -4 | -20 | -0 | -12 | 21 |
| -1 | -6 | -12 | 8 | 13 |
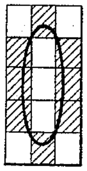
| | | | | |
|---|---|---|---|---|
| | | 8 | 0 | 3 |
| 2 | 2 | 4 | 2 | 2 |
| 1 | 2 | 2 | 2 | 1 |
| 0 | 2 | 0 | 2 | 0 |
| 0 | 0 | 1 | 0 | 0 |
| | | | | |
|---|---|---|---|---|
| | | -10 | -19 | 17 |
| 15 | -2 | 2 | 3 | 9 |
| 4 | 5 | -12 | 4 | 6 |
| -7 | 13 | -26 | 12 | -8 |
| -1 | -7 | -5 | -7 | -1 |

COMPARISON
PRODUCTS BETWEEN CLASSES

REFERENCE PATTERN

| INPUT PATTERN | 1 | 2 | 3 | 4 | 5 | 6 | 7 | 8 | 9 | 0 |
|---|---|---|---|---|---|---|---|---|---|---|
| 1 | 75 | -119 | -123 | -57 | -114 | -200 | -97 | -126 | -113 | -135 |
| 2 | -140 | 60 | -79 | -162 | -217 | -105 | -114 | -74 | -144 | -148 |
| 3 | -112 | -113 | 99 | -167 | -101 | -179 | -82 | -50 | -117 | -123 |
| 4 | -71 | -158 | -174 | 85 | -181 | -66 | -166 | -186 | -64 | -144 |
| 5 | -138 | -140 | -68 | -208 | 57 | -146 | -109 | -89 | -51 | -187 |
| 6 | -156 | -75 | -148 | -129 | -244 | 51 | -122 | -163 | -117 | -108 |
| 7 | -60 | -69 | -69 | -181 | -175 | -178 | 56 | -124 | -143 | -92 |
| 8 | -191 | -51 | -101 | -290 | -262 | -276 | -280 | 69 | -91 | -207 |
| 9 | -107 | -219 | -208 | -144 | -171 | -237 | -246 | -225 | 123 | -136 |
| 0 | -91 | -107 | -101 | -181 | -291 | -157 | -139 | -196 | -179 | 78 |

FIG. 29

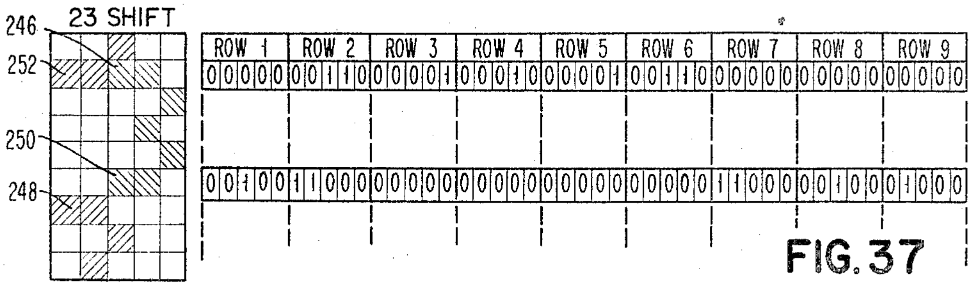
FIG. 37
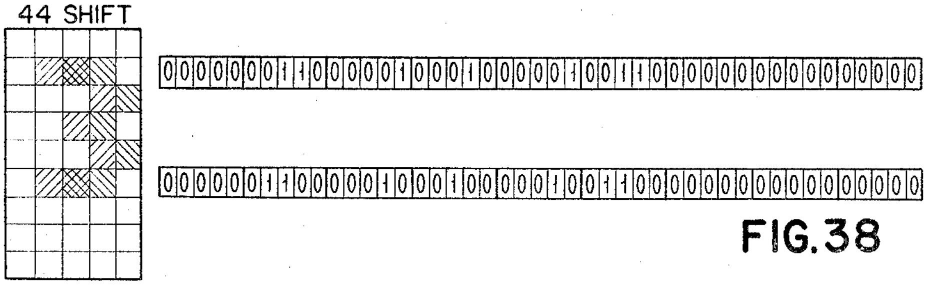
FIG. 38
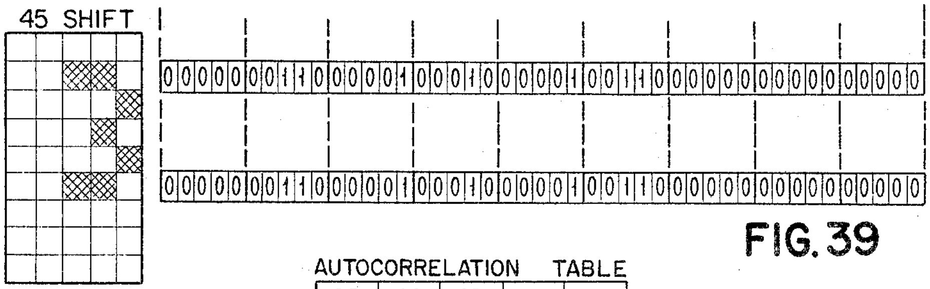
FIG. 39
AUTOCORRELATION TABLE
| | | | | |
|---|---|---|---|---|
| 23: 0 | 24: 1 | 25: 2 | 26: 1 | 27: 0 |
| 28: 1 | 29: 1 | 30: 0 | 31: 1 | 32: 1 |
| 33: 0 | 34: 1 | 35: 3 | 36: 1 | 37: 0 |
| 38: 1 | 39: 2 | 40: 0 | 41: 2 | 42: 1 |
| 43: 0 | 44: 2 | 0: 7 | 1: 2 | 2: 0 |
| 3: 1 | 4: 2 | 5: 0 | 6: 2 | 7: 1 |
| 8: 0 | 9: 1 | 10: 3 | 11: 1 | 12: 0 |
| 13: 1 | 14: 1 | 15: 0 | 16: 1 | 17: 1 |
| 18: 0 | 19: 1 | 20: 2 | 21: 1 | 22: 0 |
FIG. 40

Aug. 16, 1966 H. J. GREENBERG ET AL 3,267,431

ADAPTIVE COMPUTING SYSTEM CAPABLE OF BEING TRAINED TO RECOGNIZE PATTERNS

Filed April 29, 1963

37 Sheets-Sheet 29

DECIMAL TO BINARY CODING MATRIX

United States Patent Office 3,267,431

Patented August 16, 1966

3,267,431

ADAPTIVE COMPUTING SYSTEM CAPABLE OF BEING TRAINED TO RECOGNIZE PATTERNS

Herbert J. Greenberg, Scarsdale, and Alan G. Konheim, Yorktown Heights, N.Y., assignors to International Business Machines Corporation, New York, N.Y., a corporation of New York Filed Apr. 29, 1963, Ser. No. 276,612
114 Claims. (Cl. 340—146.3)

This invention relates to adaptive computing techniques and, in particular, to techniques wherein a recognition system is "trained" on sample patterns and, after sufficient training, is capable of identifying specimen patterns that are generally similar to the sample patterns.

The perceptron is one example of an adaptive computer and is described in a report entitled "The Perceptron—A Theory of Statistical Separability in Cognitive Systems, United States Department of Commerce, Office of Technical Service, Report No. PB 151,247, January 1958. Perceptrons and similar devices are generally comprised of weighted correlation networks operating on random functions of input data. During a "training" mode of operation, sample patterns are applied and the weights are adjusted to give correct recognition of the sample patterns. After training, the system is used in an "operating" mode and recognition of specimen patterns is attempted. In these systems, there are generally a large number of random networks (neurons) operating on the input data before correlation. The number of networks is very much larger than the number of input data elements according to the teaching in a chapter entitled Analytic Approximation and Translational Invariance in Character Recognition, which appears at pages 181–195 of a book entitled Optical Character Recognition, published by Spartan Books, Washington, D.C. in 1962. The adaptive computer that is the subject of the present invention provides highly stable specimen identification without requiring any random networks.

Another example of an adaptive computer is described by Bernard Widrow in a text entitled Self-Organizing Systems, 1962, at pages 435–461, published by Spartan Books, Washington, D.C. A recognition criteria is described which uses a nonlinear comparison to adaptively stored reference functions. In the present invention, recognition is based in a linear comparison technique which has the advantages of enhanced recognition with a reduced amount of apparatus.

In addition, the present invention provides automatic adaptation during a training mode of operation, wherein the system storage is automatically corrected if recognition of sample patterns does not exceed predetermined levels of discrimination.

To further enhance recognition, the input patterns are operated on by precisely-definable, systematic, nonrandom functions, such as autocorrelation functions which provide registration invariance. Autocorrelation functions have been used in adaptive recognition systems as shown and described in copending commonly assigned applications Serial Number 166,180, now Patent No. 3,191,149, filed January 15, 1962, entitled "Specimen Identification Apparatus and Method" and Serial Number 166,211, now Patent No. 3,191,150, filed January 15, 1962 entitled "Specimen Identification Apparatus and Method." The present invention employs autocorrelation functions in a system that has a separate training mode of operation during which sample input patterns are used to establish the reference function storage.

In another embodiment the input patterns and functions of the input patterns are linearly compared to a number of adaptively-stored reference functions, where the number of functions is significantly smaller than the number of reference patterns, and the result of the comparisons is decoded to provide an indication of the reference pattern which is similar to the specimen.

In both embodiments of the invention, when in the training mode, the results of the linear comparisons of the sample patterns with the reference functions are compared to predetermined thresholds. The reference functions that correspond to the correct identity of the sample patterns are altered if the comparison discrimination does not exceed a predetermined positive threshold. Similarly the noncorresponding reference functions are altered if their comparisons do not provide a discrimination below a negative threshold. After several cycles of alteration, the stored references are adapted to the sample patterns and are thereafter used to identify unknown specimen input patterns. The adaptive system is trained not only to properly identify input patterns, but to identify them with a reliable degree of discrimination.

Among the features of the present invention are those summarized as follows:

An object of the present invention is to show adaptive computing techniques for specimen identification systems where precisely-definable, systematic, nonrandom functions of input patterns are linearly compared to adaptively-stored reference functions to effect identification.

A further object of the present invention is to show adaptive computing techniques for specimen identification wherein, in a training mode of operation, precisely-definable, systematic, nonrandom functions of sample patterns are linearly compared to adaptively-stored reference functions, where the reference storage is altered when the comparison indicates insufficient discrimination; and wherein, in an operating mode of operation, precisely-definable, systematic, nonrandom functions of the specimen patterns to be identified are linearly compared to the altered reference storage to effect identification.

A further object of the present invention is to show adaptive computing techniques for specimen identification wherein, in a training mode of operation, precisely-definable, systematic, nonrandom functions of sample patterns are linearly compared to adaptively-stored reference functions and where the reference storage is altered when the comparison with a corresponding reference function provides a discrimination below a predetermined level or when comparison with a noncorresponding reference function provides a discrimination above another predetermined level.

An object of the present invention is to show adaptive computing techniques for specimen identification systems where functions of autocorrelation functions of input patterns are linearly compared to adaptively stored reference functions to effect identification.

A further object of the present invention is to show adaptive computing techniques for specimen identification wherein, in a training mode of operation, functions of autocorrelation functions of sample patterns are linearly compared to adaptively-stored reference functions, where the reference storage is altered when the comparison with a corresponding reference function provides a discrimination below a predetermined level or when comparison with a noncorresponding reference function provides a discrimination above another predetermined level.

A further object of the present invention is to show adaptive computing techniques for specimen identification wherein specimens or precisely-definable, systematic, nonrandom functions of specimens, including autocorrelation function of specimens, are linearly compared to a number of adaptively-stored reference functions where the number of adaptively-stored functions is significantly smaller than the number of reference patterns, and wherein the result of the comparisons is decoded to effect identification.

A further object of the present invention is to show adaptive computing techniques for specimen identification systems wherein, in a training mode of operation, sample patterns or precisely-definable, systematic, nonrandom functions of sample patterns, including autocorrelation functions of sample patterns, are linearly compared to adaptively-stored reference functions that are less in number than the number of reference patterns, where the reference storage is altered when the patterns indicate insufficient discrimination; and wherein, in an operating mode, the sample patterns are replaced by specimen patterns which are compared to the altered reference functions and the results of the comparisons are decoded to provide indications of the reference patterns which are similar to the specimen patterns.

A further object of the present invention is to show adaptive computing techniques for specimen identification systems wherein, in a training mode of operation, sample patterns or precisely-definable, systematic, nonrandom functions of sample patterns, including autocorrelation functions of sample patterns, are linearly compared to adaptively-stored reference functions that are lesser in number than the number of reference patterns, where the reference storage is altered when the comparisons with one or more preselected reference functions provides discrimination that is below a predetermined level or when the comparisons with one or more nonselected functions provide discrimination above another predetermined level; and wherein, in an operating mode of operation, the sample patterns are replaced by specimen patterns which are compared to the altered reference functions and the results of the comparisons are decoded to provide indications of the reference patterns which are similar to the specimen patterns.

The foregoing and other objects, features and advantages of the invention will be apparent from the following more particular description of the invention.

In accordance with a preferred embodiment of the invention, an adaptive recognition system employs two modes of operation: a training mode and an operating mode. In the training mode of operation, sample patterns that are typical of the specimen patterns to be subsequently identified in the operating mode, are applied as the input to the system. The sample patterns are operated on by a precisely-definable, systematic, nonrandom function. Such a function of the input pattern includes the input pattern itself and any transformation which may be prescribed mathematically. The generated function of the input pattern is applied to a group of channels, one for each reference pattern. The function of the sample pattern is compared to a stored reference function in each channel and the results are compared to thresholds. The reference pattern that corresponds to the sample pattern should provide a comparison which exceeds a predetermined threshold which indicates that the positive discrimination (acceptance) of the corresponding channel exceeds a predetermined level. If the threshold is not exceeded, the function of the sample pattern is added to the corresponding stored reference patterns in that channel. When the sample pattern is compared to the reference patterns in the noncorresponding channels, the results should be lower than another predetermined threshold indicating a strong negative discrimination (rejection) by the noncorresponding reference patterns. If this criteria is met, the function of the sample pattern is subtracted from the reference functions in the channels which do not satisfy the criteria. After the system is trained on several sample patterns and the process of addition and substraction is iterated several times, the system "converges," that is, all sample patterns provide comparisons with corresponding reference functions which exceed the first threshold and with noncorresponding reference functions which are below the second threshold.

The operation of the system during the training mode of operation is outlined theoretically as follows. Each sample input pattern (character) is represented by a sequence of $n$ numerical-valued measurements $u_1, u_2, \ldots, u_n$. Hereafter each input pattern (character) is associated with its vector $\underline{u}=(u_1, u_2, \ldots, u_n)$, where $u_i$ (the $i^{th}$ measurement) is 1 when a black area is present in position $i$, and is 0 when a white area is present in position $i$.

The input patterns are to be partitioned (classified) into M distinct (nonoverlapping) classes corresponding to reference patterns $R_1, R_2, \ldots, R_M$. The procedure for recognizing the input patterns accomplishes this classification by finding M separating hyperplanes where the $i^{th}$ hyperplane separates input patterns in class $R_i$ from those in remaining classes $R_1, R_2, \ldots, R_{i-1}, R_{i+1}, \ldots, R_M$.

The following definitions are valid for vectors $\underline{u}$ and $\underline{v}$ in an $n$-dimensional $R^n$: vector space $$\begin{aligned}\underline{u}&=(u_1, u_2, \ldots, u_n)\\ \underline{v}&=(v_1, v_2, \ldots, v_n)\end{aligned} \qquad (1)$$

with real components (i.e. $u_i$ and $v_i$ are real numbers where $1 \leq i \leq n$).

Vector Addition:

$$\underline{u}+\underline{v}=(u_1+v_1, u_2+v_2, \ldots, u_n+v_n) \qquad (2)$$

Scalar Multiplication:

$$\lambda\underline{u}=(\lambda u_1, \lambda u_2, \ldots, \lambda u_n), \text{ where } \lambda \text{ is a real number} \qquad (3)$$

Scalar Product:

$$(\underline{u}, \underline{v})=u_1v_1+u_2v_2+ \ldots +u_nv_n \qquad (4)$$

Distance:

$$\text{Distance from } \underline{u} \text{ to } \underline{v}=d(\underline{u}, \underline{v})=\{(u_1-v_1)^2+(u_2-v_2)^2+ \ldots +(u_n-v_n)^2\}^{1/2} \qquad (5)$$

Length:

$$\text{Length of } \underline{u}=\|\underline{u}\|=d(\underline{u}, \underline{0}) \text{ where } \underline{0}=(0, 0, 0, \ldots, 0). \qquad (6)$$

and this family of vectors forms the $n$-dimensional vector space denoted by $R^n$.

In addition, a set K of points (end-points of vectors) in $R^n$ is called convex if $\underline{u}$ and $\underline{v}$ in K imply $\lambda\underline{x}+(1-\lambda)\underline{y}$ is in K for every real number $\lambda$ satisfying $0 \leq \lambda \leq 1$. Geometrically this requires that if $\underline{u}$ and $\underline{v}$ are in K then the line segment joining these points lies also in K. If A is a set of points in $R^n$, these is a (unique) smallest convex set containing A; this set, called the convex hull of A, will be denoted by $co(A)$.

If A and B are finite disjoint (non-overlapping) sets in $R^n$, the sets A and B are said to be linearly separable if there is a vector $\underline{u}$ in $R^n$ and a real number $\delta$ which satisfy $$(\underline{u}, \underline{v})\begin{cases}>\delta \text{ if } \underline{v} \text{ is in A}\\ <\delta \text{ if } \underline{v} \text{ is in B}\end{cases} \qquad (7)$$

Sets A and B are said to be disjoint if they have no points in common; if A and B are disjoint then we write $A \Omega B=\phi$. The following theorem (Nelson Dunford and Jacob Schwartz, Linear Operators Part I, Interscience Publishers, 1958, page 417) characterizes those pairs (A, B) of disjoint finite sets in $R^n$ which are linearly separable:

A necessary and sufficient condition that the pair (A, B) of finite disjoint sets be linearly separable is $$co(A)\Omega co(B)=\phi \qquad (8)$$

Geometrically the surface in $R^n$ consisting of all points $\underline{v}$ which satisfy $(\underline{u}, \underline{v})=\delta$ is a hyperplane. The hypothesis $co(A)\Omega co(B)=\phi$ guarantees the existence of a hyperplane which will separate the sets A and B. By noting the sign of the numerical quantity $(\underline{u}, \underline{v})-\delta$ the side of the plane that the point $\underline{v}$ lies and, hence, the class of which it is a member can be determined. In the application to the classification of input patterns (characters) into M classes $R_1, R_2, \ldots, R_M$ a hyperplane to separate $R_i$ from the remaining M−1 classes, for each index $i$, $1 \leq i \leq M$ is determined.

Suppose that A and B are finite sets in $R^n$ satisfying the condition $$co(A) \Omega co(B) = \phi \quad (9)$$

The objective is to seek a vector $\underline{u}$ in $R^n$ and a real number $\delta$ which satisfy $$(\underline{u}, \underline{v}) \begin{cases} > \delta \text{ if } \underline{v} \text{ is in A} \\ < \delta \text{ if } \underline{v} \text{ is in B} \end{cases} \quad (10)$$

If $\underline{v} = (v_1, v_2, \ldots, v_n)$ is any vector in either A or B then $\underline{v}^*$ refers to the vector in $R^{n+1}$ obtained by adjoining and $(n+1)^{st}$ coordinate (component) equal to one to $\underline{v}$, i.e.

$$\underline{v}^* = (v_1, v_2, \ldots, v_n, 1) \quad (11)$$

Let $\underline{u}^* = (u_1, u_2, \ldots, u_n, u_{n+1})$. The existence of a vector $\underline{u}$ in $R^n$ and a real number $\delta$ satisfying Equation (10) is equivalent to the existence of a vector $\underline{u}^*$ in $R^{n+1}$ and a real number $\theta > 0$ which satisfy $$(\underline{u}^* \; \underline{v}^*) \begin{cases} > \theta \text{ if } \underline{v} \text{ is in A} \\ < -\theta \text{ if } \underline{v} \text{ is in B} \end{cases} \quad (12)$$

where $\underline{v}$ and $\underline{v}^*$ above are related by Equation (11). Equation (12) is used to describe the algorithm for determining the required vector $\underline{u}^*$. Fix the value of $\theta$ (the choice of $\theta$ is arbitrary as long as $\theta > 0$) and find $\underline{u}^*$ as the result of a sequence of adaptations (or iterations). A sequence $\underline{u}^*_0, \underline{u}^*_1, \ldots, \underline{u}^*_N, \ldots$ is generated and $\underline{u}^*_0$ is selected as an arbitrary vector in $R^{n+1}$. If Equation (12) is satisfied by $\underline{u}_0^*$ then $\underline{u}_0^*$ is a solution and the iterative process terminates. If $\underline{u}_0^*$ is not a solution of Equation (12) then there exists either (1) A vector $\underline{v}$ in A for which $(\underline{u}_0^*, \underline{v}^*) \leq \theta$ or (2) A vector $\underline{v}$ in B for which $(\underline{u}_0^*, \underline{v}^*) \geq \theta$ (13)

In the first case, set $\underline{u}_1^* = \underline{u}_0^* + \underline{v}^*$ and in the latter case $\underline{u}_1^* = \underline{u}_0^* - \underline{v}^*$. If there are many vectors $\underline{v}^*$ as in Equation (12) then the first of these is selected to make the correction in $\underline{u}_0^*$. The process is then repeated; if $\underline{u}_1^*$ is a solution of Equation (11) the process is terminated and if not, then $\underline{u}_1^*$ is modified to $\underline{u}_2^*$ according to the procedure above.

If finite sets A and B satisfy $co(A) \Omega co(B) = \phi$ then the iterative process above converges. This is proved by first rephrasing the condition of Equation (12). If $\underline{v} = (v_1, v_2, \ldots, v_n)$ is a vector in A or B then by $\underline{v}^{**}$ is meant the following:

$$\underline{v}^{**} = \begin{cases} (v_1, v_2, \ldots v_n, 1) \text{ if } \underline{v} \text{ is in A} \\ (-v_1, -v_2, \ldots -v_n, -1) \text{ if } \underline{v} \text{ is in B} \end{cases} \quad (14)$$

Then seek a vector $\underline{u}^*$ in $R^{n+1}$ which satisfies $$(\underline{u}^*, \underline{v}^{**}) > \theta \text{ if } \underline{v} \text{ is in A or B} \quad (15)$$

Since A and B are both finite sets, Equation (15) is a system of linear inequalities $$\begin{array}{l} (\underline{u}^*, \underline{v}_1^{**}) > \theta \\ (\underline{u}^*, \underline{v}_2^{**}) > \theta \\ (\underline{u}^*, \underline{v}_3^{**}) > \theta \\ \cdot \\ \cdot \\ \cdot \\ (\underline{u}^*, \underline{v}_p^{**}) > \theta \end{array} \quad (16)$$

where $p$ is the number of elements in A and B. The lengths of the vectors $\underline{u}_0^*, \underline{u}_1^*, \ldots, \underline{u}_N^*, \ldots$ are computed first.

Note that $$\underline{u}_N^* = \underline{u}^*_{N-1} + \underline{v}_{i_N}^{**} \quad (17)$$

where $i_N$ is one of the $p$ indices $1, 2, \ldots p$, or the process has terminated in fewer than N steps. Moreover the vector $\underline{v}_{i_N}^{**}$ satisfies $$(\underline{u}_{N-1}^*, \underline{v}_{i_N}^{**}) \leq \theta \quad (18)$$

Using the relationship between the length of a vector and the scalar product, namely, $$\|\underline{u}\|^2 = (\underline{u}, \underline{u})$$

the following is found:

$$\|\underline{u}_N^*\|^2 = \|\underline{u}_{N-1}\|^2 + \|\underline{v}_{i_N}^{}\|^2 + 2(\underline{u}_{N-1}, \underline{v}_{i_N}^{}) \quad (19)$$

If $$C = \max_{1 \leq i \leq p} \|\underline{v}_i^{**}\|^2$$

then Equations (18) and (19) show $$\|\underline{u}_N^*\|^2 \leq \|\underline{u}_{N-1}^*\|^2 + 2\theta + C \quad (20)$$

and this means that there is a constant D (independent of N) such that $$\|\underline{u}_N^*\| \leq D \cdot N^{1/2} \quad (21)$$

Next the hypothesis $(co(A) \Omega co(B) = \phi)$ guarantees that there is a vector $\underline{z}$ in $R^{n+1}$ which satisfies $$(\underline{z}, \underline{v}_i^{**}) > 0 \quad 1 \leq i \leq p \quad (22)$$

But $$\underline{u}_N^* = \underline{u}_0^* + \underline{v}_{i_1}^{} + \underline{v}_{i_2}^{} + \ldots + \underline{v}_{i_N}^{**} \quad (23)$$

and therefore $$(\underline{z}, \underline{u}_N^*) = (\underline{z}, \underline{u}_0^*) + (\underline{z}, \underline{v}_{i_1}^{}) + (\underline{z}, \underline{v}_{i_2}^{}) + \ldots + (\underline{z}, \underline{v}_{i_N}^{**}) \quad (24)$$

Using Equations (22) and (24), it may be seen that $$(\underline{z}, \underline{u}_N^*) \geq (\underline{z}, \underline{u}_0^*) + N\theta \geq D' \cdot N \quad (25)$$

for some appropriate constant D′ depending only upon the initial choice of $\underline{u}_0^*$ and $\theta$. A contradiction of the tentative hypothesis that the iterative process continues indefinitely is arrived at by using a Schwarz inequality which states $$(\underline{z}, \underline{u}_N^*) \leq \|\underline{u}_N^*\| \; \|\underline{z}\| \quad (26)$$

Equations (21), (25) and (26) therefore provide the inequality $$D \cdot N^{1/2} \|\underline{z}\| \geq D' \cdot N \quad (27)$$

which cannot hold for arbitrarily large N. Thus the iterative process must terminate and upon termination a solution to the system of inequalities (16) is found.

In the application to the classification of input patterns (characters) into M classes $R_1, R_2, \ldots, R_M$, M linear separable problems are solved, namely:

Problem #1: Separate $R_1$ from $R_2, R_3, \ldots, R_M$
Problem #2: Separate $R_2$ from $R_1, R_3, \ldots, R_M$
. . . . .
. . . . . (28)
. . . . .
Problem #j: Separate $R_j$ from $R_1, R_2, \ldots, R_{j-1}, R_{j+1}, \ldots, R_M$
Problem #M: Separate $R_M$ from $R_1, R_2, \ldots, R_{M-1}$ In the operating mode, the sample patterns are replaced with input specimens to be identified or recognized. In this mode of operation, the input specimens are subjected to the same nonrandom function, and the function thus generated is compared with the trained reference functions to effect identification.

The particular nonrandom functions of the input patterns that are employed in the preferred embodiments of the invention are autocorrelation functions. An autocorrelation function is a measure of the correlation of a function with itself and is thus inherently registration invariant. A first-order autocorrelation function defines the number of pairs of black area separated by a given distance in a given direction, over all distances and directions. Using two-dimensional notation, if $(x, y)$ is a point on the pattern, and $(x+x', y+y')$ is another point on the pattern separated from the point $(x, y)$ by $(x', y')$, then the product $f(x, y)f(x+x', y+y')=1$ only where both points are black. Since this procedure is performed on every pair of points in the specimen pattern S, the autocorrolation function $D_S(x', y')$ is defined as:

$$D_S(x', y')=\sum_{x, y} f(x, y)f(x+x', y+y') \quad (29)$$

Specimen identification may be further enhanced by using higher-order autocorrelation function comparison based on point triples, quadruples, etc. Higher-order autocorrelation function techniques are described in detail in a copending application, Serial Number 118,124, now Patent No. 3,196,397, filed June 19, 1961 by H. H. Goldstine, L. P. Horwitz and G. L. Shelton, Jr., entitled Specimen Identification Apparatus and Methods.

Autocorrelation functions may be also derived from pairs, triples, . . . $n$-tuples of black and white points of the document area, rather than being restricted only to black points. Functions of this type are termed "generalized" autocorrelation functions and are described in detail in a patent application, Serial Number 227,322, now Patent No. 3,169,399, filed October 1, 1962 by L. A. Kamentsky and C. N. Liu, entitled Specimen Identification Methods and Apparatus.

Autocorrelation function techniques and their use in the invention will be further described with the detailed description of the preferred embodiments of the invention in conjunction with the drawings.

In the drawings:

FIGURES 2–17 are diagrams showing the basic digital symbols and circuits used in the more detailed diagrams.

FIGURES 27 and 28 are charts showing the autocorrelation functions and linear functional masks (reference storage) for ten arabic numeral sample patterns.

FIGURE 29 is a chart showing the stability of identification of the system when used with the sample patterns in FIGURES 27 and 28.

Figure 1:
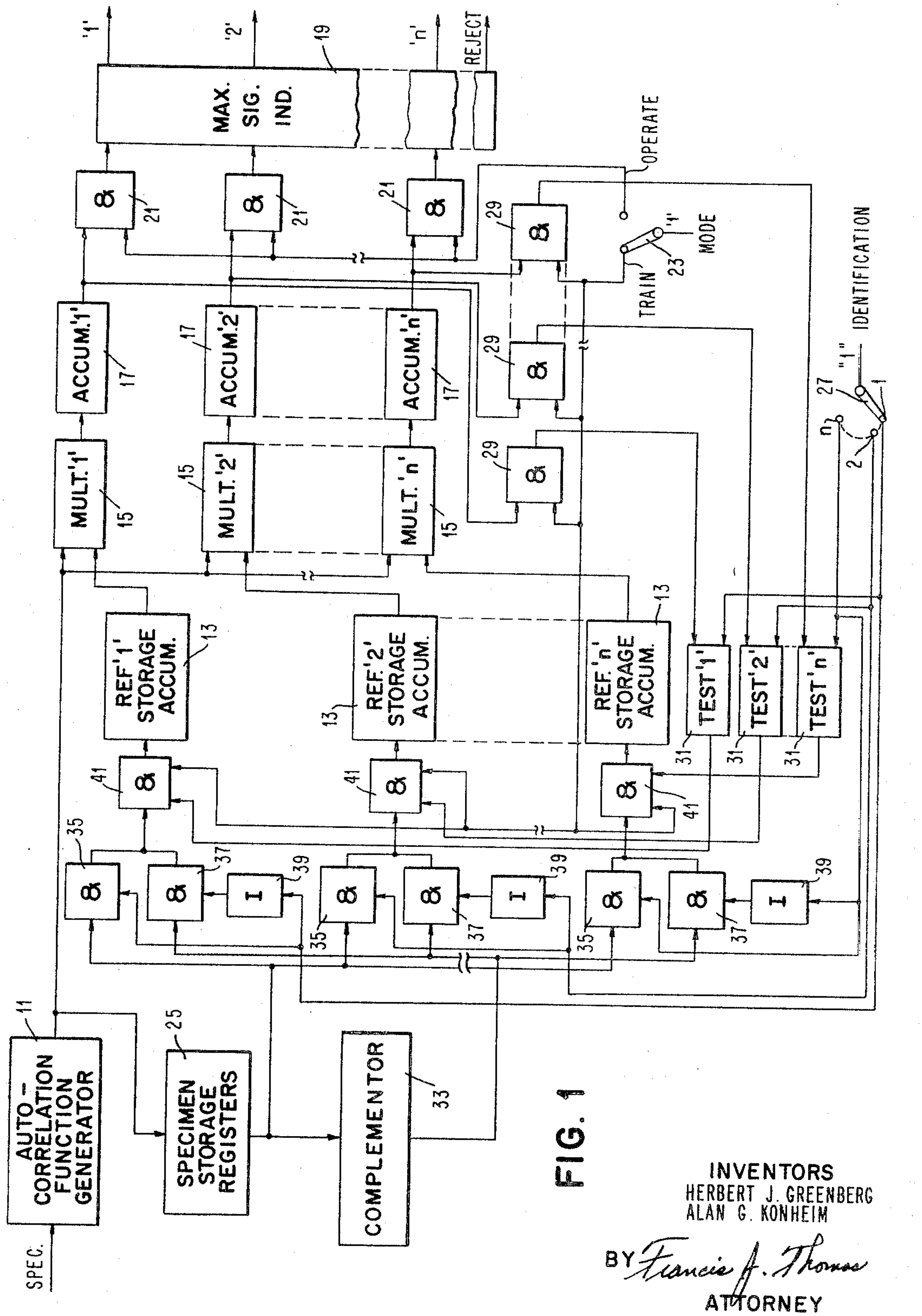
FIGURE 1 is a block diagram of a preferred embodiment of the invention.
Figures 30, 30A:
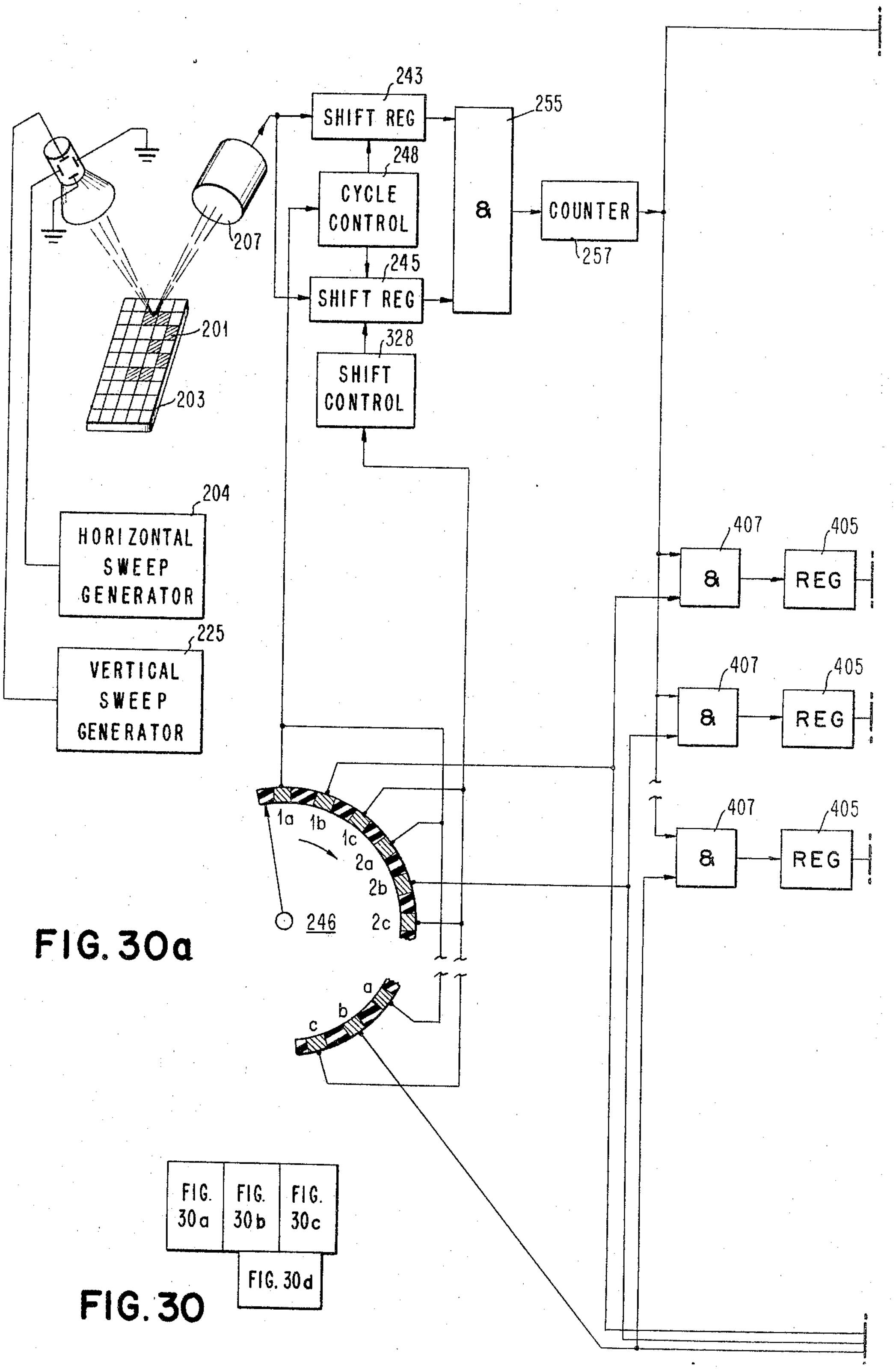

FIGURE 30, including FIGURES 30*a* through 30*d*, is a functional diagram of the embodiment of the invention shown in the block diagram of FIGURE 1.

Figure 31A:
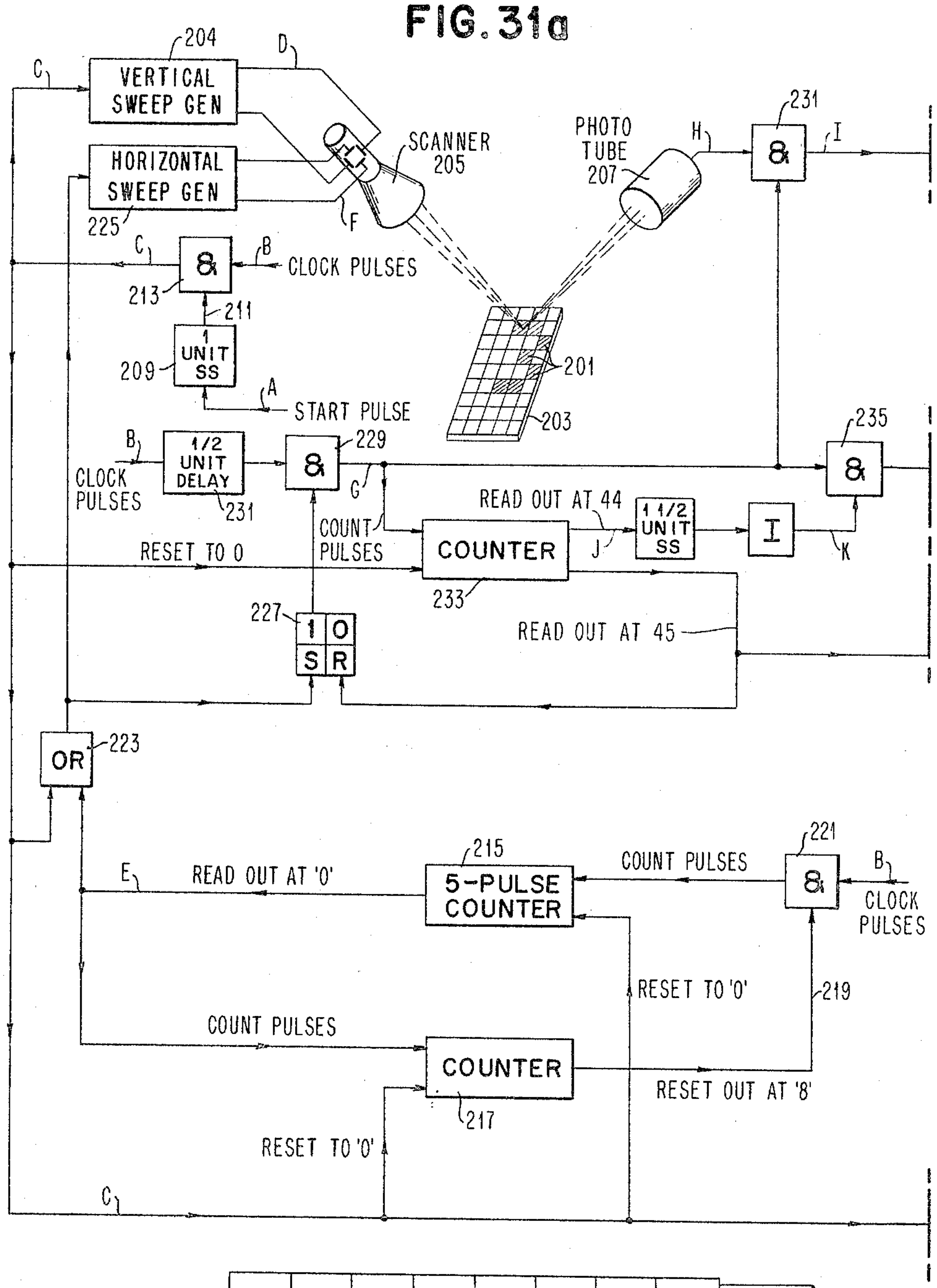
Figure 31:
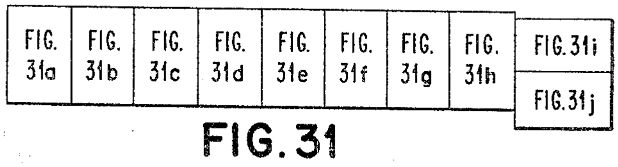

FIGURE 31, including FIGURES 31*a* through 31*j*, is a detailed schematic diagram of the embodiment of the invention shown in FIGURES 1 and 30.

Figure 31B:
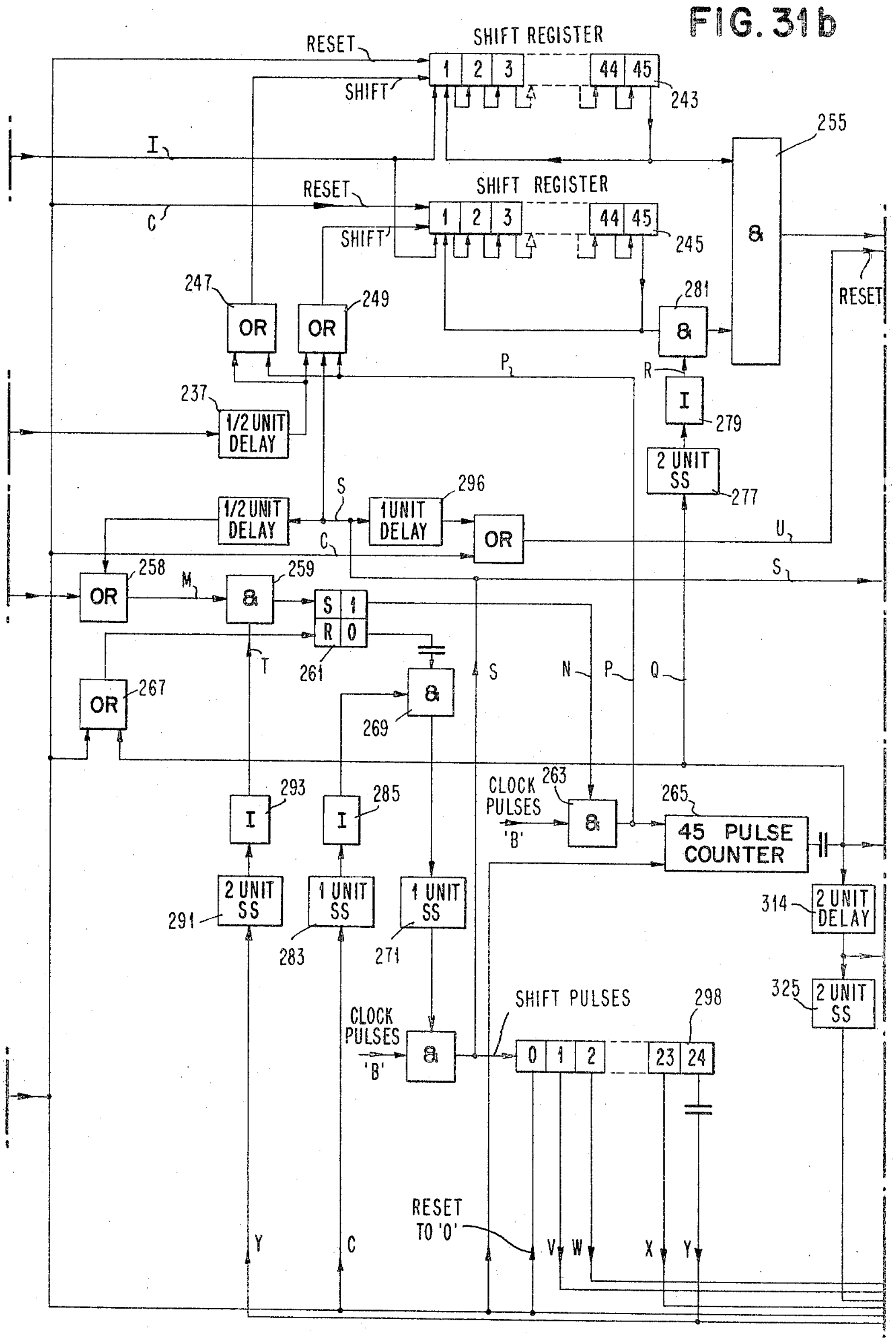

FIGURES 32–39 are diagrams showing the operation of the shift registers shown in FIGURE 31*b*.

FIGURE 40 is a diagram showing the autocorrelation function generated as a result of the operation of the shift registers in the diagram in FIGURE 31*b* for a typical input pattern.

Figure 41A:
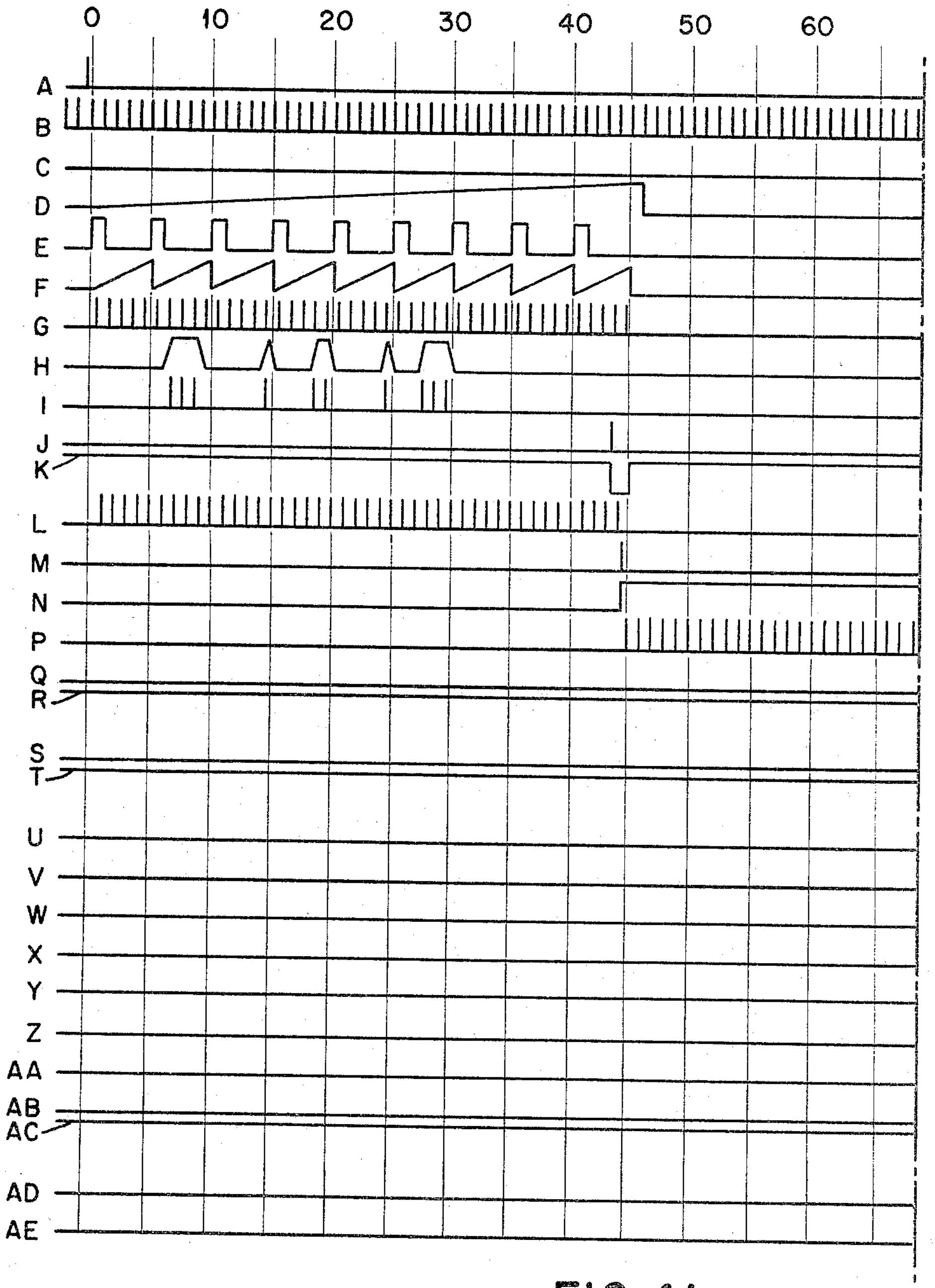
Figure 41:
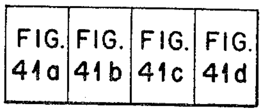
Figure 41B:
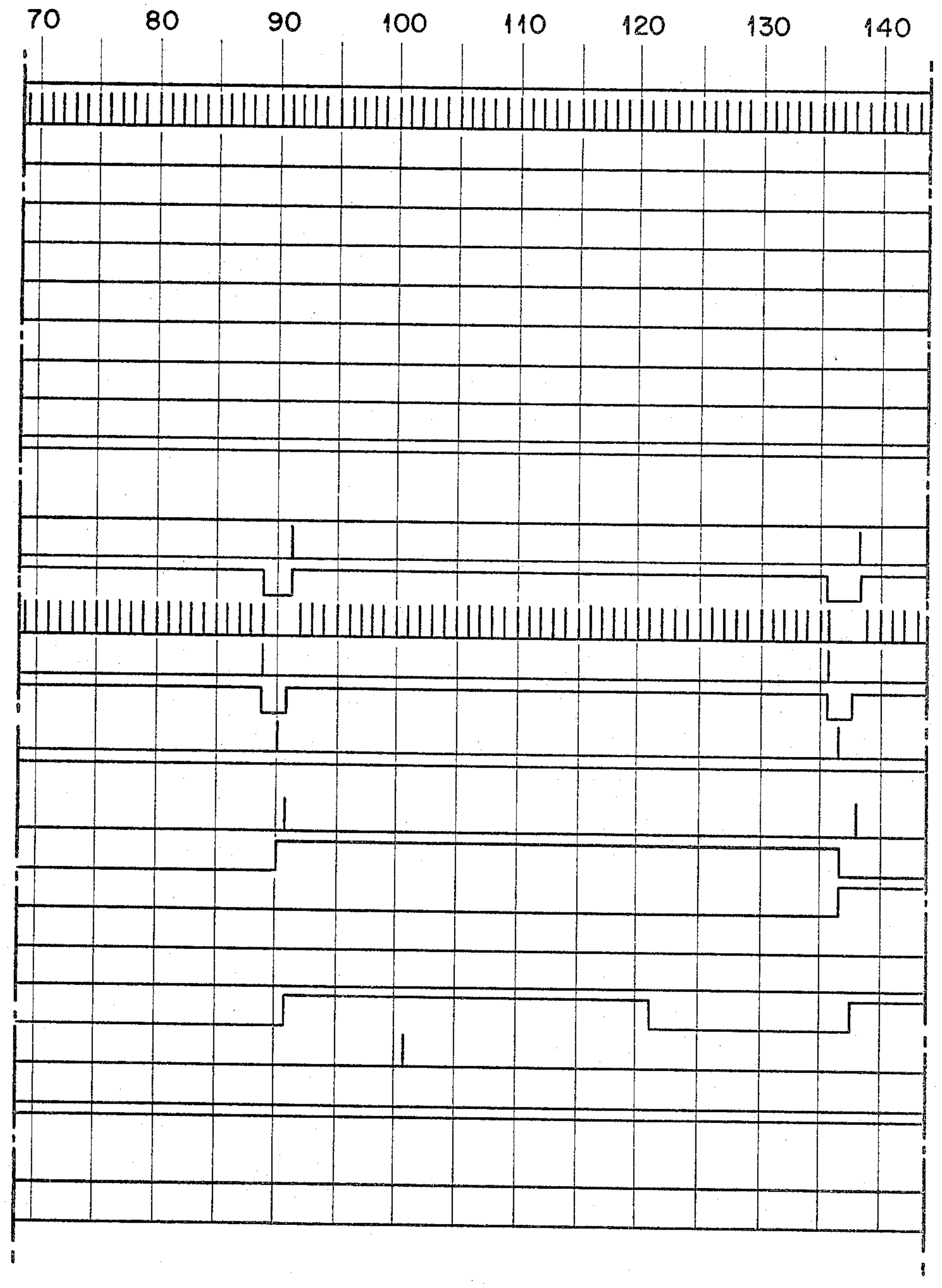
Figure 41C:
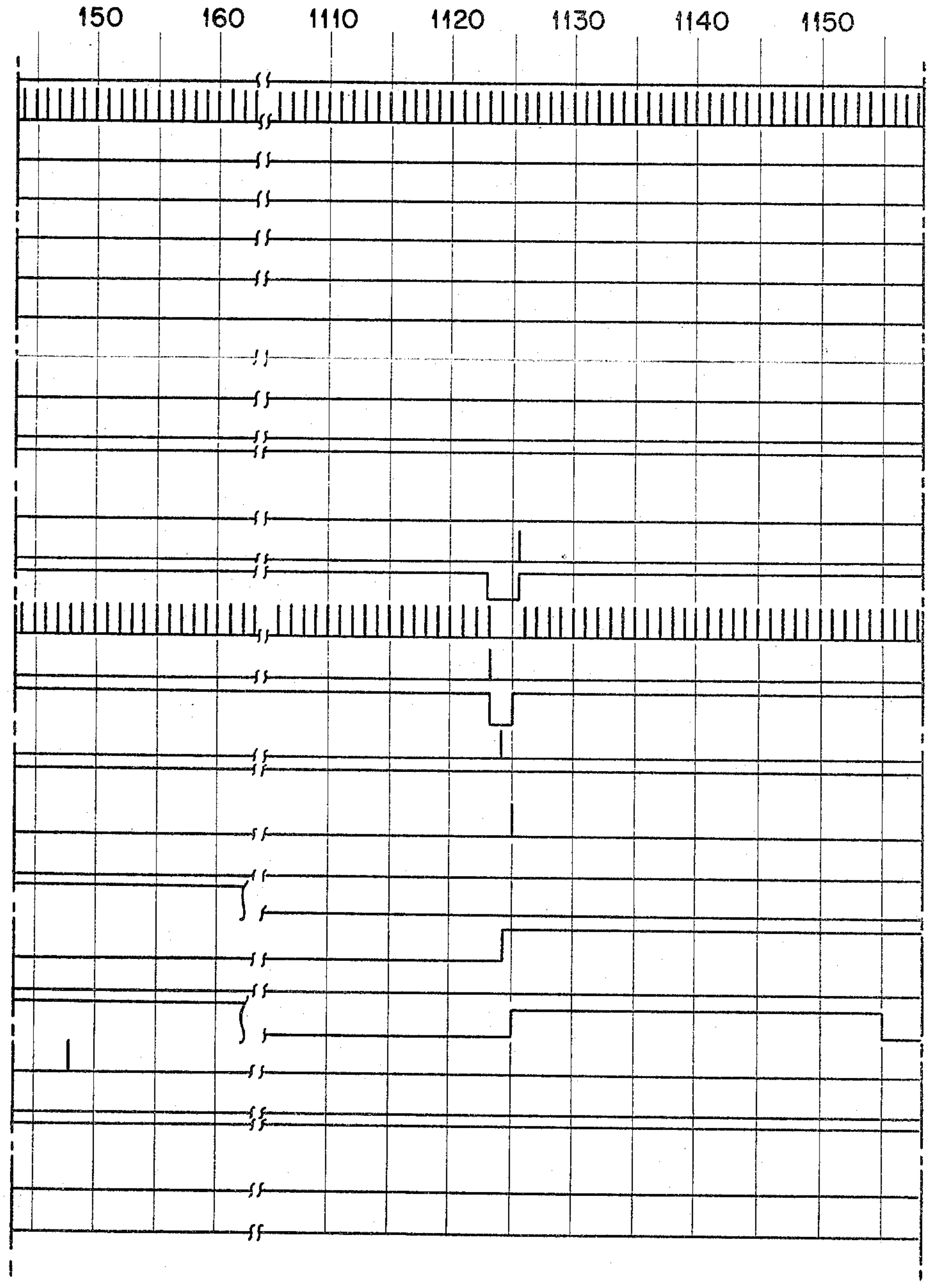
Figure 41D:
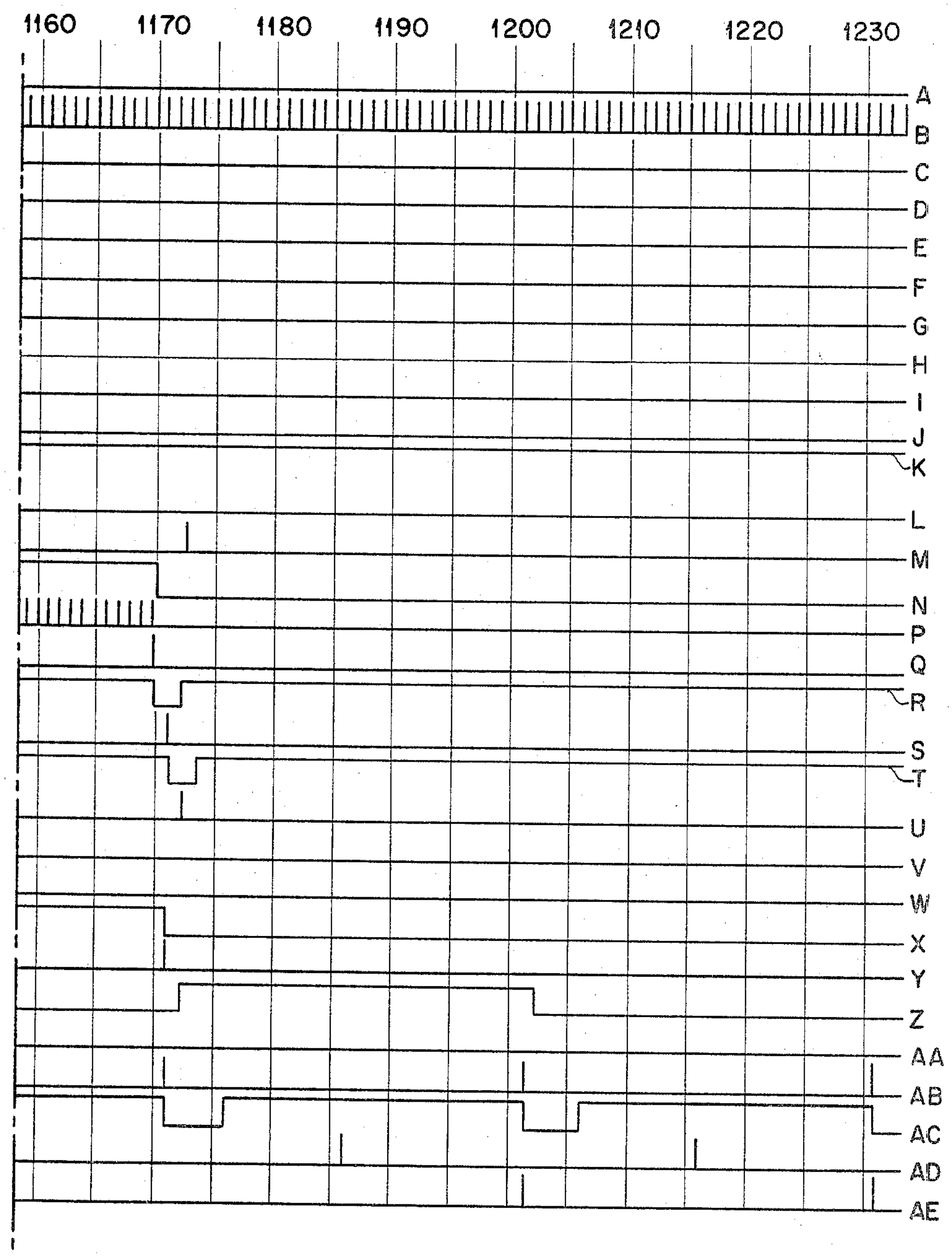

FIGURE 41, including FIGURES 41*a* through 41*d*, is a timing diagram showing the operation of the embodiment shown in FIGURE 31.

Figures 42, 42A:
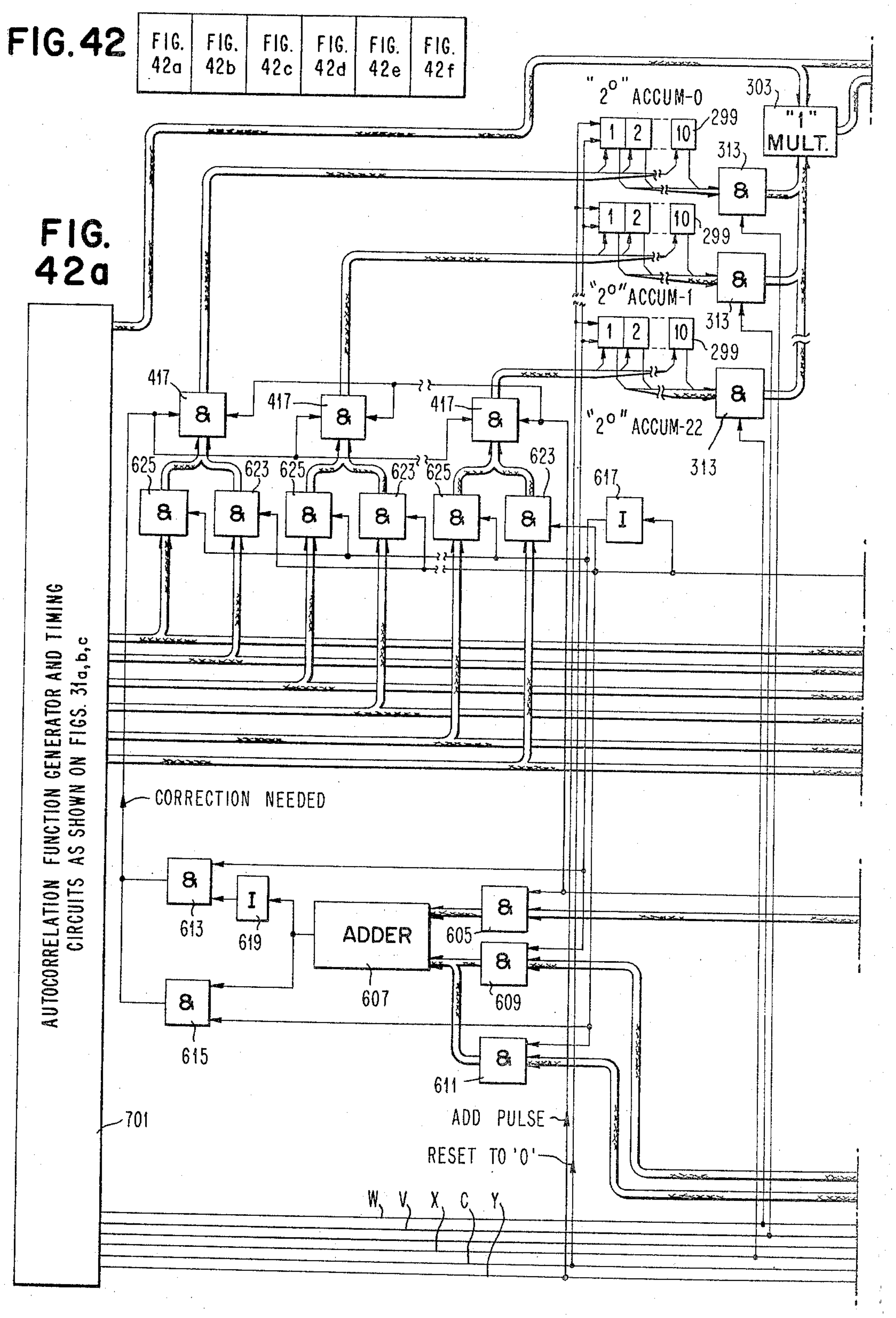
Figure 42B:
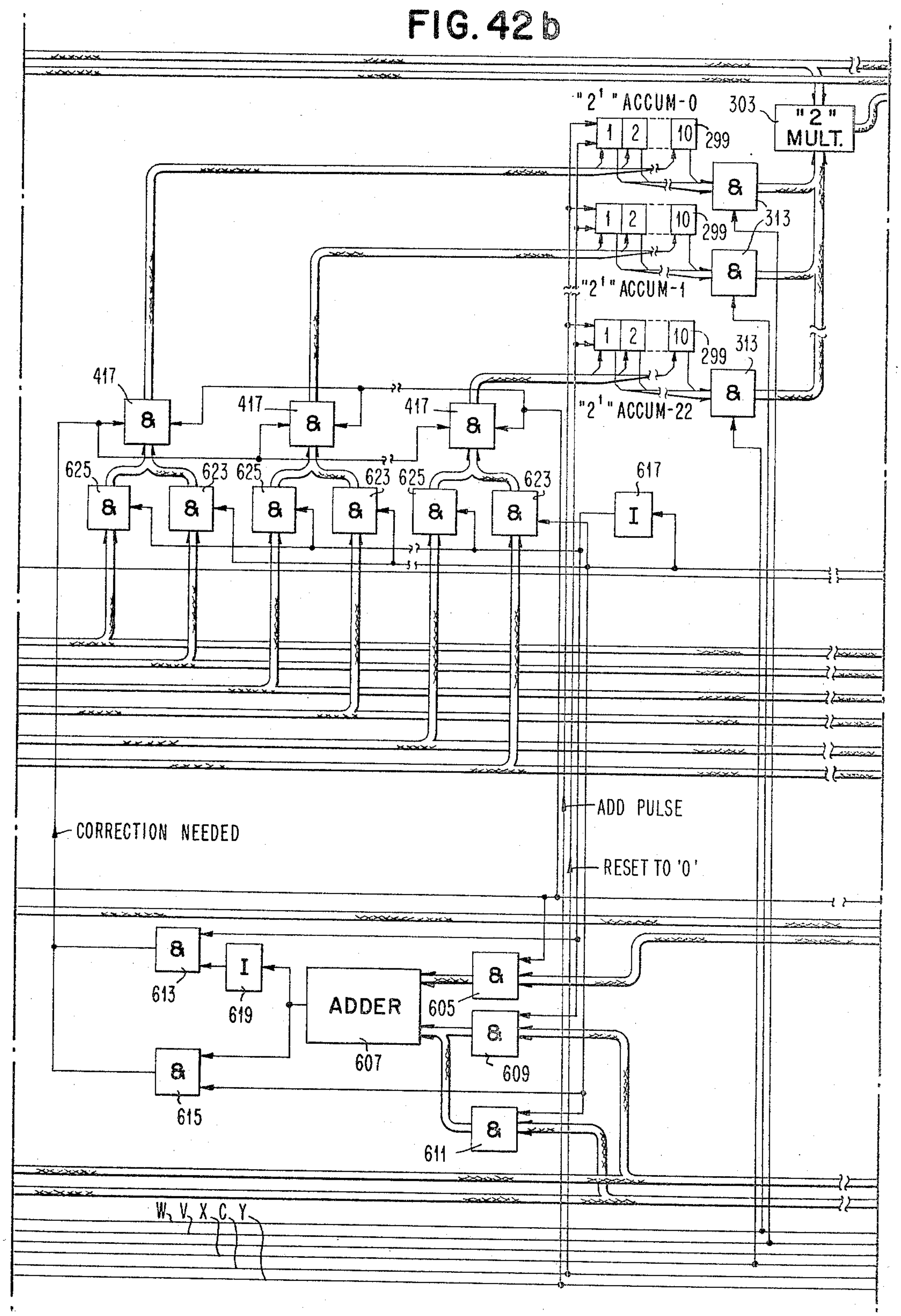
Figure 42C:
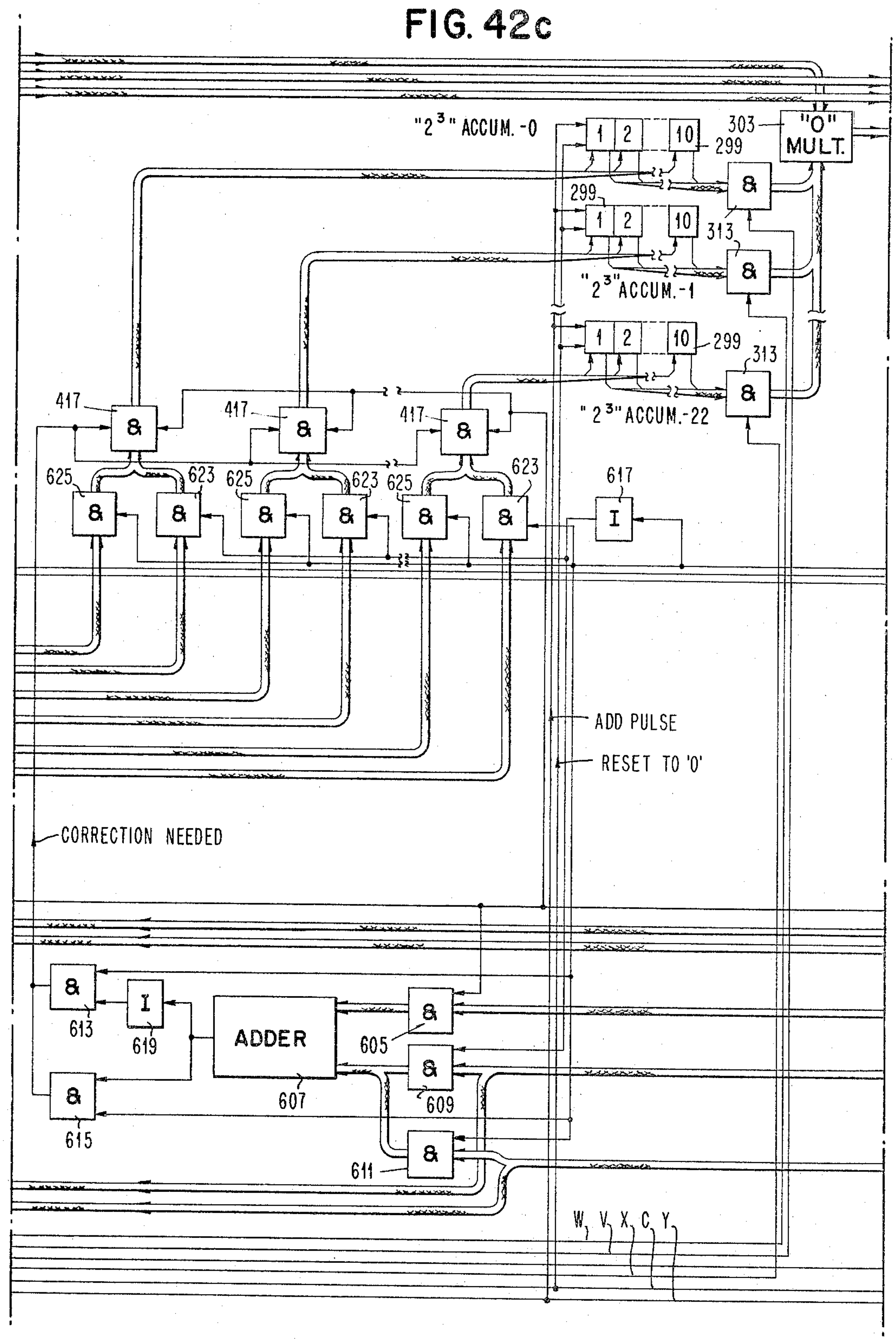
Figure 42D:
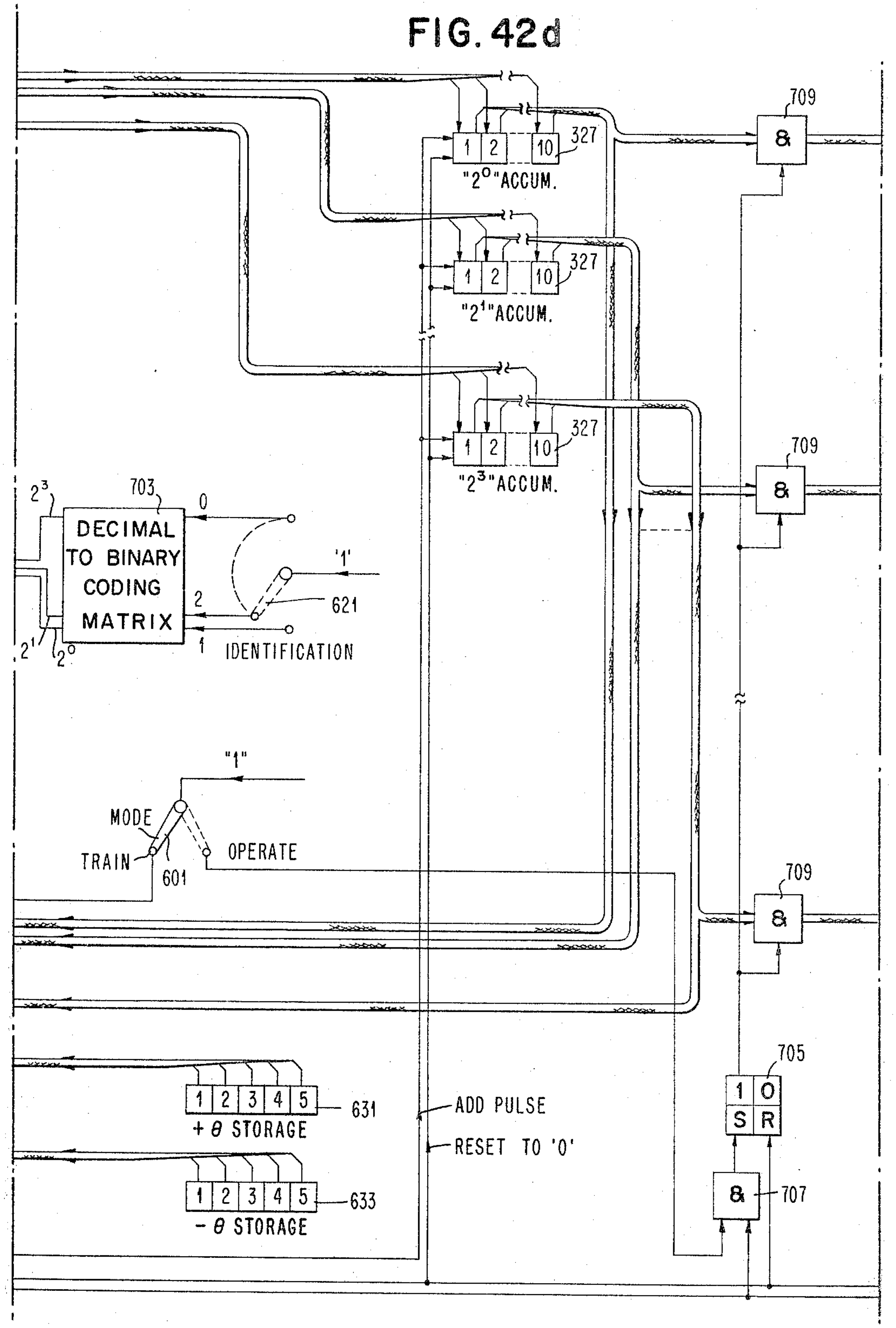

FIGURE 42, including FIGURES 42*a* through 42*f*, is a schematic diagram of a second embodiment of the invention.

Figure 43:
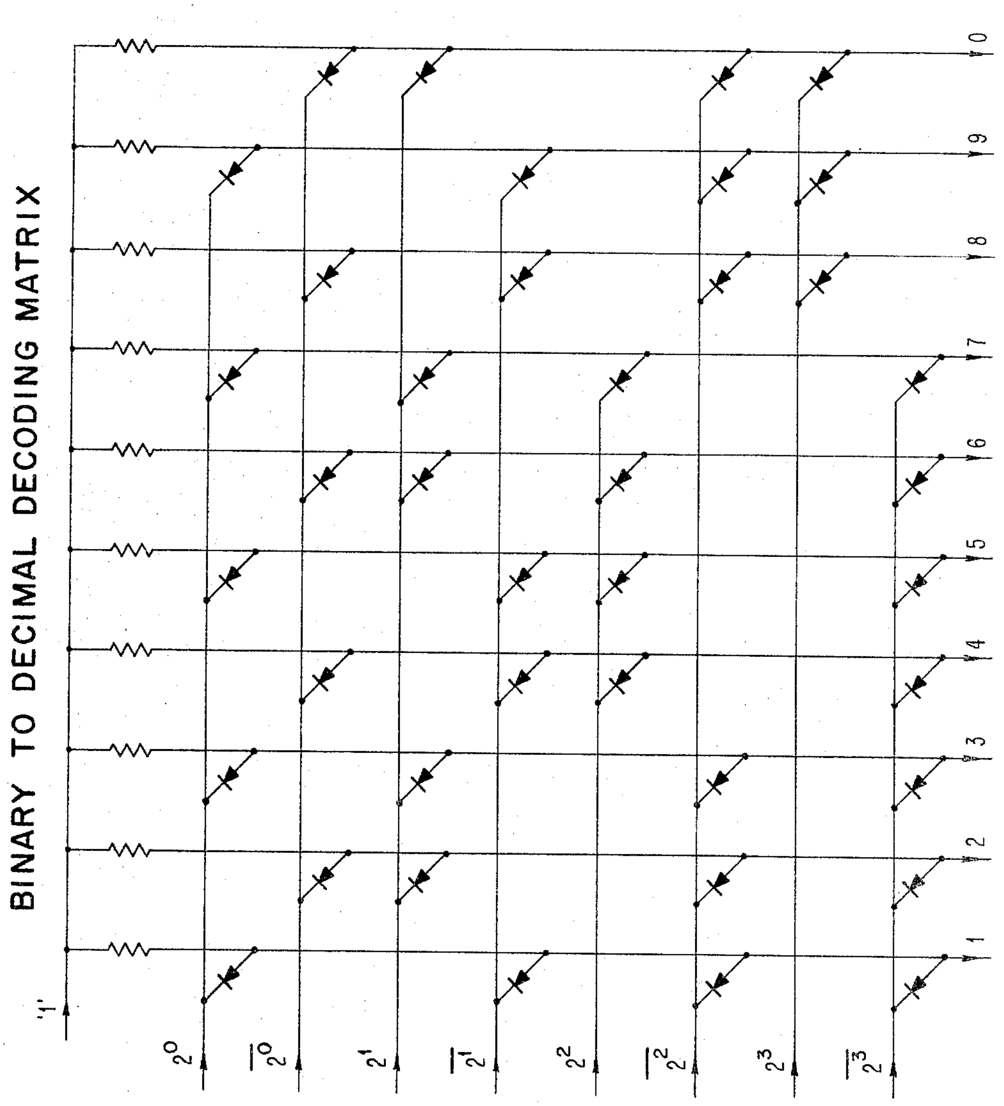

FIGURE 43 is a detailed diagram of a binary to decimal decoding matrix that may be used in the embodiment shown in FIGURE 42.

Figure 44:
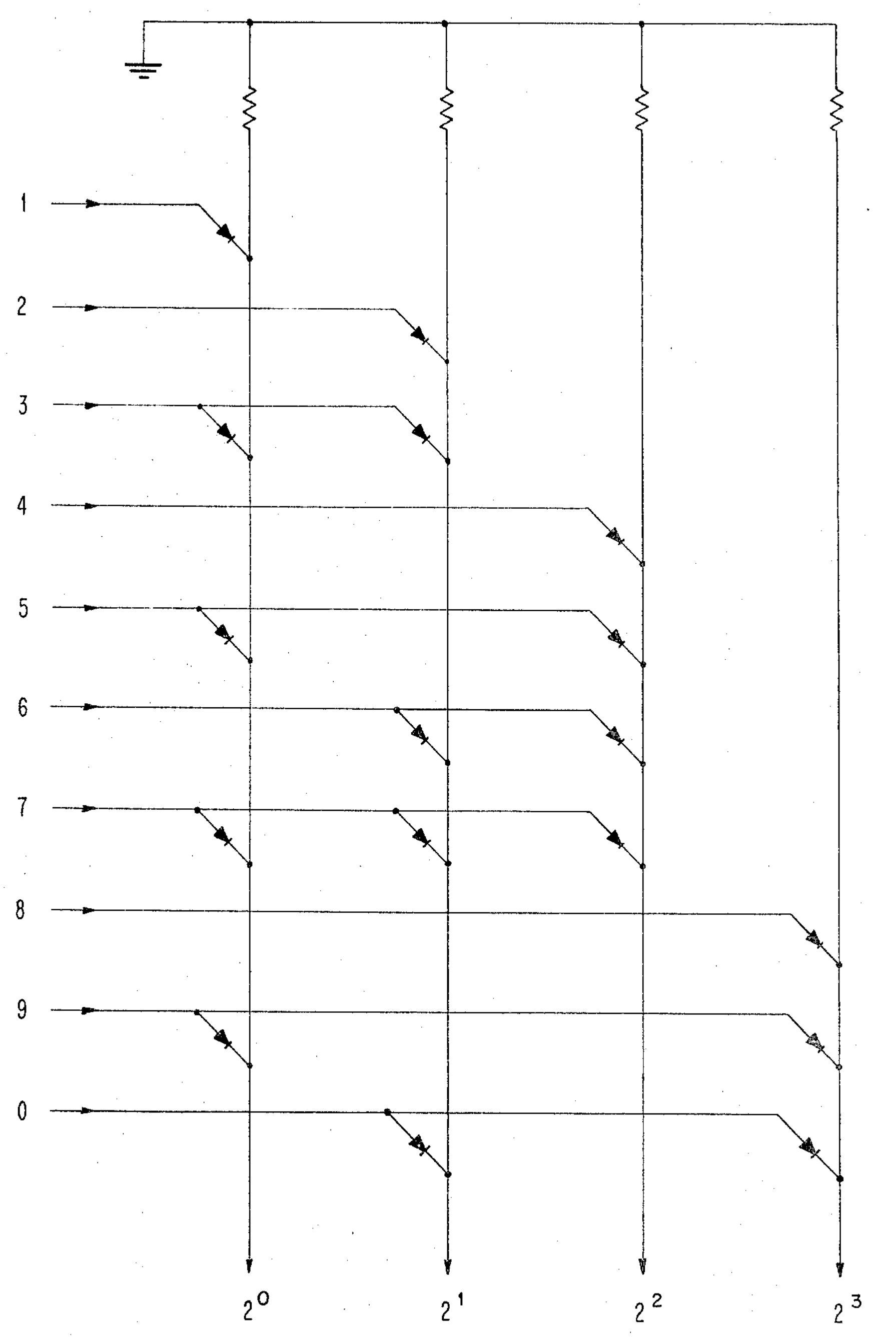

FIGURE 44 is a detailed diagram of a decimal to binary coding matrix that is suitable for use in the embodiment of FIGURE 42.

A preferred embodiment of the invention is illustrated in the block diagram in FIGURE 1 and its operation will be described first for the operating mode and then for the training mode.

In the operating mode, the input specimen is scanned (not shown) to provide a binary time-varying electrical signal which is applied to an autocorrelation function generator 11. The generated function of the specimen is then compared with reference functions (that were generated during an earlier training mode) and which are stored in reference storage accumulators 13. The comparisons are accomplished by multiplying the specimen autocorrelation function elements and the elements of the reference functions in multipliers 15 and summing these products in accumulators 17. The largest accumulated sum is indicative of the identity of the specimen and this indication is generated by a maximum signal indicator 19 which operates on the signal from the accumulators 17 as applied through "and" gates 21. The "and" gates are under the control of the "mode" switch 23 and are conditioned to pass the signals from the accumulators to the maximum signal indicator when the switch is in the operate position.

In the training mode of operation, the specimen patterns are replaced with sample patterns which are scanned to provide electrical signals for the input of the autocorrelation function generator 11. In this mode of operation, a mode switch 23 is placed at the train position to condition a group of "and" gates 29 which pass the output of the accumulators 17 to corresponding test circuits 31. In the training mode of operation, "and" gates 21 are inhibited and the system provides no output from the maximum signal indicator 19. An "identification" switch 27 is set to the position corresponding to the known identity of the applied sample pattern. A control signal is applied to the test circuit which corresponds to the identity of the sample pattern from the identification switch. Each test circuit is capable of making two distinct comparisons. The test circuit selected by the identification switch compares its input data (from the corersponding accumulator 17) to a first threshold and provides an output indication if the data does not exceed this threshold, which indicates that the system either has not correctly identified the sample pattern or has not identified it with sufficient positive discrimination (acceptance). The signal from the test circuit is used to control the training of the recognition system to cause the data in the corresponding storage accumulator 13 to be altered in a direction that would provide improved positive discrimination (acceptance) if the same sample pattern were again applied as the input to the system. The test circuits 31 which are not selected by the identification switch 27 (the test circuits in the channels that do not correspond to the sample pattern) compare their input data (from the accumulators 17) with a second threshold value. If the applied data exceeds this threshold, the test circuit provides an output signal which indicates that the system has insufficient negative discrimination (rejection) of the sample pattern. The signals from these noncorresponding test circuits are also applied to control the training of the recognition system to cause the data in the associated storage accumulators 13 to be altered in a direction that would provide improved negative discrimination (rejection) if the same sample pattern were again applied to the system.

The autocorrelation function of the applied sample patterns is stored in the specimen storage registers 25. This data is used in training the system under the control of the output signals from the test circuits 31, as follows. If the channel corresponding to the identity of the sample pattern does not provide sufficient positive discrimination, the data in the specimen storage registers 25 is added to the data already present in the storage accumulator 13 which corresponds to the identity of the sample pattern. Similarly if the channels that do not correspond to the identity of the sample pattern do not provide sufficiently negative discrimination against the sample pattern, the data in the specimen storage registers 25 is subtracted from the data in the nondiscriminating storage accumulators 13. The subtraction is accomplished by adding the complement of the data in the specimen storage registers 25 as generated by a complementor 33. The output of the specimen storage registers 25 is applied directly to a group of "and" gates 35 and, through the complementors 33 to another group of "and" gates 37. Regardless of whether a particular channel storage accumulator 13 requires alteration or not, "and" gate 35 or 37 in the channel passes the tentative alteration data. The "and" gate 35 in the channel selected by the identification switch 27 is conditioned to pass the direct output of the specimen storage registers and the data from the complementor 33 is passed by the "and" gates 37 in all other channels. Another group of "and" gates 41 is used to apply tentative alteration data from the output of "and" gates 35 and 37 to the storage accumulators 13 when the corresponding test circuits 31 indicate the need for alteration. This is accomplished by the conditioning signals applied to the "and" gates from the outputs of the test circuits 31. The "and" gates 41 are controlled by the mode switch 23 and are only conditioned when this switch is in the train position.

Thus, in the preferred embodiment of the invention that is shown in FIGURE 1, the adaptive recognition system is trained on sample patterns in a manner in which the nonrandom function (autocorrelation function) of the sample patterns is linearly combined (added or subtracted) with the reference function data in the reference storage accumulators when the system fails to identify a sample pattern with sufficient discrimination. This process is carried out with at least one sample pattern for each channel. The sequence of sample patterns is repeatedly applied until the system converges, that is, until the application of the entire sequence provides one further adaptation. Preferably, several sample patterns corresponding to each channel are used and the system has been found to usually converge after several applications of the sample patterns.

As described in the introduction, it can be advantageous to construct hyperplanes that separate the specimen patterns without requiring that the hyperplanes pass through the region of the origin. In this case a constant can be added or subtracted from the data stored in accumulator 17. This constant, which is usually different for each channel, is automatically generated during the training mode when an additional register storing a constant (e.g. "1") supplements the data in the specimen storage register 25 (and, hence, the data in the reference storage accumulators 13).

The functional and schematic diagrams include symbols for several circuits, (such as flip-flops, "and" gates, subtractors, etc.) and these circuits are now described in detail with respect to FIGURES 2–17.

FIGURES 2–8 show the basic digital symbols used in the schematic diagrams. There are two binary conditions labelled "1" and "0," where "1" indicates the presence of a signal and "0" indicates the lack of a signal. R. K. Richards, Digital Computer Components and Circuits, 1957, published by Van Nostrand, provides a basic introduction to digital circuits and schematic diagrams of circuits that could be used in this invention.

Figure 2:
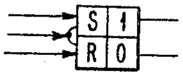

FIGURE 2 shows a basic bistable circuit, which is referred to as a flip-flop. The flip-flop is set by applying a "1" signal to the set (S) input. This provides a "1" signal at its "1" output and a "0" signal at its "0" output. The circuit is reset by applying a "1" signal to the reset (R) input, thus providing a "0" signal at the "1" output and a "1" signal at the "0" output. There is no effect on the circuit if an "S" input is applied when a circuit is already set, or if an R input is applied when previously reset. The third input is called a "complement" input and operates to reverse the condition of the circuit when a "1" signal is applied. If the circuit were set before the application of a complement signal, it would be reset by the signal. Similarly, if the circuit were reset before the application of this signal, it would be set by the signal.

Figure 3:
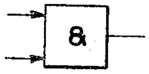
Figure 4:
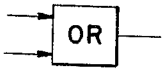

An "and" gate, as shown in FIGURE 3 provides a "1" output if all inputs received "1" signals at the same time. An "or" gate, as shown in FIGURE 4, provides a "1" output if an "1" input is present. In all other cases, both the "and" gate and "or" gate provide a "0" output.

Figure 5:
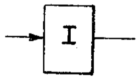

An inverter, as shown in FIGURE 5, reverses its input. If a "1" is applied, a "0" is developed at an output; if a "0" is applied, a "1" is developed.

Figure 6:
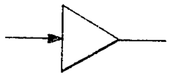

FIGURE 6 shows a symbol for a conventional amplifier or driver circuit.

Figure 7:

A delayed circuit is shown in FIGURE 7. Signals applied to this circuit are passed over a period of time without being affected in shape or amplitude.

FIGURES 8–17 show several circuits used in the functional and schematic diagrams.

Figure 8:

FIGURE 8 shows a symbol for a single-shot multivibrator. This circuit generates a rectangular gate output when a "1" signal is applied at its input. The output gate has an amplitude and polarity of a "1" signal and a duration dependent upon the circuit constants.

Figure 9:
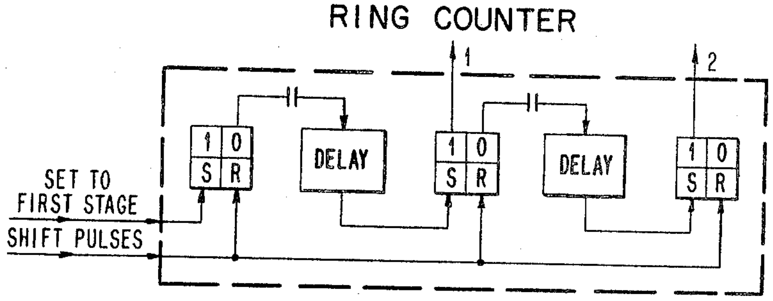

A ring counter is shown in FIGURE 9. Only one flip-flop of this counter is set at any time. At each application of a shift pulse, the flip-flop previously set is reset and, after a delay, the adjacent higher-order, flip-flop is set. An additional input is provided to set the lowest order flip-flop before the application of shift pulses. A more detailed description of the operation of a ring counter is found in a book authored by R. K. Richards entitled Arithmetic Operations in Digital Computers, 1955, published by Van Nostrand, Library of Congress Classification QA76.R5, on pages 205–208.

Figure 10:
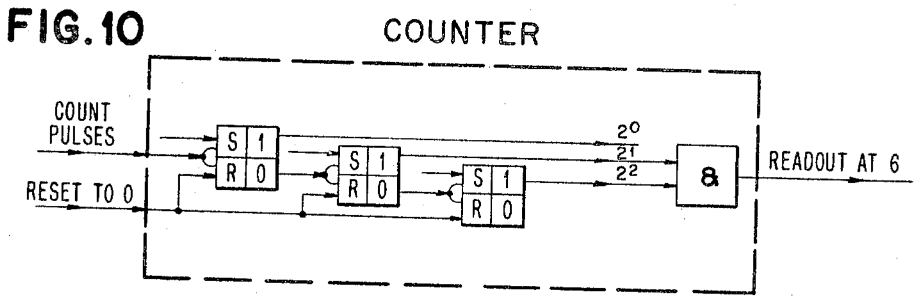

FIGURE 10 shows a series of flip-flop circuits that are connected to form a counter. Count pulses are serially applied to the complement input of the lowest-order flip-flop. The counter may be reset to 0 by the application of "1" signals to all R inputs, providing a "0" signal at each flip-flop "1" output. The first count pulse applied to the complement input sets the lowest-order flip-flop, providing a "1" at its output. Since the "0" output of this flip-flop is transferred from a "1" signal to a "0" signal, there is no effect on the adjacent flip-flop. The second applied count pulse resets the lowest-order flip-flop, providing a "0" signal at its "1" output lead and a "1" signal to the complement input of the adjacent flip-flop, transferring its condition. At this time, the $2^0$ and the $2^2$ output leads contain "0" signals and the $2^1$ output lead contains a "1" signal, indicating a total count 010, which is the binary representation of the decimal digit 2. As successive count pulses are applied, the output total increases until a total of 111 is obtained (after the 7th input pulse). The next (8th) count pulse applied causes an output total of 000 and succeeding pulses cause a repetition of the preceding operation. The counter need not be originally set to 000, but may be reset to any other number by applying "1" signals to the appropriate "S" and "R" inputs. When it is desired to provide a counter read-out signal for a particular count, an "and" gate is connected to the appropriate flip-flop outputs, depending upon the read-out count desired. In FIGURE 10, a read-out of 6 is indicated; thus the $2^1$ and $2^2$ inputs are applied to the "and" gate. This causes an output signal to be generated when the counter stores a count of either 6 or 7, as in those two cases the $2^1$ and $2^2$ leads contain "1" signals. When it is desired that the counter read out at 6 only, the $2^0$ signal is inverted and applied to the "and" gate. In this case the "and" gate has "1" signals applied to it at a count of 6 only because the $2^0$ signal is a "0" at this time, which after inversion provides the required "1" signal to operate the "and" gate. This could be accomplished without the use of an inverter if the third input to the "and" gate were taken from the "0" output of the lowest-order flip-flop.

Figure 11:
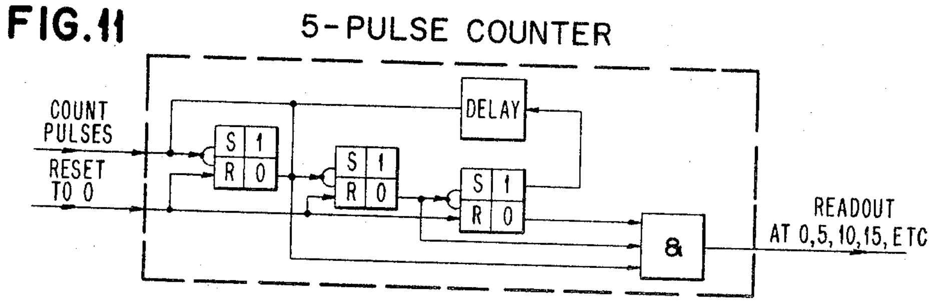

Referring next to FIGURE 11, there is shown a 5-pulse counter which provides an output for every fifth input count pulse. The "and" gate in this counter has signals applied to it from the "0" outputs of each of the flip-flops, thus the "and" gate provides an output signal when all flip-flops are reset. A reset to "0" signal is applied to the counter to reset all flip-flops. As count pulses are applied, the counter operates in a manner similar to the counter of FIGURE 10, except that, at a count of 4, a signal is delayed and fed back to the complement input of the 2 lower-order flip-flops. Thus, the fourth count pulse which initially resets the two lower-order flip-flops and sets the highest-order flip-flop, causes a signal to be fed back to the two lower-order flip-flops, setting them. The fifth count pulse applied to the circuit of FIGURE 11 causes all flip-flops to be reset which provides an output from the "and" gate. In a similar manner, the tenth, fifteenth, etc. pulses applied to this counter cause outputs from the "and" gate.

Figure 12:
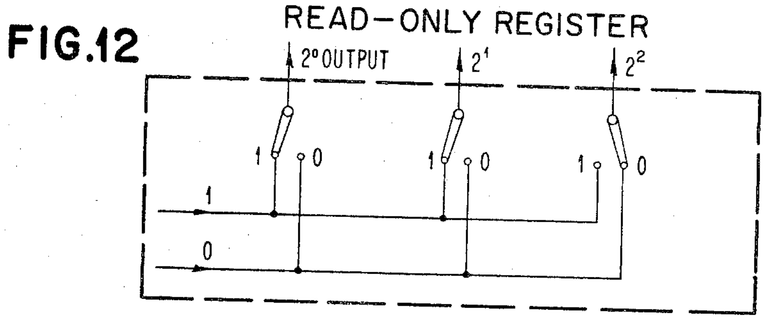

In FIGURE 12 there is shown a read-only register which provides "1" outputs on various leads dependent upon the setting of switches. The register (as shown) stores the binary number 011.

Figure 13:
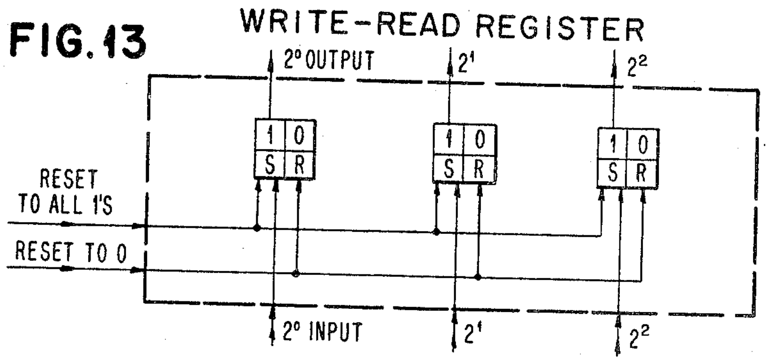
Figure 22:
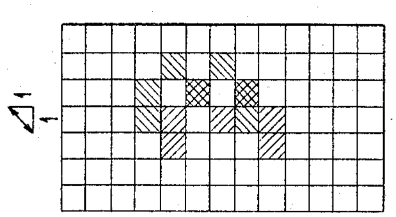
FIGURES 18–25 are a set of explanatory diagrams showing a procedure for generating the autocorrelation function of a typical pattern.
Figure 21:
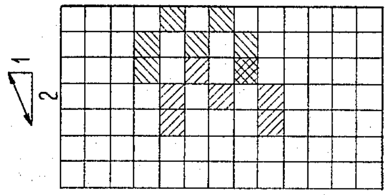

FIGURE 13 shows a write-read register. This register is reset to "0" by the application of a pulse to the flip-flop reset inputs; resets to all "1's" by the application of a pulse to all flip-flop set inputs; or reset to any other number by the application of pulses to the appropriate set and reset inputs of the flip-flops. A number is written into the register by the parallel application of pulses on the appropriate signal input leads. For example, if it were desired to write the number 101 into the register, the register would be previously reset to "0," and then a "1" signal would be applied on the $2^2$ and $2^0$ inputs. A "0" signal would be applied on the $2^1$ input. The register output, taken from the "1" outputs of the flip-flops indicates the binary number stored in the register.

A recycling shift register is shown in FIGURE 14. This register is comprised of a group of shift register "sections" in tandem. The previously-cited R. K. Richard's text entitled Arithmetic Operations in Digital Computers contains an explanation of these and other shift register sections on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest-order flip-flop. Since this is a recycling shift register, the output of the highest output order flip-flop is fed back to the lowest-order flip-flop. In this manner, the data that is placed in the shift register is recycled by the application of subsequent shift pulses. A high-order read-out is provided to indicate the highest-order bit in the register. In this manner, data stored in the register can be read out serially merely by applying a succession of shift pulses.

An accumulator is shown in FIGURE 15. This accumulator is of the type shown on FIGURE 4–22 (page 110) and described in the previously-cited R. K. Richard's text entitled Arithmetic Operation in Digital Computers. A reset input is applied to each flip-flop in the accumulator. The binary word (parallel) to be accumulated and an "add" pulse are applied simultaneously and the binary word is added to the previously stored sum. This circuit is explained in detail in the reference.

The subtracter shown in FIGURE 16 is similar to the subtracter shown and described in the previously-cited R. K. Richard's text entitled Arithmetic Operation in Digital Computers. The half subtracters shown on FIGURE 16 follow the binary subtraction table 4–III, on page 115 of the reference. The half adder shown on FIGURE 16 is identical to the circuit in the reference in FIGURE 4–3 (*c*) on page 86. FIGURE 16 shows only two stages of the subtracter in detail. The third stage is shown as a block which is presumed to include all the circuits in the second stage. Since the binary subtracter output indication for negative differences is in the complement form, the borrow from the highest-order full subtracter indicates the sign of the difference—a "1" indicates a negative difference, a "0" indicates a positive difference.

FIGURE 17 shows an add-"1" register. This register may be reset to 0 by the application of a pulse to the reset input of each flip-flop. A number to be stored in the register is applied in parallel to the set inputs of the flip-flops in a manner similar to the write-read register in FIGURE 14. The add "1" register increases its total by "1" when a signal is applied on the add "1" input. In this respect, the add-1 register operates in a manner similar to the counter in FIGURE 11, as the "0" output of each flip-flop is applied as the complement input of the adjacent flip-flop.

A multiplier that is suitable for use in the invention is shown in FIGURE 5–1 (page 139) and explained in the previously-cited R. K. Richard's text entitled Arithmetic Operation in Digital Computers. This reference also shows an adder that is suitable for use in the invention in FIGURE 4–1 (page 84).

In order to provide a clear illustration of the principles of the invention which are embodied in the accompanying detailed descriptions, the manual generation of autocorrelation functions and some of the theory associated therewith will be described below.

The autocorrelation function is a measure of the correlation of a function with itself and is generated by comparing the specimen to be autocorrelated with itself, shifted in all directions and distances.

Figure 26:
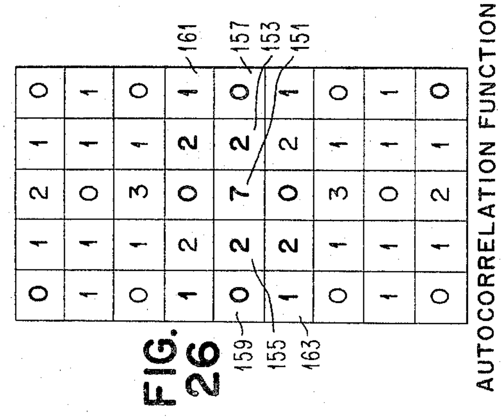
FIGURE 26 is a chart showing the autocorrelation function generated following the procedure in FIGURES 18–25.
Figure 25:
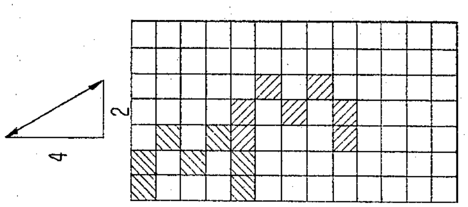
Figure 24:
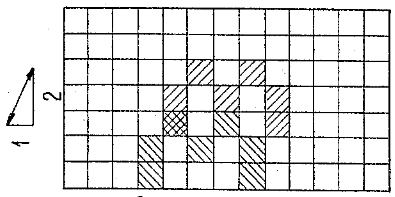
Figure 23:
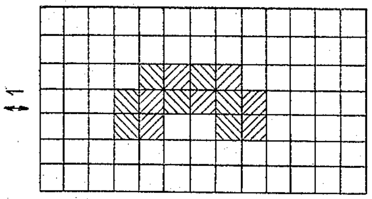

FIGURES 18 through 25 illustrate a method of generating the autocorrelation function in FIGURE 26 for a typical pattern 3. In the following description, the patterns are comprised of 15 discrete areas on a 3 x 5 matrix for simplicity of arithmetic. In practice, this invention is designed to be used to identify specimens comprising many discrete areas on a large matrix.

Figure 19:
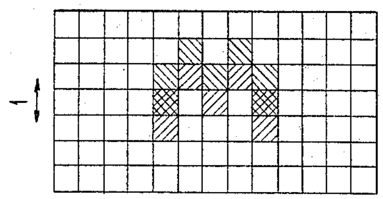
Figure 18:
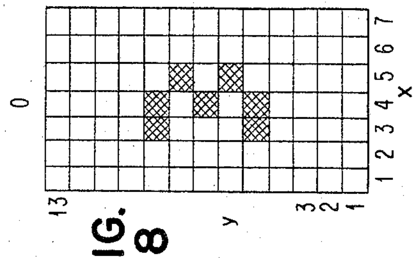

The pattern 3 formed by slant-left lines in common to FIGURES 18 through 25, the pattern formed by slant-right lines is shifted to various positions in the figures. FIGURE 18 illustrates the "0-shift" pattern, and hence, the slant-left and slant-right patterns are superimposed. If the discrete areas of the matrix are considered to have $x$ and $y$ coordinates, as shown in FIGURE 19, $f(x, y)$ is 1 for $(x=3, y=9)$; $(x=4, y=9)$; $(x=5, y=8)$; $(x=4, y=7)$; $(x=5, y=6)$; $(x=4, y=5)$; and $(x=3, y=5)$. For all other values of $x$ and $y$, $f(x, y)=0$. The autocorrelation function $D(x', y')$ is determined by the equation:

$$D(x', y')=\sum_{x, y} f(x, y) f(x+x', y+y')$$

Figure 20:
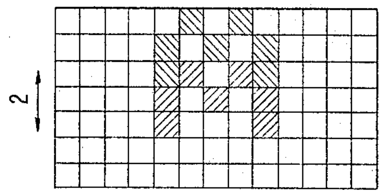

Ine the "0-shift" condition (FIGURE 18) $x'=y'=0$ and the sum is merely a count of the number of areas that are filled by the pattern, as the product $$f(x, y) \cdot f(x+0, y+0)=1$$

whenever $f(x, y)=1$. This sum is 7 for the pattern in FIGURE 18, and it is placed in the "0" shift position 151 in the table in FIGURE 26. FIGURE 19 illustrates the conditions present for a shift of one unit to the right (designated as $x'=1$, $y'=0$), which causes a 2 to be placed at the corresponding position 153 of the table in FIGURE 26 as there are two coincident areas on the matrix. Position 153 is displaced one unit to the right of position 151 to correspond to a shift of one unit to the right of the pattern in FIGURE 19. A 2 is also placed in position 155 of the table as a shift to the left of one unit ($x'=1$, $y'=0$) obviously produces the same result as a shift to the right of one unit ($x'=1$, $y'=0$). FIGURE 20 illustrates the conditions present for ($x'=2$, $y'=0$) which provides a "0" at location 157 on FIGURE 26, and also position 159, corresponding to ($x'=2$, $y'=0$). In a similar manner, positions 161 and 163 of the table are filled with "1's" as determined by FIGURE 21. FIGURES 23 through 26 illustrate the conditions present for several other combinations of $x'$ and $y'$. Using this procedure, the entire autocorrelations table of FIGURE 26 may be filled in for the typical pattern "3."

FIGURES 27 and 28 show ten arabic numeral patterns on 3 x 5 matrices and their autocorrelation functions. In addition, linear functional masks are shown. All functions are shown in abbreviated form, omitting the redundant reflected portions. The linear functional masks shown are typical masks generated by the system shown in the block diagram in FIGURE 1 while in the previously-described training mode of operation, with the numerals in FIGURES 27 and 28 used as sample patterns.

The present invention provides accurate and stable identification of specimens as evidenced by FIGURE 29. This chart shows the results in the accumulators 17 of FIGURE 1 when the system is used in the operating mode with the sample numerals in FIGURES 27 and 28 as input patterns and with the linear functional masks in FIGURES 27 and 28 as reference patterns. The highest correlation occurs in each case where the input pattern corresponds to the reference pattern. In practice the invention makes use of patterns with much higher resolutions than the simple 3 x 5 patterns used in FIGURES 27 and 28, but the stability and accuracy of the system has been demonstrated even with the simple patterns.

A functional diagram of a preferred embodiment of the invention using digital circuits is shown in FIGURE 30. This diagram parallels the block diagram shown in FIGURE 1 but involves greater detail. The operation of the system will be first described for the operating mode, and then for the training mode. A specimen 201 on a matrix 203 is scanned by a flying-spot scanner 205. A phototube 207 develops a signal $f(x, y)$ indicative of the specimen. Any means of converting the specimen to electrical information could be used. In this case, the scanner and phototube illustrate on means of obtaining an electronic indication of the specimen.

The phototube 207 output is stored in two recycling shift registers 243 and 245. A clock 245 controls the timing of the circuits. At time "1*a*" a pulse is applied to the cycle control circuit 248 which supplies a series of cycling pulses to the shift registers 243 and 245 to sequentially shift the data in each register completely through the register and return the data to its original position. An "and" gate 255 and counter 257 develop the zero-shift autocorrelation function $D_S(0, 0)$, which is applied to a group of multipliers 303. At time "1*b*," a pulse is applied to appropriate "and" gates 313 to cause the elements of the reference linear functional masks for $$x'=0, y'=0$$

designated $M_{R1}(0, 0)$, $M_{R2}(0, 0)$, . . . $M_{Rn}(0, 0)$, . . . to be applied to the appropriate multipliers 303 from reference storage accumulators $D_S(0, 0)\cdot M_{Rn}(0, 0,$ . . . are developed by the multipliers and applied to a group of accumulators 327. At time "1*c*," a pulse is applied to a shift control circuit 328, which causes the data in shift register 245 to be shifted one position. The shift registers are again recycled at time "2*a*" and the counter develops an output $D_S(1, 0)$ which at time "2*b*" is multiplied by $M_{R1}(1, 0)$; $M_{R2}(1, 0)$; . . . $M_{Rn}(1, 0)$; . . . to develop products $D_S(1, 0)\cdot M_{R1}(1, 0)$; $D_S(1, 0)\cdot M_{R2}(1, 0)$; . . . $D_S(1, 0)\cdot M_{Rn}(1, 0)$; . . . These products are applied to accumulators 327 where they are added to the previously-stored products. In a similar manner, the remaining products are developed and applied to the accumulators. After all products have been developed, the accumulator outputs represent $$\sum_{x', y'} D_S(x', y')\cdot M_R(x', y')$$

for each reference R. When in the operating mode, a signal is applied by the mode switch 601 (FIGURE 30*d*) to condition a group of "and" gates 603 which pass the output of the accumulators 327 to a maximum signal indicator 330. This circuit selects the largest accumulator output as an indication of the identity of the specimen or provides a reject indication if the ratio of the largest sum to the second largest sum is insufficient or if the largest sum is negative.

Each of the sequentialy-generated elements of the autocorrelation function of the specimen is also applied to a specimen storage register 405 through an "and" gate 407, under the control of the timer 246. This data is used in a training mode to adapt the reference storage in accumulators 299 when insufficient discrimination is evidenced. In the training mode of operation, a signal is applied by the mode switch 601 to condition a group of "and" gates 605. The data stored in accumulators 327 is passed by "and" gates 605. The data stored in accumulators 327 is passed by "and" gates 605 to a group of test circuits, each comprising an adder 607, "and" gates 609, 611, 613 and 615, and inverters 617 and 619. Each test circuit is capable of performing two distinct comparisons between the applied data from the corresponding accumulators 327 and two threshold levels $+\theta$ and $-\theta$. An identification switch 621 selects the test circuit which corresponds to the correct identity of the sample pattern. For example, if the sample pattern is 1 the test circuit at the top of FIGURE 30*d* is selected by the identification switch. The selected test circuit compares the data from the associated accumulator 327 with a positive threshold $+\theta$ and provides an output signal if the accumulator output does not exceed $+\theta$. The "and" gates 611 in the test circuit selected by the identification switch is conditioned and passes $-\theta$ as an input to an adder 607. The other input to this adder is the data from the associated accumulator 327. The test with respect to the threshold $+\theta$ is accomplished by adding $-\theta$ and the adder output has a positive sign if the accumulator output is greater than $+\theta$ and a negative sign if this data is less than $+\theta$. The sign of the adder output is applied to the corresponding "and" gate 615 in the test circuit selected by the identification switch. If the accumulator 327 data is below the level $+\theta$ the adder produces a negative output which is indicated by a sign bit of "1". This signifies that a correction is needed in the system reference storage and the correction needed signal is generated by "and" gate 615. Similarly each test circuit which does not correspond to the identity of the applied sample pattern compares the data from the associated accumulator 327 with $+\theta$ which is applied through an "and" gate 609 which is conditioned by the output of an inverter 617 for all test circuits that do not correspond to the identity of the sample pattern. In this manner the outputs of the accumulators 327 which do not correspond to the identity of the sample pattern are compared to a level of $-\theta$ by the operation of the adder. When these accumulators provide output data that is more negative than $-\theta$ (indicating sufficient rejection) the adder provides a "1" (negative) sign bit which is inverted by an inverter 619 into a "0" bit indicating that no correction of reference storage is needed. When the accumulator 327 output data is not sufficiently negative in the channels that do not correspond to the identity of the sample pattern, the adder 607 provides a "0" (positive) sign bit which is inverted into a "1" bit and pass by an "and" gate 613 as the correction needed signal. This "and" gate is conditioned when "and" gate 609 is conditioned, that is, when the identification switch 21 does not select the test circuit.

Figure 30B:
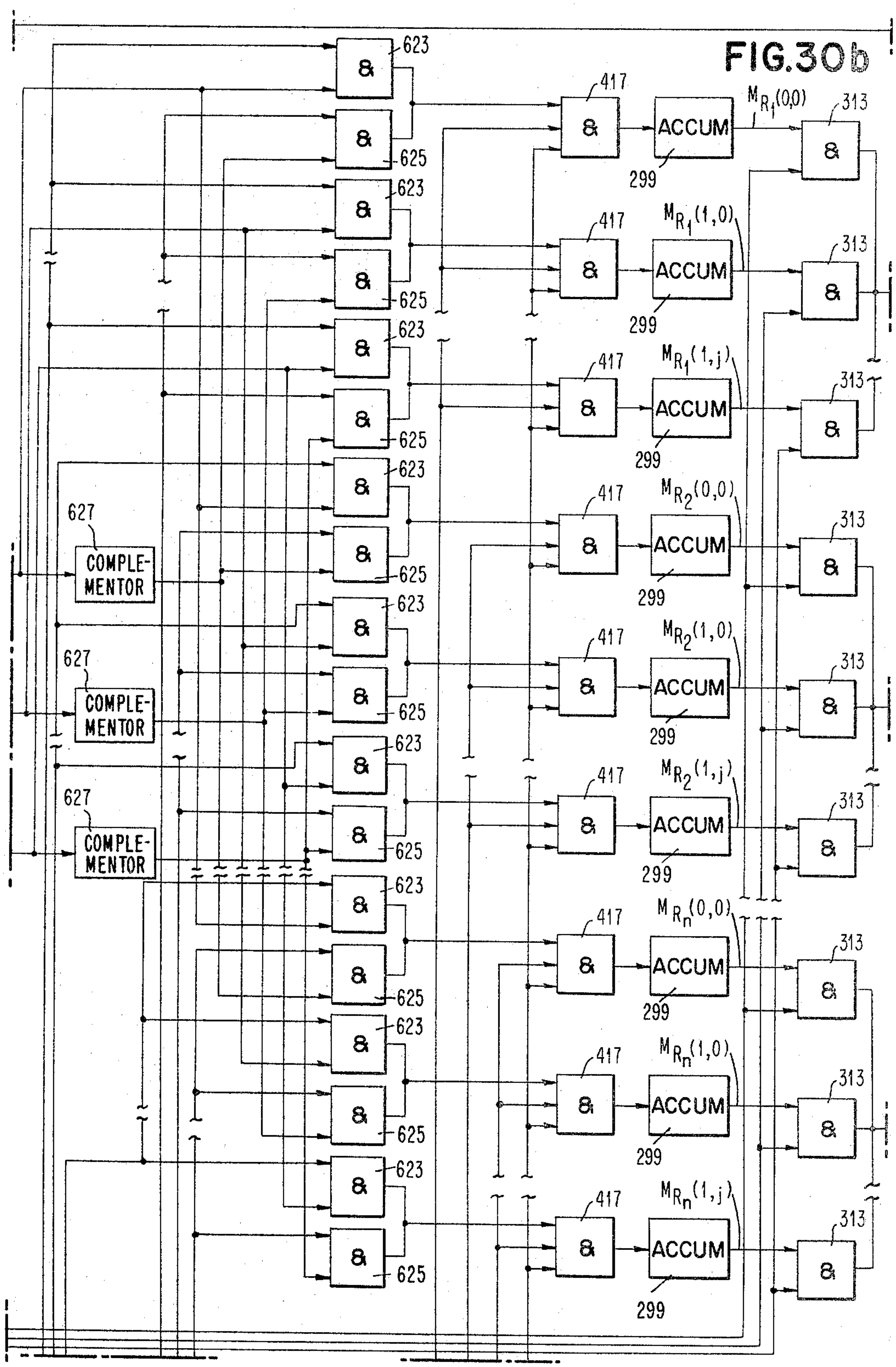
Figure 30C:
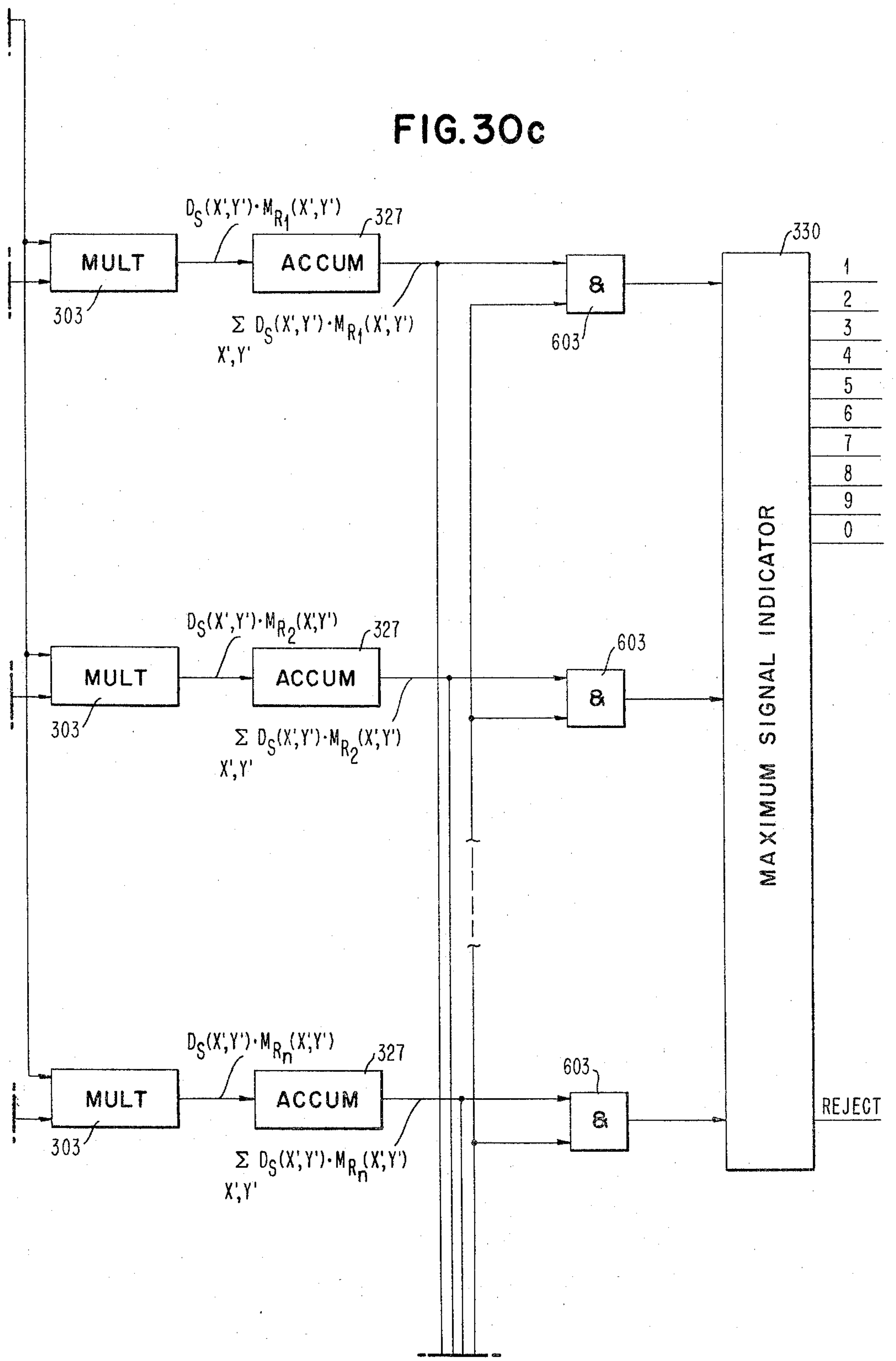
Figure 30D:
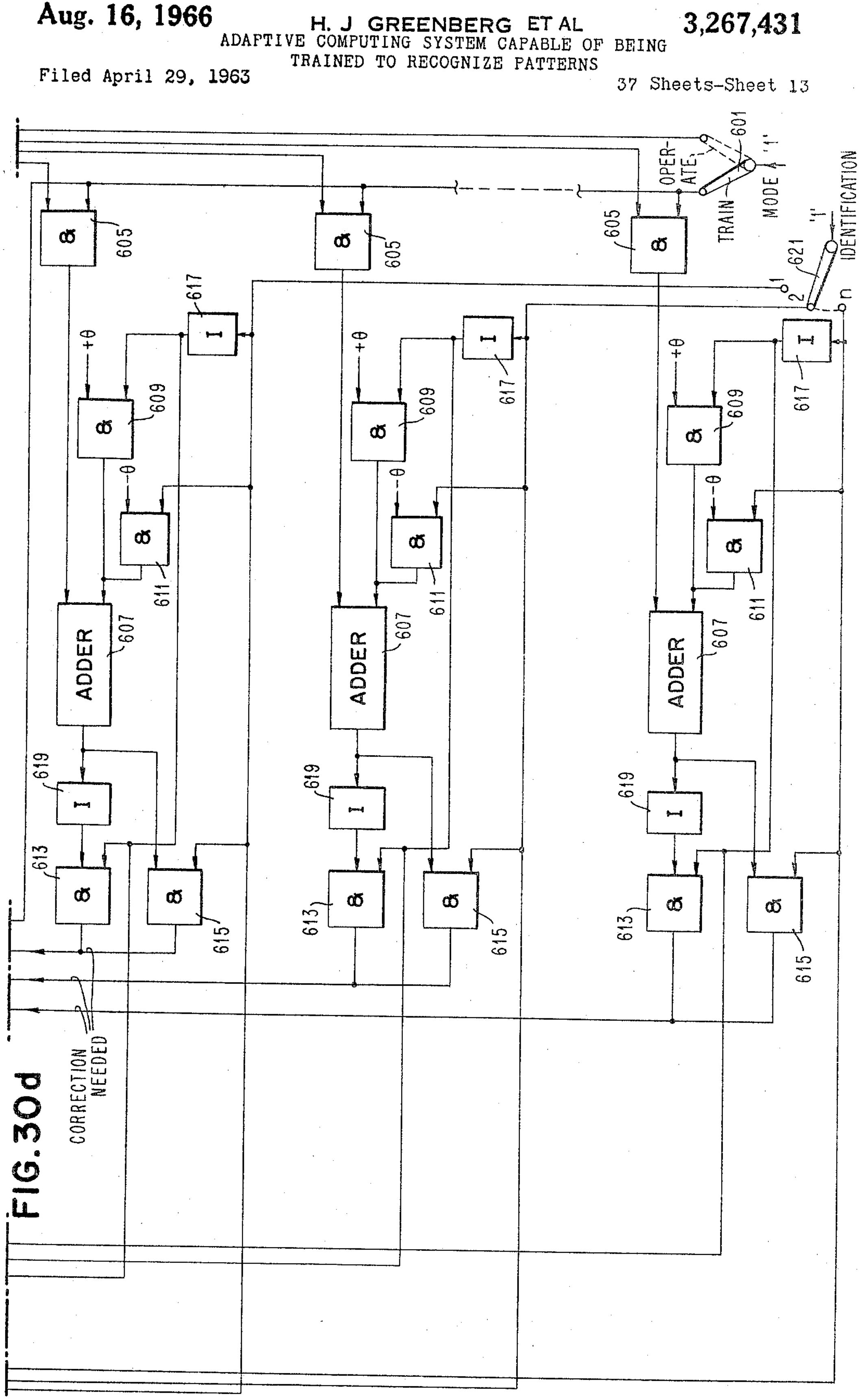

The correction needed signals from the test circuits in FIGURE 30*d* are applied to "and" gates 417 in FIGURE 30*b* to condition those "and" gates corresponding to the accumulators 327 whose stored data requires correction. Another necessary input to "and" gates 417 is the signal that is applied by the mode switch 601 (FIGURE 30*d*) when it is in the "train" position. A correction signal with the right polarity is provided as the third input to "and" gates 417 from "and" gates 623 and 625. Each "and" gate 623 passes the direct output from the corresponding specimen storage register 405, whereas each "and" gate 625 passes the uncomplemented version of the specimen data which is generated by a plurality of complementors 627. In each channel, either "and" gate 623 or "and" gate 625 are conditioned under the control of the identification switch 621 and inverters 617. The "and" gates 623 in the channel that corresponds to the identity of the sample pattern are conditioned, whereas in all other channels, the "and" gates 625 are conditioned.

In this manner, the data in the accumulators 299 is modified by the additional subtraction of the specimen data when a correction is needed as determined by the test circuits in FIGURE 30*d*.

FIGURE 31 is a schematic diagram of the invention that was described with respect to the block diagram in FIGURE 1 and the functional diagram in FIGURE 30. To the extent possible, the reference numerals of FIGURE 30 are used in FIGURE 31. A specimen 201 on a matrix 203 is serially scanned by a flying-spot scanner 205 and a phototube 207. A book authored by V. K. Zworykin and E. G. Ramberg entitled Photoelectricity and Its Application, 1949, published by John Wiley, QC715.Z8 describes a flying spot scanner and associated sweep circuits on pages 369–375.

The phototube output is presumed to be of sufficient amplitude to operate the subsequent circuitry. A photomultiplier or other suitable means of amplification is not shown as it is considered to be obvious to one skilled in the art to provide the necessary basic circuits to produce adequate signal levels. Similarly, no amplifiers are shown in any logic circuits, with the exception of circuit output drivers.

FIGURE 41 shows several waveshapes that pertain to the circuit shown in FIGURE 31. The waveshape labels correspond to similarly labelled points and leads on FIGURE 31.

A start pulse (waveshape A) initiates the operation of the pattern identification circuit. This pulse causes a single shot gate generator 209 to produce a conditioning gate on lead 211 that is one unit wide. One unit of time is defined as being the time between adjacent clock pulses (waveshape B). The first clock pulse occurring after start pulse A is thus passed through "and" gate 213 as waveshape C. This pulse serves several functions, one of which is to trigger the vertical sweep generator 204 which generates the vertical sweep (waveshape D) for the flying spot scanner 205. Since the matrix 203 is considered to have five discrete positions along each horizontal row, and nine discrete horizontal rows, the flying spot scanner sweeps horizontally nine times during each vertical sweep. Each horizontal sweep (waveshape F) is five units of time long. A five-pulse counter 215 provides a "1" output when registering a count of 0. This counter is reset to 0 by waveshape C. Another counter 217 which is also reset by waveshape C, provides a "1" output on lead 219 to "and" gate 221 when its count is lower than 8. Waveshape C triggers the first horizontal sweep for the scanner by setting counter 215 to 0, which provides a "1" output through "or" gate 223 to horizontal sweep generator 225. The fifth clock pulse B after waveshape C causes counter 215 to count past its maximum of four and the counter again registers 0, which provides a "1" output to start the second horizontal sweep (see waveshape E). In the same manner, the following horizontal sweeps are initiated. The beginning of the ninth horizontal sweep supplies the eighth pulse to counter 217 causing the counter to register 8, which terminates the conditioning gate ("1" output) for "and" gate 221. This terminates the scanner operation by causing a 0 signal on lead 219 to inhibit "and" gate 221, which removes clock pulses B from the input of counter 215.

Waveshape C also sets flip-flop 227 (through "or" gate 223) which conditions "and" gate 229. Clock pulses which are delayed one-half unit by delay 231 are also supplied to "and" gate 229. The clock pulses passed by this "and" gate (waveshape G) condition "and" gate 231 to enable it to pass the video output of the phototube 207 at intervals during the sweep of the scanner. Waveshape H shows the approximate video output of the phototube for the input specimen 3. The one-half unit delay 231 causes the phototube output to be sensed as the scanning beam is approximately at the center of each area of matrix 203. Waveshape I indicates the signal present at the output of "and" gate 231 for an input specimen 3.

A counter 233 is reset to 0 by waveshape C. This counter provides two outputs; one at a count of 44 and one at a count of 45. The 45th clock pulse passed by "and" gate 229 provides an output from counter 233 that resets flip-flop 227, thus inhibiting "and" gate 229 and preventing further passage of video by "and" gate 231. Since the counter is read-out to reset flip-flop 227 at a count of 45, there are 45 intervals of time during which the flip-flop is set and "and" gate 229 is conditioned. The forty-five pulses from "and" gate 229 (waveshape G) are also applied to another "and" gate 235. The forty-fifth of these pulses is inhibited by waveshape K, which is a 1½ unit inhibit signal begun by the counter "read-out at 44" (waveshape J). The output of "and" gate 235 is delayed one-half unit by delay 237 to provide a pulse train (waveshape L) that is in phase with the clock pulses (waveshape B).

Two 45-position shift registers 243 and 245 are each reset by waveshape C. The 44 pulses in waveshape L are applied through "or" gates 247 and 249 to shift the registers 44 times. Since the shift pulses (waveshape L) are in phase with the clock pulses (waveshape B), the shifts occur between successive video pulses from "and" gate 231. Thus, one-half unit after the first video signal (from the first area of matrix 203) is passed through "and" gate 231 into the first positions of the shift registers 243 and 245, the first of the 44 shift pulses (waveshape L) shifts this data into the second order of each shift register. Another one-half unit later, the video signal corresponding to the second area of matrix 203 is placed into the lowest-order of each shift register. After 44 successive shifts the 45 video representations of the discrete areas of matrix 203 are stored in each shift register.

Figure 32:
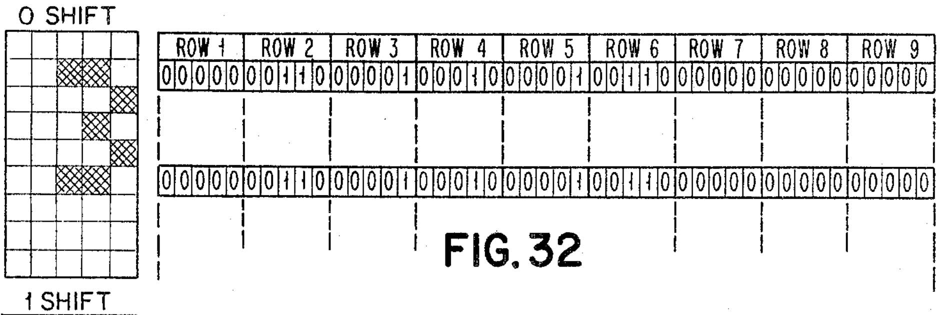
Figure 33:
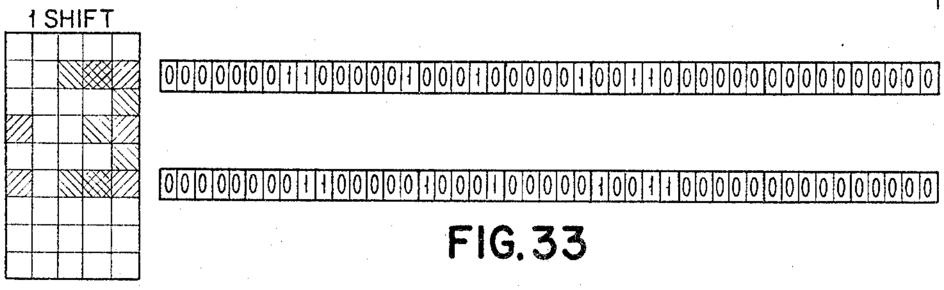
Figure 34:
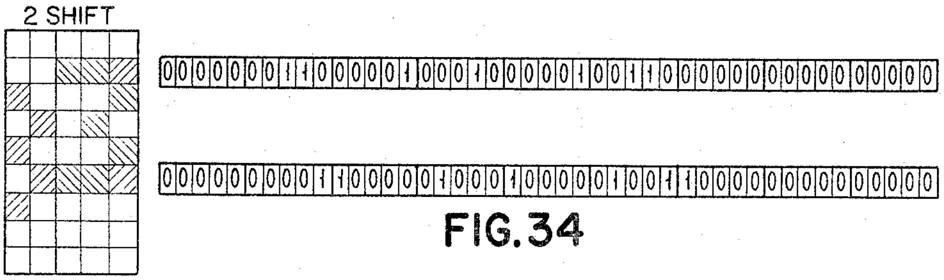
Figure 35:
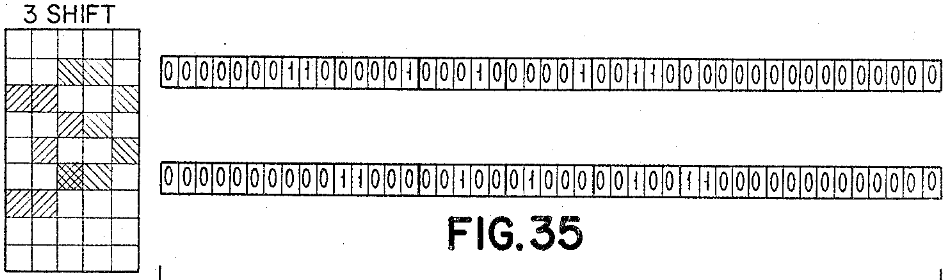
Figure 36:
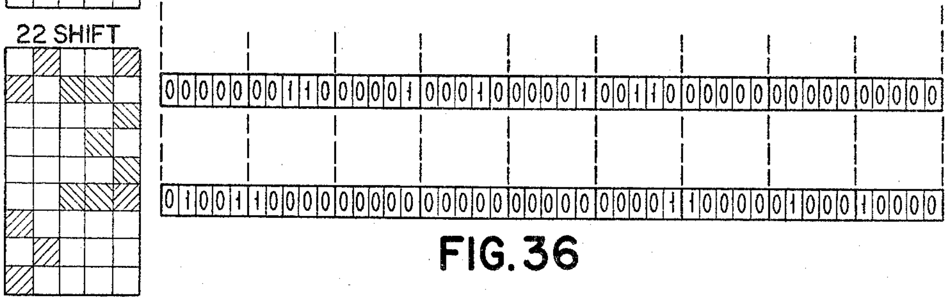

FIGURES 32–39 show the subsequent operation of the shift registers 243 and 245 and their associated circuitry in developing the autocorrelation sums. Following this paragraph will be a detailed electrical description of the operation of the shift registers. Each of FIGURES 32–39 show two 45-bit binary words indicating the bits stored in the shift registers 243 and 245 as the autocorrelation function is generated. The upper binary word is the same in all figures and represents the data in shifting register 243 corresponding to an uncentered input specimen "3" indicated on the matrices in FIGURES 32–39 by "slant-left" lines. The lower binary word indicates the data in shift register 245. This word is obtained by shifting the data in the upper binary word by the amount indicated. The shift registers described are of the recycling type as shown in FIGURE 14, where bits in the last position of the register are shifted into the first position. The "slant-right" lines in the matrices show the positions of the shifted specimen "3" corresponding to the lower binary word. The bits in the upper word are compared with the bits in the lower word and a count made of the number of coincident bits. This count provides the data for the autocorrelation table of FIGURE 40. FIGURE 32 shows the condition of the shift registers during the initial operation, after being filled with the binary data pertaining to the input specimen "3" (as described in the last paragraph). There are seven coincidence bits, providing the "7" at the center (position 0) of FIGURE 40. FIGURE 33 shows the condition of the shift registers during the second operation—the lower binary word is shifted one position. This corresponds to shifting the input specimen to the right one unit. Note the shifted specimen (slant-right lines) on the matrix is partially on the left side of the matrix. There are now two coincident bits (bit number 4 in row 2 and bit number 4 in row 6) providing the "2" at position 1 of FIGURE 40. FIGURE 34 shows the conditions present after two shifts, indicating 0 coincident bits, providing the "0" at position "2" of FIGURE 40. As the shifting is continued (after three shifts) the shifted specimen takes the shape of the 3 on the left side of the matrix, one row lower than the unshifted (short-left lines on the matrix) specimen (FIGURE 35). After three shifts, there is one coincident bit (bit number 3 of row 6), providing the 1 at position 3 of FIGURE 40. Continued shifting provides the remainder of the data for the table in FIGURE 40. FIGURE 36 shows the conditions present after twenty-two shifts. The lower word in FIGURE 36 shows three bits (numbers 2 and 5 of row 1 and number 1 of row 2) that have entered the left end of the word from the right. The shifted specimen (slant-right lines) has begun to enter at the top of the matrix, corresponding to bits entering the left end of the lower word. There are no coincident bits after twenty-two shifts, providing a "0" at position 22 of the table in FIGURE 40 (corresponding to shifting the specimen to the right two units and down four units). FIGURE 37 shows the conditions that would be present after twenty-three shifts, providing 0 coincident bits. This corresponds to a shift to the left two units and down five units, which is comparable to the shifting to the left two units and up four units, because the matrix has nine rows. For example, on the matrix of FIGURE 37, bit 246 is shifted into bit 248 (left two units and down five units), and bit 250 is shifted into bit 252 (left two units and up four units). This shift provides the data to be entered into the table of FIGURE 40 at position 23. The 23rd and all subsequent shifts provide data for the upper portion of the table of FIGURE 40. Due to the symmetry of the table, this data is redundant. FIGURE 36 shows the conditions that would be present after 44 shifts, providing a "2" at position 44 of the table of FIGURE 44. Finally, FIGURE 39 shows that forty-five successive shifts would provide the same results as was obtained before shifting (FIGURE 32). The same autocorrelation results are obtained (FIGURE 40) by this method as were obtained (FIGURE 36) by the more straight forward method outlined with respect to FIGURES 18–25. If input specimens of size *"m"* by *"n"* are to be identified, the input matrix must be of size $2m-1$ by $2n-1$ (or larger).

Figure 31C:
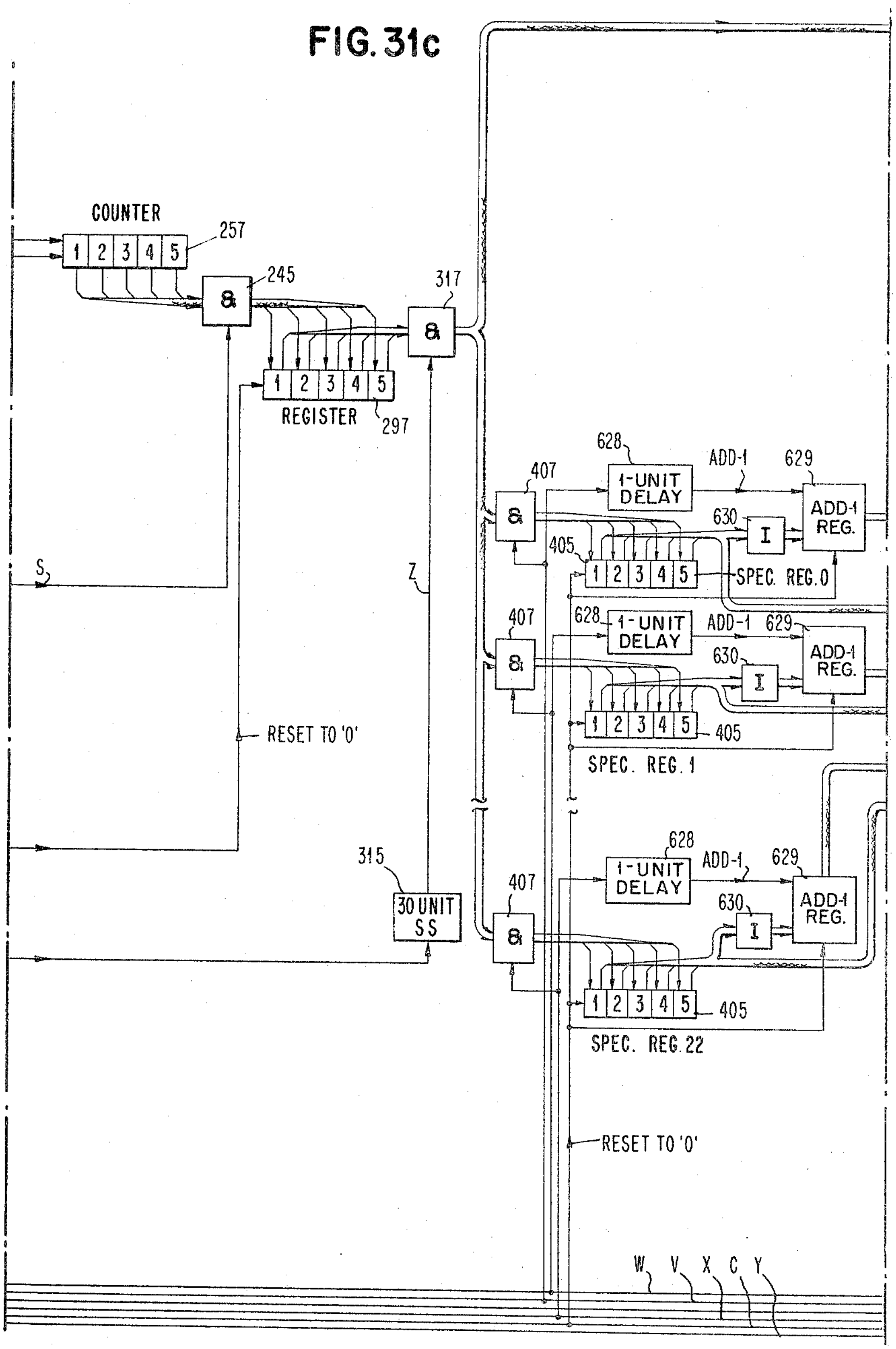

The operation of the shift registers and their associated circuitry to sequentially develop the 23 nonredundant sums is indicated in the tables of FIGURES 32–39. The sums are accumulated in counter 257 (FIGURE 31*c*). The counter 233 "read-out at 45" is passed through "or" gate 258 (first pulse of waveshape M) and through "and" gate 259 to set flip-flop 261, which provides a conditioning signal (waveshape N) for "and" gate 263. The function of "and" gate 259 is explained below. The succeeding 45 clock pulses are passed through this "and" gate (waveshape P) and through "or" gates 247 and 249 to simultaneously shift each register 243 and 245 forty-five times. Since the output of the 45th position of storage is fed back to the first position of storage in each shift register, each register returns to its initial condition after the 45 successive shifts. As the registers are shifted, an "and" gate 255 passes count pulse to counter 257 whenever the bits in the 45th order of the registers are "1's." Since identical video data is applied to both shift registers, the counter 257 records the sum of video bits during the first stage of operation (as shown in FIGURE 32). The operation of two-unit single shot 277, inverter 279 and "and" gate 281 is explained below.

A 45-pulse counter 265 provides an output waveshape Q which is fed through "or" gate 267 to reset flip-flop 261, thus inhibiting the operation of "and" gate 263 after 45 pulses have passed. As flip-flop 261 is reset, a pulse is applied through "and" gate 269 one-unit single-shot 271. The output of this single-shot conditions "and" gate 273 which passes the subsequent clock pulse. "And" gate 269 is inhibited for one unit of time after the occurrence of waveshape C through the action of one unit single-shot 283 and inverter 285. This insures that no signal (waveshape S) will be generated when flip-flop 261 is initially reset (by waveshape C).

Waveshape S is applied through "or" gate 249 to shift the data in shift register 245 one position. This corresponds to shifting the pattern 201 on matrix 203 one unit as explained above. FIGURES 33 through 39 illustrate the operation of the shift registers during various data shifts. Waveshape S is also applied through a one-half unit delay 287, "or" gate 258 and "and" gate 259 to set flip-flop 261 for the second phase of operation (waveshape N). Delay 287 insures that the flip-flop 261 is not reset before register 245 is shifted. Thus, the registers 243 and 245 are shifted 45 times to cause a sum of coincidence of "1" signals to be accumulated in counter 257, then counter 245 is shifted one position, and each counter is again shifted 45 times. In this manner, the autocorrelation sums (FIGURE 40) are sequentially obtained.

Waveshape S also conditions "and" gate 295 to pass the accumulated total in counter 257 to the subsequent stages and after a delay of one unit in delay 296 resets counter 257 (waveshape U). This delay 296 insures that the counter 257 output will be passed to the subsequent stages before the counter is reset.

The output of the 45-pulse counter 265 (waveshape Q) initiates the operation of a two unit single-shot 277 which provides a positive gate to inverter 279. The inverter output (waveshape R) inhibits the operation of "and" gate 281 during the time that shift register 245 is shifted one unit (by waveshape S). This prevents a possibly erroneous signal from being applied through "and" gate 255 to counter 257 during this shift.

A ring counter 298 provides timing for the subsequent circuits. This counter provides a "1" output on only one output lead at a time. The counter is set to its zero output by waveshape C. An output is developed from its first stage (waveshape V) after the first occurrence of waveshape S. Successive inputs step the counter through its 24 positions. Waveshape W is developed by the second input to the ring counter; waveshape X by the 23rd input; and waveshape Y by the 24th input. One of the functions of waveshape Y is to trigger 2-unit single-shot 291 which provides an output through inverter 293 to inhibit "and" gate 259 (waveshape T). This stops the automatic recycling of flip-flop 261 and shift registers 243 and 245 after 23 input character shifts have been completed.

The sums accumulated in counter 257 are passed through "and" gate 295 at the appropriate time to register 297. The number stored in this register is simultaneously applied to a group of multipliers 303 where it is multiplied by a number stored in one storage accumulator 299 of each of the ten 23-accumulator groups shown in FIGURES 31*d*, *e* and *f*. The first number stored in register 297 is multiplied by the number stored in the "1" accumulator-0 299 in "1" multiplier 303. This product is stored in the "1" accumulator 327 (FIG. 31*g*). At the same time, "2" multiplier 303 multiplies the number stored in register 297 by the number stored in "2" accumultor-0 299 and applies the product to the "2" accumulator 327. Simultaneously, the number stored in register 297 is multiplied by the number stored in the appropriate accumulator 299 and the products stored in the appropriate accumulator 327. The second number developed by counter 257, indicating the autocorrelation sum for a shift of one unit, is subsequently stored in register 297 and simultaneously multiplied by the number stored in "1" accumulator-1, '2' accumulator-1, etc. through '0', accumulator-1. Ten multipliers are used in this embodiment; one for each of the patterns to be identified. If serial multiplications were to be used, only one multiplier would be needed. Since 23 individual autocorrelation sums are computed when a 5 x 9 matrix is used, 23 accumulators 299 are used for each reference pattern.

The data stored in accumulator 299 represents the linear functional masks which are developed during the training mode of operation, as described above. The detailed circuits which perform this function during the training mode of operation are shown in FIGURES 31*c*, *d*, *e*, *f* and *g* and will be described in detail after the description of the system in the operating mode (wherein it is presumed that the accumulator 299 contain appropriate data). The appropriate number for storage in each of the registers in a group is dependent upon the order of generation of sums in counter 257 by the circuit of FIGURES 35*a*–*b* and is controlled by a group of "and" gates 313. FIGURE 44 shows the autocorrelation function for the pattern '3' with its elements labelled '0', '1', '2', etc., through '44', indicating their order of generation. The number labelled '0' is placed in '3' register-0, the number labelled '1' is placed in '3' register-1, etc. through '22' which is placed in '3' register-22. All numbers must be doubled except the numbers placed in the '1' register-0, '2' register-0, etc., through '0' register-0 to account for the reflected numbers corresponding to 23, 24, 25 . . . shifts which are not developed by the circuit of FIGURE 35 as they are the same as the numbers developed by the first 22 shifts.

The ring counter 298 (FIGURE 35*b*) controls the timing of the operation of a group of "and" gates 313, insuring that the data in the accumulaors 299 is applied to the multipliers 303 at the appropriate time. For example, the data in the '1' accumulator-0, '2' accumulator-0, etc. is applied to the multipliers after generation of the 0-shift autocorrelation sums; the data in the '1' accumulator-1, '2' accumulator-1, etc. are applied after generation of the 1-shift autocorrelation sum, etc. until finally, the numbers in the '1' accumulator-22, '2' accumulator-22, etc. are applied after the 22-shift (final) autocorrelation sum is obtained. Waveshape Q resets register 297 one unit of time before waveshape S conditions "and" gate 295 to pass the accumulated sum from counter 257 to the register. One unit of time later than waveshape S (due to the two-unit delay 314 operating on waveshape Q), a 30-unit single-shot 315 provides a conditioning level (waveshape Z) to "and" gate 317. The multiplier outputs are added to the associated accumulators 327 twenty units of time after "and" gate 317 is conditioned due to the action of delay 325. This delay provides time for the multipliers to develop their outputs. The twenty-fourth sum (caused by the twenty-third shift) accumulated in counter 257 is not used. Its development is automatic due to the use of 24 level ring counter 298. This sum is disregarded because only 23 autocorrelation sums are needed with a 5 x 9 input matrix 203. This sum is passed by "and" gate 317 to the multiplier, but there are no registers to provide the second factor required for multiplication, so the product is zero and does not affect the sums in accumulators 327.

Figure 31D:
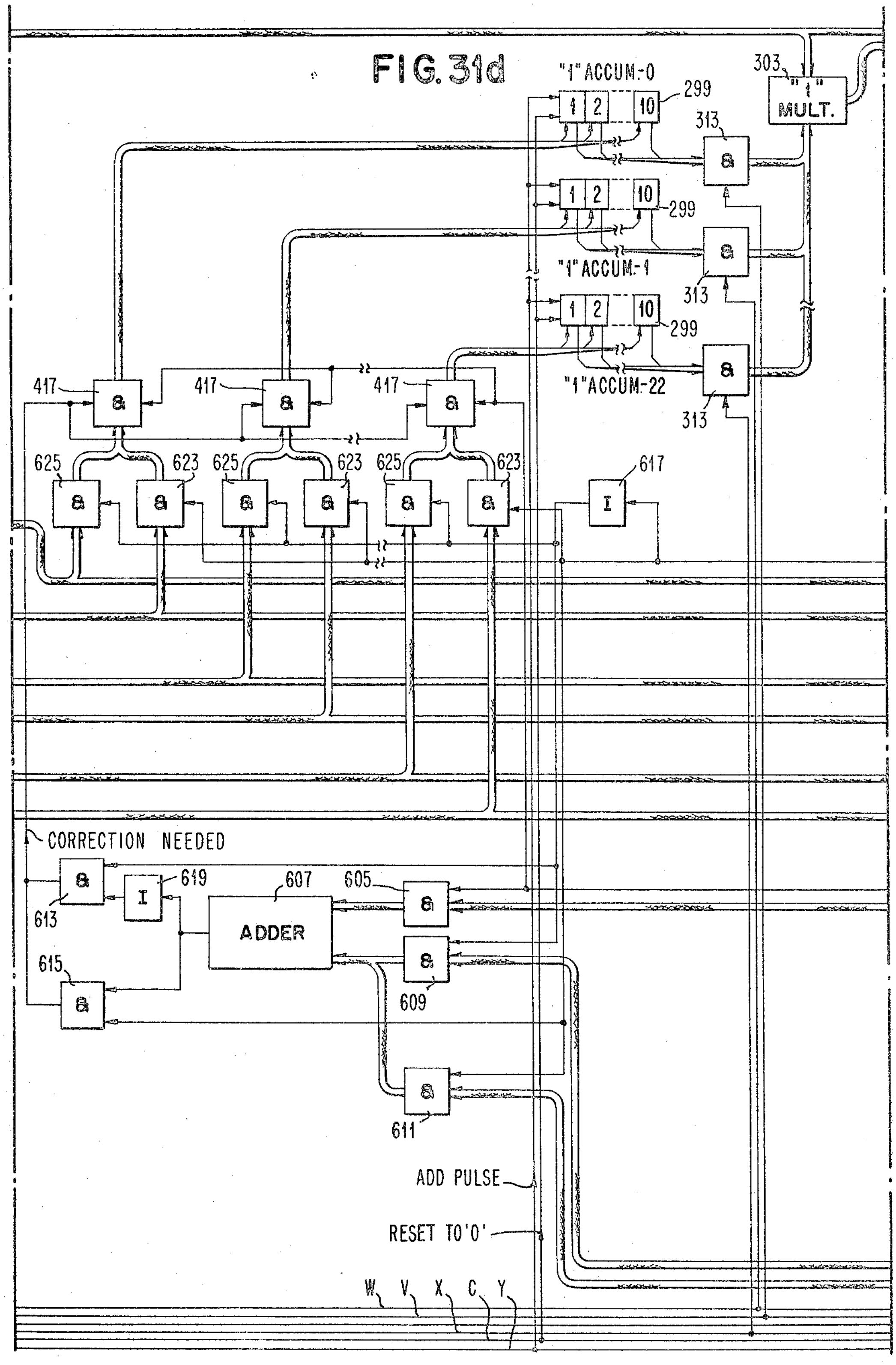
Figure 31E:
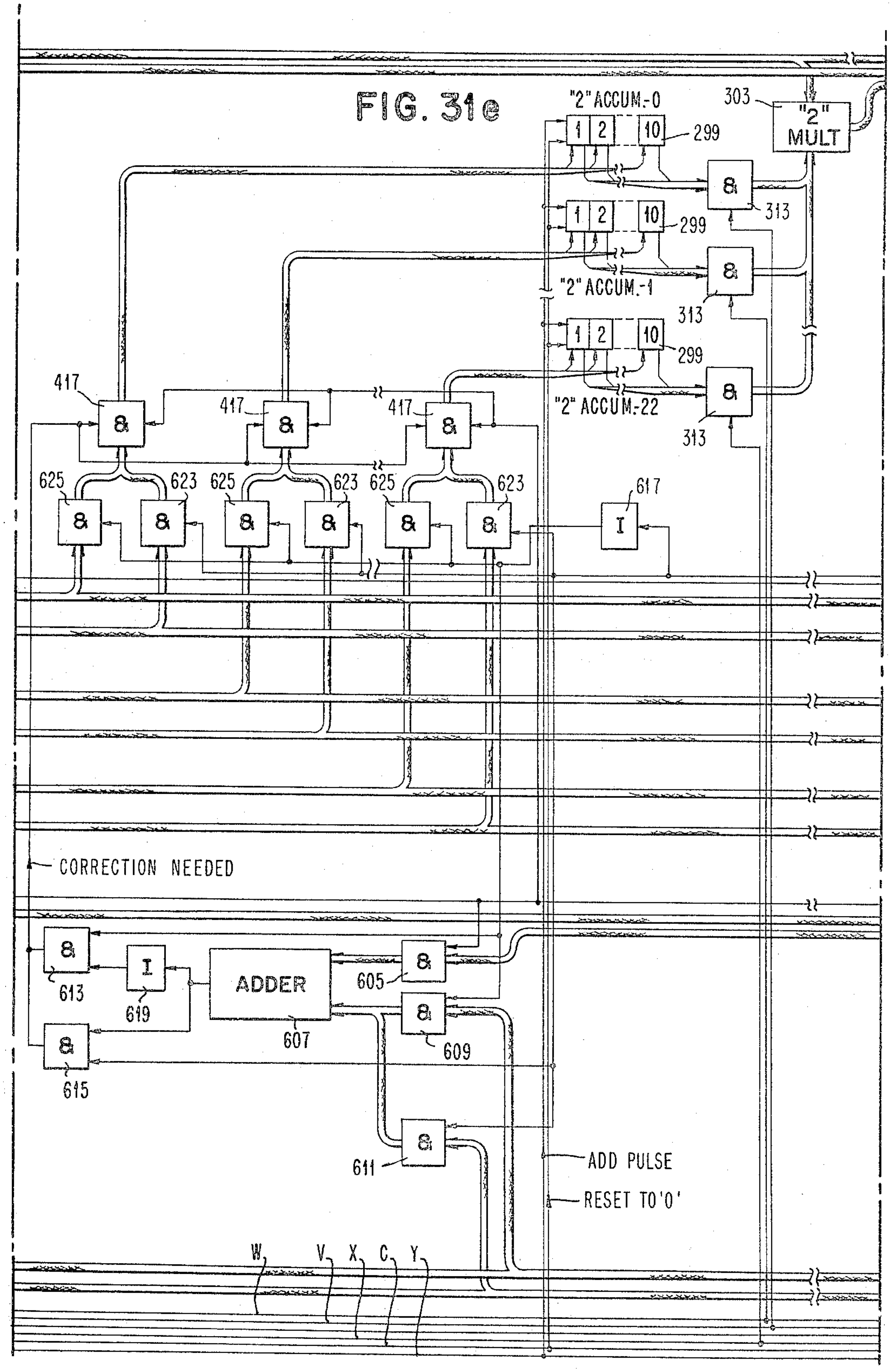
Figure 31F:
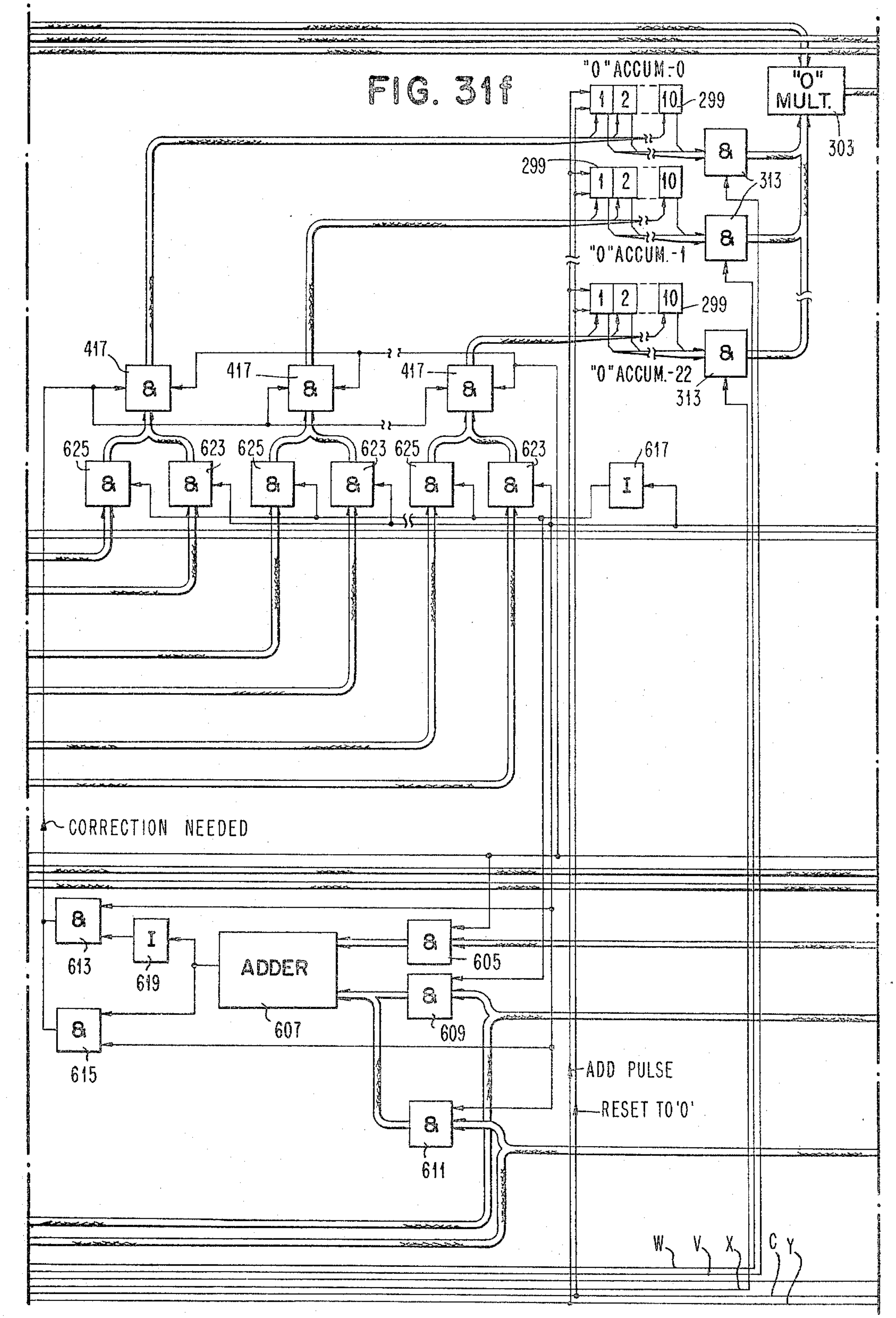
Figure 31G:
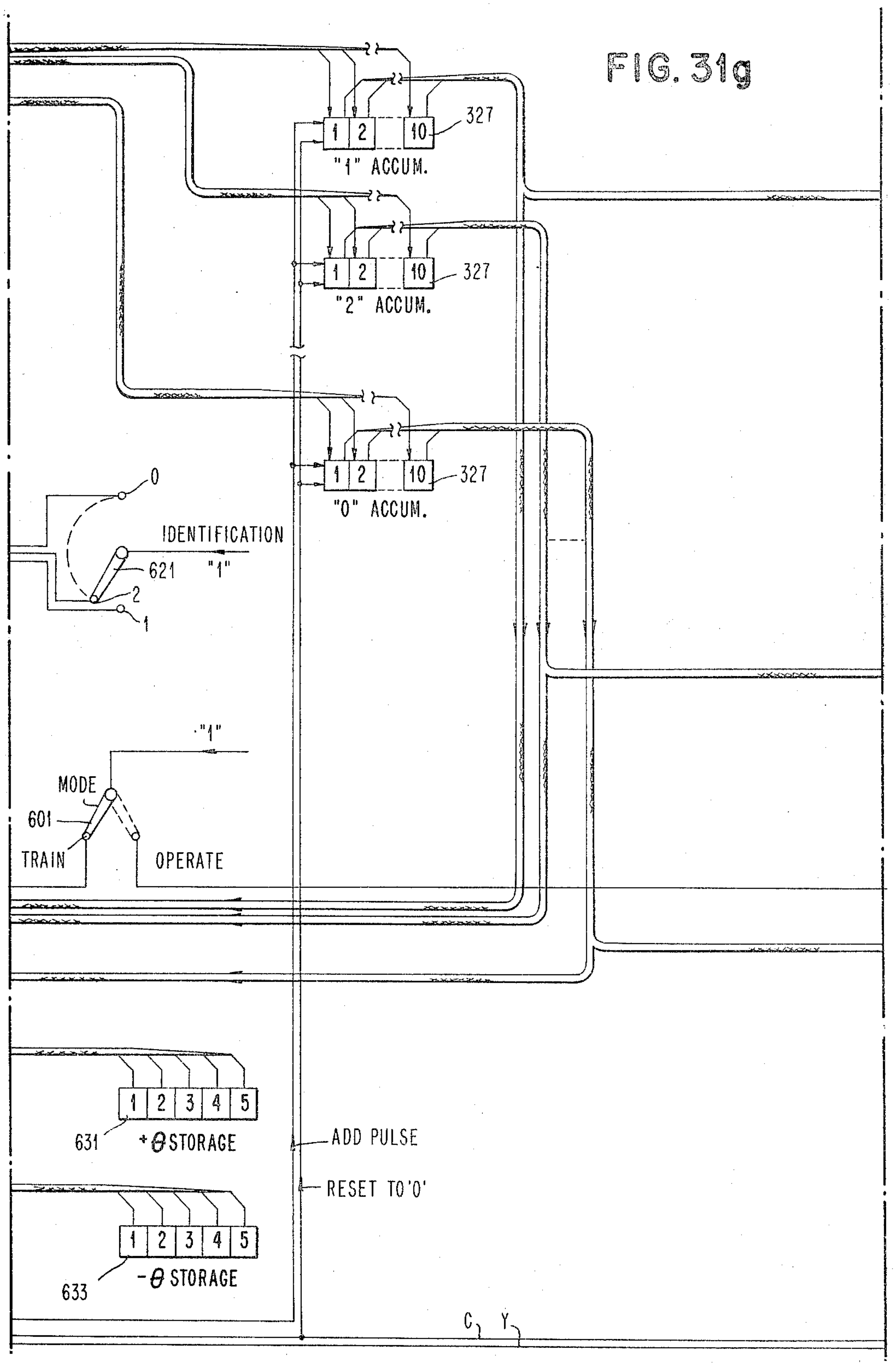
Figure 31H:
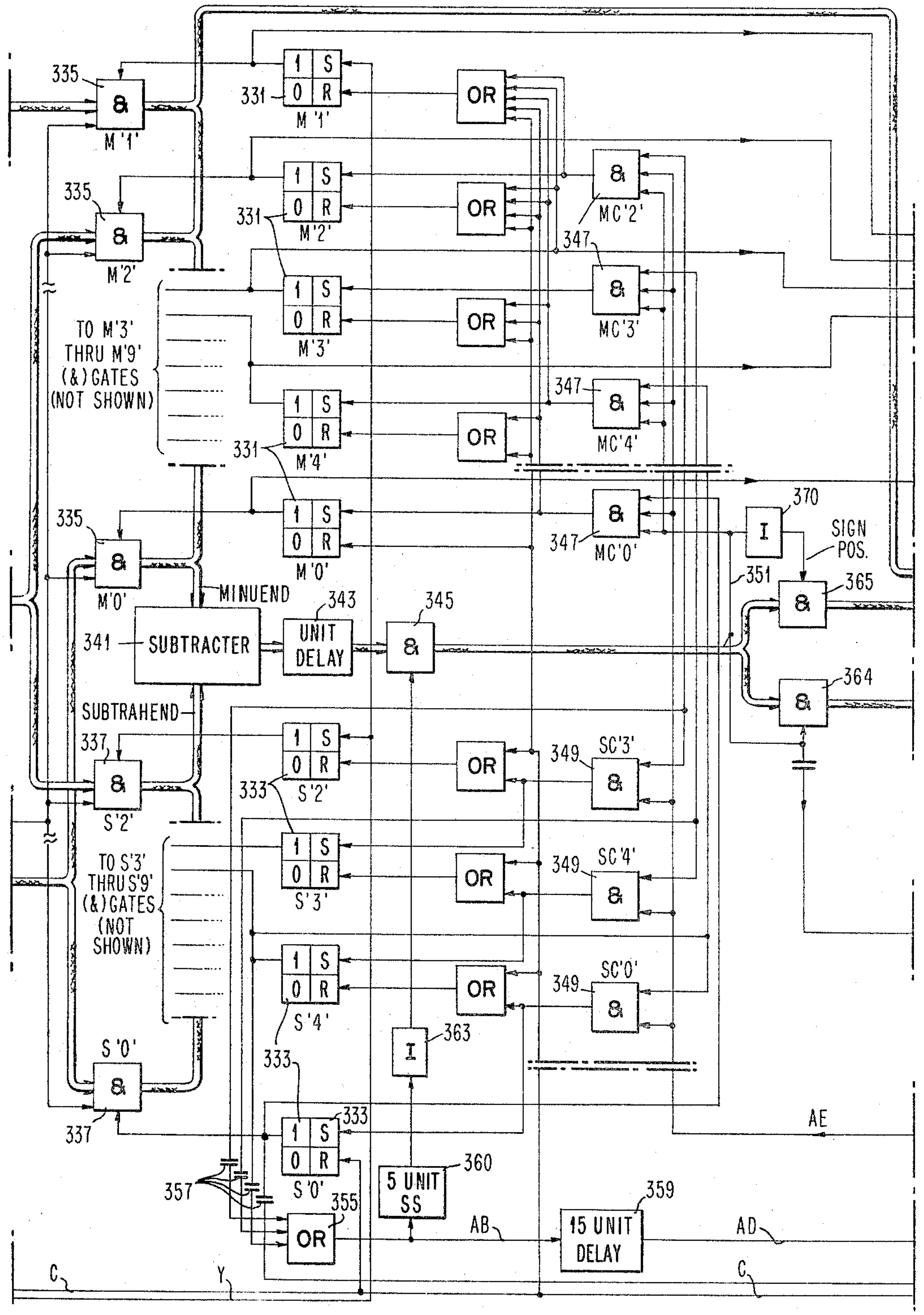

The maximum signal indicator circuits on FIGURES 31*h*, *i* and *j* have two function: first, to determine which accumulator 327 has the largest output signal after the termination of the multiplications and second, to indicate whether the difference between the largest signal and the next-largest signal number is sufficiently great to indicate definite, unambiguous identification and that the largest sum is positive.

This determination is made on a ratio basis—a reject is indicated when the second-largest signal is within a pre-established percentage of the largest accumulated sum or when the largest signal is negative. Ten minuend flip-flops 331 and nine subtrahend flip-flops 333 control ten minuend "and" gates 335, and nine subtrahend "and" gates 337 respectively. A subtractor 341 sequentially compares the signals from the accumulators 327, under the control of the minuend and subtrahend "and" gates 335 and 337. During the first subtraction, the number (signal) from the "2" accumulator is subtracted from the number from the "1" accumulator. If the subtrahend is smaller than the minuend (providing a positive difference), the subtrahend is replaced by the number from the "3" accumulator. This is continued until a subtrahend larger than the minuend develops a negative difference from the subtrahend. If this occurs, the number in the subtrahend is placed in the minuend and the subtrahend contains the number from the next-higher-numbered divider. For example, if the "1" accumulator output is larger than the "2" accumulator output, but smaller than the "3" accumulator output, during the first subtraction the number from the "2" accumulator is subtracted from the number from the "1" accumulator indicating a positive difference. The number from the '3' accumulator then becomes the subtrahend of a second subtraction from the number from the '1' accumulator. Since this subtraction provides a negative difference, the third subtraction uses the number from the '3' accumulator as the minuend and the number from the '4' accumulator as the subtrahend. This continues until the number from the '0' accumulator is the subtrahend of a subtraction from a number from one of the other accumulators. Since each subtraction that provides a negative remainder causes the subtrahend to become the minuend of the subsequent subtraction, the number in the minuend (after all subtractions are completed) is the largest number from any accumulator 327.

Figure 31I:
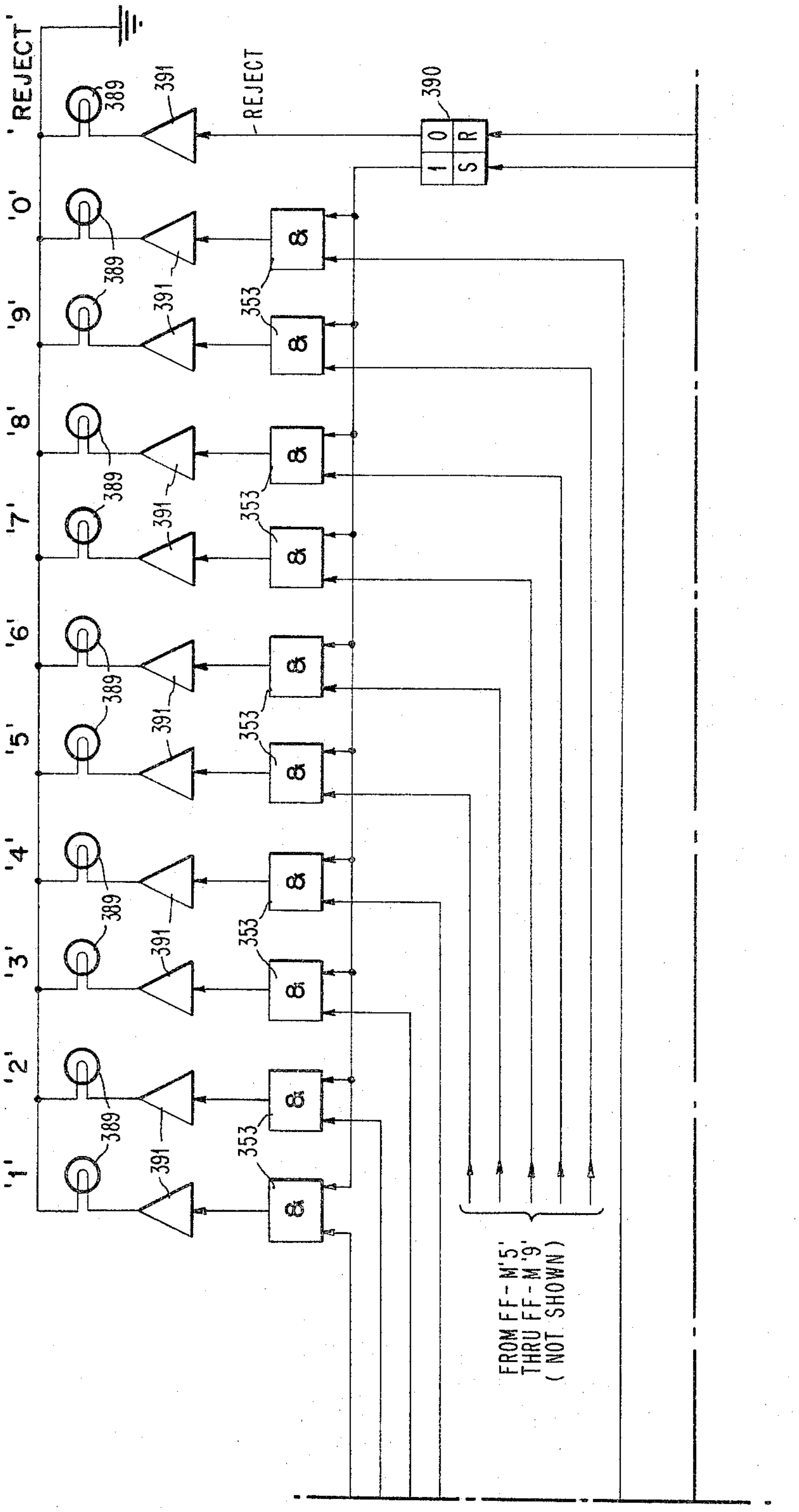

This procedure is accomplished in the circuitry of FIGURE 31*h* in the following manner. Waveshape Y from the 24th element of ring counter 298 (FIGURE 31*b*) sets the M"1" and S'2' flip-flops 331 and 333 which have outputs which condition the M'1' and S'2' "and" gates 335 and 337. These two "and" gates apply the numbers from the '1' accumulators to the minuend input of subtracter 341 and the number from the '2' accumulator to the subtrahend input of the subtracter. The subtracter output is applied through a one-unit delay 343 and an "and" gate 345 to the subsequent circuits. The operation of the one-unit delay and "and" gate will be explained below. Waveshape AE which is developed in the subsequent circuitry provides a pulse to the circuits of FIGURE 31*h* to indicate that the operations of the subsequent circuitry are completed and the next subtraction is to take place. The generation of waveshape AE will be explained below. The minuend and subtrahend of the next subtraction depends upon whether the result of the previous subtraction was positive or negative. The output of the S'2' flip-flop 333 is applied to the MC'2' (minuend control) "and" gate 347 and the SC'3' (subtrahend control) "and" gate 349. Waveshape AE is applied to all "and" gates 347 and "and" gates 349. The "sign-negative" lead 351 is applied to all "and" gates 347. The MC'2' "and" gate 347 is conditioned only when the difference of the previous subtraction is negative. Regardless of the sign of the difference of the previous subtraction, SC'3' "and" gate is conditioned. This output sets the S'3' flip-flop 333 and resets the S'2' flip-flop 333. This causes the subsequent subtraction to use the next subtrahend in order. If the difference of any subtraction is negative, in addition to substituting subtrahends, a new minuend is provided. The new minuend is the subtrahend of the previous subtraction, as explained above. In this case, the substitution of minuends is caused by the operation of the MC'1' "and" gate 347 when a negative sign is developed by the first subtraction. This operation continues as described above until the S'0' flip-flop 333 is set, causing the number from the '0' accumulator 327 to be used as a subtrahend of the subtraction. If this subtraction provides a positive difference indicating that the minuend is larger than the subtrahend, the minuend flip-flop 331 that is set during this subtraction provides an indication of the largest accumulator 327 output. If the remainder of the last subtraction is negative, the S'0' flip-flop 333 output, the sign negative signal on lead 351 and waveshape AE cause the MC'0' "and" gate 347 to set minuend flip-flop M'0.' Each minuend "and" gate 347 output in addition to setting the appropriate minuend flip-flop 331, provides a reset signal to all lower-order minuend flip-flops 331. All minuend flip-flops 331 and subtrahend flip-flops 333 are initially reset by waveshape C. Each minuend flip-flop 331 provides a "1" output to one of "and" gates 353 as an indication of the accumulator 327 providing the highest output signal (FIGURE 31*i*).

"Or" gate 355 (FIGURE 31*h*) has a pulse output (waveshape AB) as any subtrahend flip-flop 333 is set. The output of the subtrahend flip-flops is converted into a pulse by the operation of capacitors 357. This output is applied through a 15-unit delay 359 to the subsequent circuitry on FIGURE 31*j* and also to 5-unit single-shot 360. The output gate of this single-shot is applied through inverter 363 as waveshape AC to inhibit "and" gate 345. The 5-unit single-shot and associated circuitry exhibits the subtracter output during the time that it is developing its output. One-unit delay circuit 343 overcomes the effect of the inherent delays of "or" gate 355, 5-unit single-shot 360, and inverter 363, insuring that the subtracter output will be inhibited until completely developed.

Figure 31J:
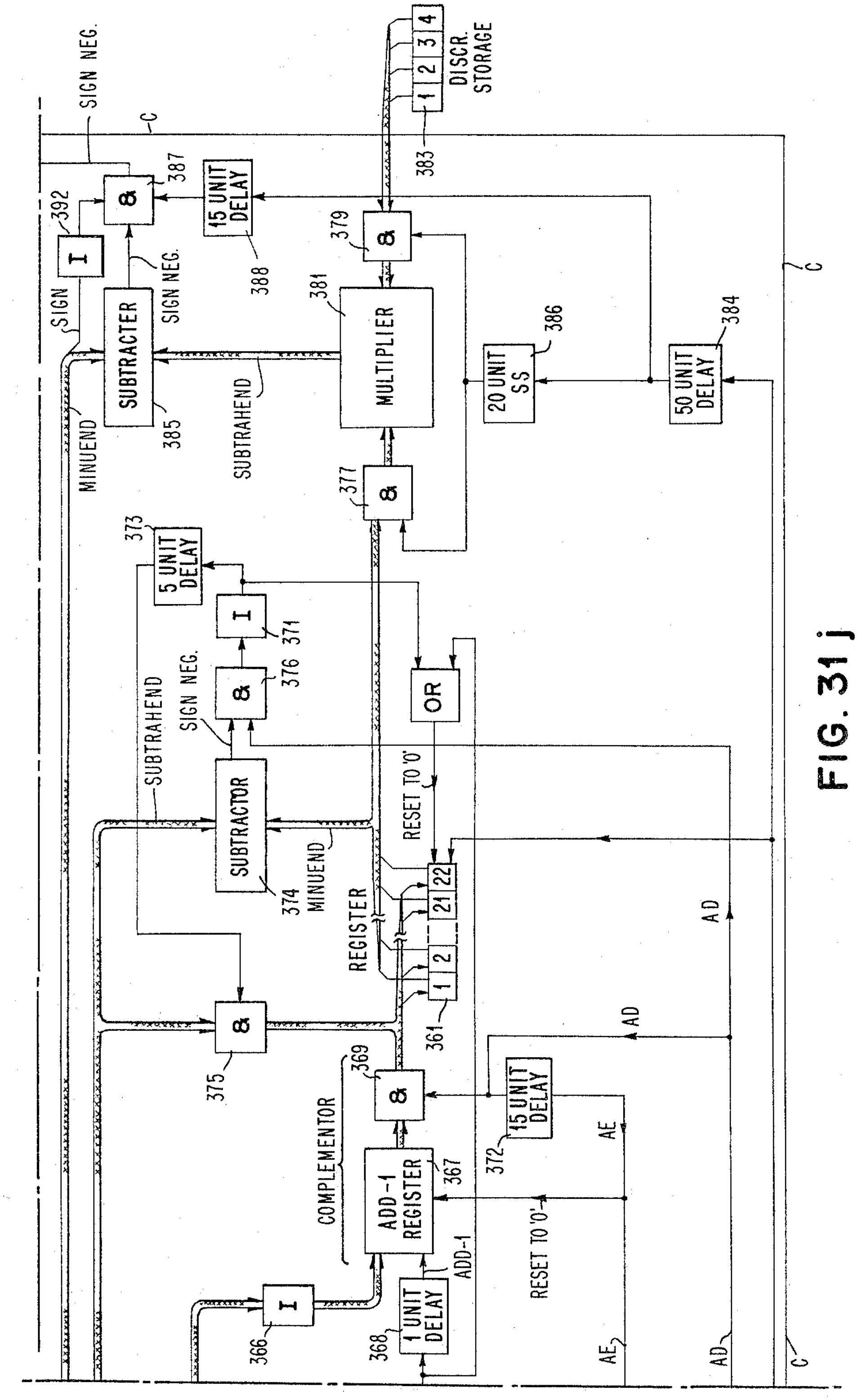

A comparison circuit, shown primarily on FIGURE 31*j* detects the difference between the largest and second-largest accumulator 327 output signals (FIGURE 31*g*), and indicates a reject if the ratio between these numbers is insufficient, or when the largest signal is negative. As each subtraction is performed by subtratctor 341, the difference obtained is compared to a difference obtained by previous subtraction and the smaller of these differences is stored for the subsequent comparisons to be made from subsequent subtractions. If the output of subtractor 341 is negative, indicating the subtrahend to be larger than the minuend, the comparison circuit stores the output of subtracter 341. No comparison is necessary in this case, as the smallest difference from the largest number used as a minuend by subtracter 341 up to the time that a negative difference is detected is always the difference between the minuend and subtrahend of the subtraction that caused the negative difference. If, however, the output of subtracter 341 is positive, it is necessary for the comparison circuit to store the difference of this subtraction only if this difference is smaller than any previous difference from the same minuend in subtracter 341. A register 361 (FIGURE 31*j*) is used as a storage element for the comparison circuit. If the output of subtracter 341 is negative, "and" gate 364 (FIGURE 35*h*) passes this output to a complementer comprised of a bank of inverters 366 (one for each bit of the twenty-two bit data) and an add "one" register 367. The complementer is necessary because the output of subtracter 341 is in the complement form when negative. It is well known that to convert a number in the "2's" complement to the actual number, it is necessary to invert each bit and add one. The addition of "1" occurs one unit of time after the subtracters 341 output is passed through "and" gate 345 due to the operation of 1-unit delay 368. This delay provides sufficient time for the register 367 to accept its input from inverters Q66. The output of the "add-1" register 367 is passed through "and" gate 369 to register 361 at the occurrence of waveshape AD which occurs 15 units of time after waveshape AB due to the operation of delay 359 (FIGURE 31*h*). This delay provides adequate time for the addition of "1" in register 367. Waveshape AE occurs 15 units of time after waveshape AD due to delay 372 and is used to reset register 367 and the previously discussed "and" gates 347 and 349 (FIGURE 35*g*). If the output of subtracter 341 is positive, "and" gate 365 (FIGURE 31*h*) is used to pass the subtracter output to the comparison circuit. "And" gate 365 requires a "sign-positive" input which is developed by inverter 370 from the "sign-negative" output of the subtracter. The output of "and" gate 365 is applied to a subtracter 374 where it is the subtrahend of the subtraction from the number previously stored in register 361. Waveshape C resets register 361 to all "1's" before it is used in the comparison circuits. The only output of subtractor 374 that is used is the sign bit. At the occurrence of waveshape AD, "and" gate 376 passes this output to inverter 371 which generates a "1" signal if the sign of the subtraction is positive. A positive sign at the output of inverter 371 indicates that the new difference obtained from subtracter 341 (FIGURE 31*h*) is smaller than the number stored in register 361 (FIGURE 31*j*). This output is delayed by five-unit delay 373 and applied to condition "and" gate 375. Delay 373 provides adequate time for register 361 to be reset to "0" before storing the new number. "And" gate 375 then passes the output of subtracter 341 to register 361. After all subtractions in subtracter 341 have been terminated, register 361 maintains the difference between the largest and second-largest sums from accumulators 327. Then, the ratio between the largest and second-largest sums is calculated and a determination made whether to accept the largest sum as an indication of the input specimen or to indicate a reject. A multiplier 381 develops the product of the number stored in register 361 and a reject constant stored in a discrimination storage register 383. This constant is determined by the minimum discrimination tolerance that is acceptable between the largest and next-largest accumulator 327 outputs. The multiplier inputs are applied for 20 units of time beginning 50 units of time after the S'9' flip-flop 333 (FIGURE 31*h*) is set due to the action of delay 384 and single-shot 386. The delay provides adequate time for the last subtraction in subtracter 341 and stabilization of the comparison circuits on FIGURES 31*h* and *j*; the single-shot 386 provides sufficient time for multiplier 381 operation. The result of this multiplication is used as the subtrahend of subtraction in a subtracter 385 from the largest accumulator 327 output. The only output of subtracter 385 that is used is the sign of the difference. If this sign is negative, indicating that the difference stored in register 361 is larger (after multiplication by the constant stored in register 383) than the largest sum from an accumulator 327, no reject is indicated (unless the largest accumulator output is negative). The "sign-negative" output of subtracter 385 is passed by "and" gate 387 when conditioned by a signal from delay 388 (which occurs 15 units of time after the multiplier 381 is conditioned to provide time for the multiplier to operate) and when conditioned by a "1" signal generated by an inverter 392, to set a flip-flop 309 (which is reset prior to identification by waveshape C). The inverter provides this "1" signal when the sign bit of the largest accumulator output is "0" indicating a positive number. The output of this flip-flop is applied to condition the "and" gates 353 and, hence operate one of ten identification lamps 389. Amplifiers 391 provide the required power to operate the lamps. If the output of subtracter 385 is positive indicating an insufficient difference between the largest and second-largest accumulator 327 outputs, the flip-flop 390 remains reset, inhibiting the operation of "and" gates 353, and supplying a signal to operate the reject lamp 389.

During the training mode of operation, the data in accumulators 299 (FIGURES 31*d*, *e* and *f*) is automatically developed as sample patterns are applied to the system input. This procedure has been described with respect to the block diagram and functional diagram (FIGURES 1 and 30) and the resulting data in accumulators 299 represents the linear functional masks described with respect to FIGURES 27 and 28. The automatic development is provided by the circuits in the lower portion of FIGURES 31*d*, *e*, *f* and *g*.

The elements of the autocorrelation function of the applied sample pattern are stored in a group of registers 405 (FIGURE 31*c*) under the control of "and" gates 407 as described with respect to FIGURE 30. The stored data is applied directly to a group of "and" gates 623, and through complementers, comprising inverters 630, delays 628, and add-1 registers 629, to another group of "and" gates 625. The complementing operation is accomplished by inverting the data and applying it to the register 629. The sampling signal to the associated "and" gate 407 is applied through a delay 628 to the register to effect the addition of "1." The delay insures that the data from register 405 is present in register 629 before the add-1 operation is commenced. Registers 405 and 629 are reset prior to operation by waveshape C. The identification switch 621 (FIGURE 31*g*) and inverters (FIGURES 31*d*, *e* and *f*) control the conditioning of "and" gates 623 and 625 such that the "and" gates 623 in the channel selected by switch 621 (corresponding to the identity of the applied sample pattern) are conditioned and "and" gates 625 in all other channels are conditioned. The outputs of the conditioned "and" gates are applied to another group of "and" gates 417 which pass the applied data to the storage registers 299 when conditioned by a signal from the mode switch 601 when it is placed at the train position and by a "correction needed" signal. The "correction needed" signal for each channel is developed when the reference storage data in accumulators 299 in the channel corresponding to the identity of the sample pattern provides inadequate positive discrimination (acceptance) or when this data in the non-corresponding channels provide insufficient negative discrimination (rejection). This function is performed in each channel, by circuits 601, 605, 607, 609, 611, 613, 615, 617, 619, and 621 as described in detail with respect to FIGURE 30. The discrimination of each channel is compared to $+\theta$ or $-\theta$ which are stored in registers 631 and 633 respectively, and when a correction is needed, a signal is applied to the corresponding "and" gates 407.

A preferred embodiment of the invention has been shown and described in detail. Another embodiment which is similar in many respects to the first embodiment is shown in FIGURE 42, and common reference numerals are used wherever possible. The circuits of FIGURES 31*a*, *b* and *c* provide the input to the circuits of FIGURE 42 as described in a block 701 in FIGURE 42*a*. In the embodiment of FIGURE 31, a separate comparison channel with storage accumulators 299 and associated circuitry is used for each reference pattern to be stored. In this embodiment (FIGURE 31) the largest comparison product is indicative of the identity of the input pattern. In the second embodiment (FIGURE 42) the amount of apparatus is diminished considerably. The input pattern is identified by comparing it to a relatively small number of linear function masks (reference storage channels) and the identification of the pattern is based on the combination of masks which provide positive discrimination. Therefore, a system with $n$ comparison channels is capable of identifying $2^n$ different patterns in the second embodiment (FIGURE 42), whereas the same system is only capable of identifying $n$ different patterns in the first embodiment (FIGURE 31).

The circuits in 42*a*, *b*, *c* and *d* are similar to the circuits of FIGURES 31*d*, *e*, *f* and *g*, respectively and are only to be described by their differences.

The storage accumulators 299 are referenced by exponential powers of the base "2"; i.e., $2^0$, $2^1$, $2^2$ (not shown), and $2^3$. Sixteen combinations are possible using these four reference channels, but only ten are required to identify the decimal digits. A decimal to binary coding matrix 703 (FIGURE 42*d*) selects a combination of the four channels corresponding to the binary number system representation of the decimal digit according to the following table:

| Decimal | Binary |
|---|---|
| 0 | 0 0 0 0 |
| 1 | 0 0 0 1 |
| 2 | 0 0 1 0 |
| 3 | 0 0 1 1 |
| 4 | 0 1 0 0 |
| 5 | 0 1 0 1 |
| 6 | 0 1 1 0 |
| 7 | 0 1 1 1 |
| 8 | 1 0 0 0 |
| 9 | 1 0 0 1 |

The coding matrix is described in detail below with respect to FIGURE 44.

The results of the comparisons between the input pattern and reference storage is developed in accumulators 327 (FIGURE 42*d*) in a similar manner to the operation of the embodiment of FIGURE 31. During the training mode of operation, this data is compared to thresholds $+\theta$ or $-\theta$ for each channel and the data in registers 299 is altered in the manner described with respect to the embodiment of FIGURE 31. In this embodiment (FIGURE 42), combinations of reference channels may provide positive discrimination (acceptance) and other combinations may provide negative discrimination (rejection). Therefore, several channels may require additive correction (through "and" gates 623) whereas, in the embodiment of FIGURE 31 where each channel corresponds to a distinct reference pattern, only one channel is considered for additive correction.

The data in accumulators 327 is applied to a decoding and reject circuit (FIGURES 42*e* and *f*) through a group of "and" gates 709 whose operation is under the control of a flip-flop 705. The flip-flop is reset prior to operation by waveshape C and is set by a signal from an "and" gate 707 when the mode switch 601 is at the operate position at the occurrence of waveshape Y. The development of data in the accumulators 327 is completed at this time and its sign bit ("0" if positive, "1" if negative) is applied as the inverted input data ($\bar{2}^0$, $\bar{2}^1$, etc.) to a binary to decimal decoding circuit 711. The sign bit is also applied to the decoding circuit through inverters 713 as the uninverted input data ($2^0$, $2^1$, etc.). The decoding matrix is described in detail below with respect to FIGURE 43. This circuit inverts the operation of the coding matrix 703 to provide a signal on one of ten leads corresponding to the decimal equivalent of the applied binary data. This signal is applied through an amplifier 391 to illustrate an output lamp 389 corresponding to the identity of the input specimen data that is applied to the system.

Figure 42E:
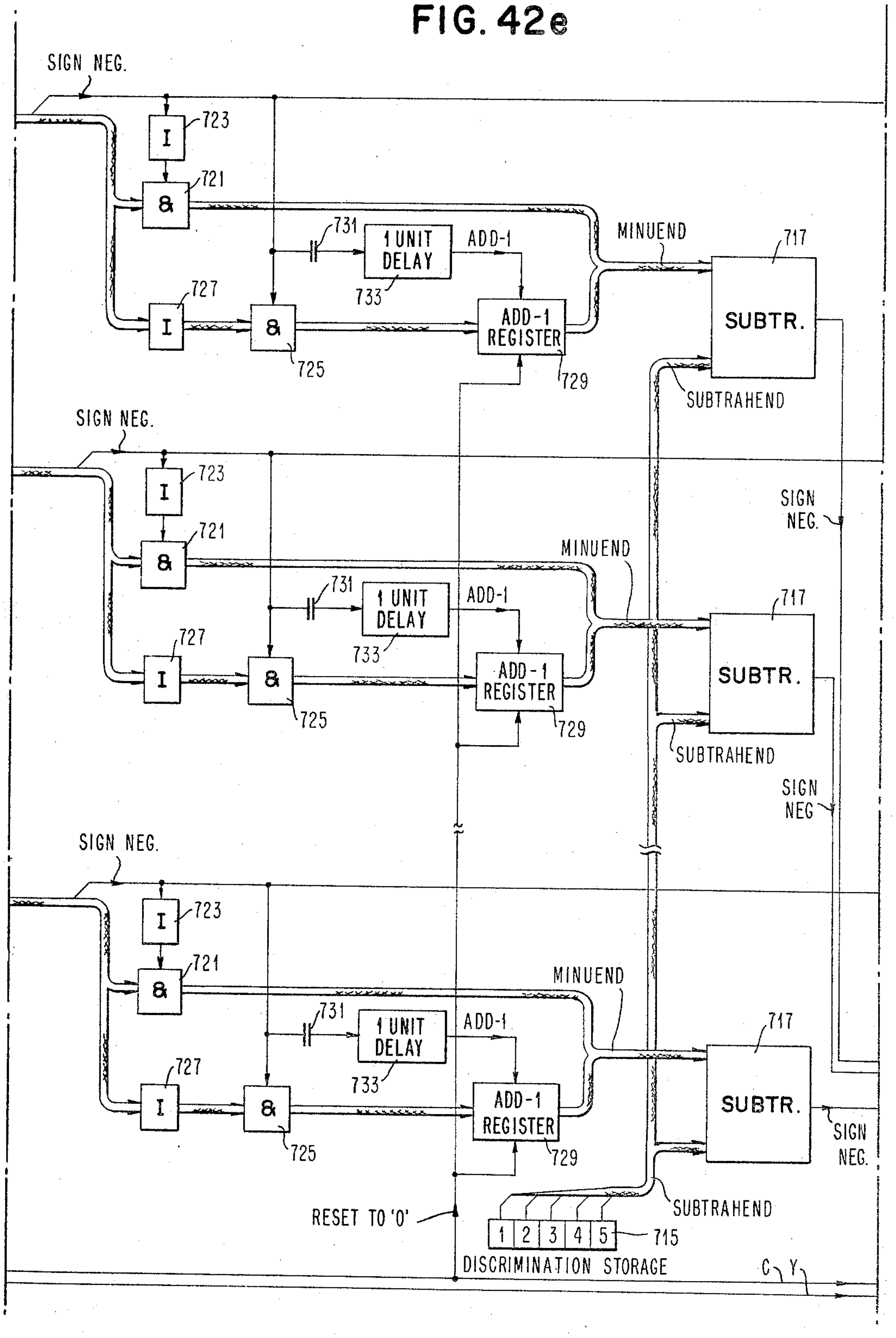
Figure 42F:
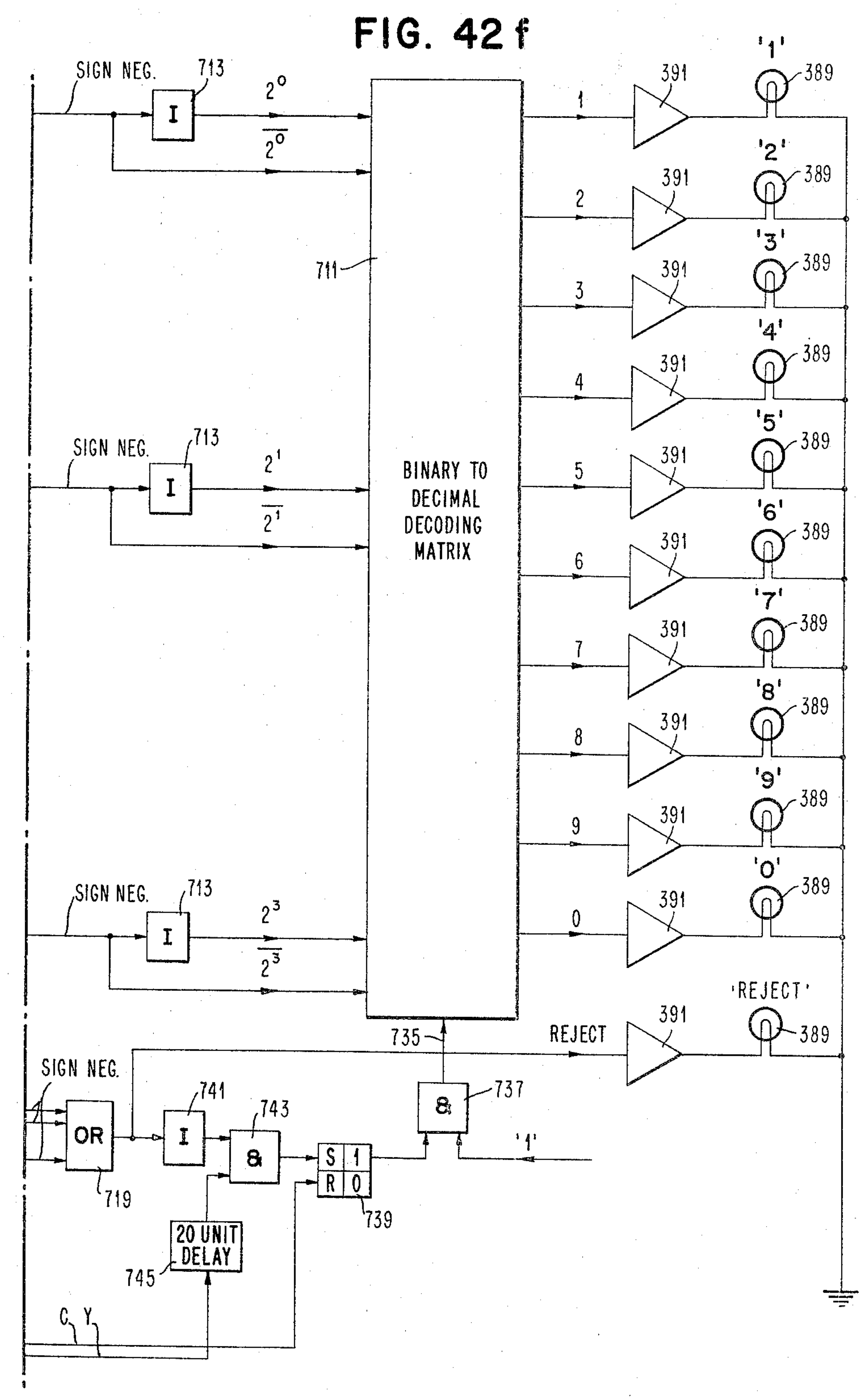

A reject indication is provided by a lamp 389 when any signal from an accumulator 327 is not sufficiently large (either positive or negative) to indicate unqualified discrimination (either acceptance or rejection). The absolute value of the data in each accumulator 327 is compared to a predetermined threshold value which is stored in a discrimination storage register 715 (FIGURE 42*e*). The comparison is accomplished in a group of subtracters 717 whose output sign bit contains a "1" signal if the result of the subtracters is negative, indicating insufficient discrimination. The outputs of the subtracters are applied through "or" gates 719 to reject amplifier 391 to cause the reject lamp 389 to be illustrated if insufficient discrimination is present. The value stored in the discrimination register 715 is usually equal to the absolute value of $+\theta$ and $-\theta$ (or the lesser of the two when they are unequal), but less stringent discrimination may be demanded of the system by utilizing a lower discrimination storage value. The minuend input to each subtracter 717 represents the absolute value of the data in the corresponding accumulator 327. When this data is positive, it is applied to the subtracter through an "and" gate 721 which is conditioned by a signal obtained by applying the sign bit (which is "0" when the data is positive) through an inverter 723. Negative data is stored in accumulators 327 in complement form and must be complemented to provide the required absolute value as the minuend to the subtracter 717. In this case, "and" gate 725 is conditioned by the sign bit (which is "1" when the data is negative) and passes the data from the accumulator 327, as applied through an inverter 727. Since the process of complementing requires the addition of "1" to the inverted version of the data, the output of "and" gates 725 is applied to a group of add-1 registers 729. These registers are reset prior to identification by waveshape C and an add-1 signal is applied after a delay which is sufficient to permit the application of data before addition. The add-1 signals are derived from the leading edges of the sign bits from the accumulators 327 (which are "1" when their data is negative) and appear when "and" gates 709 (FIGURE 42*d*) are conditioned. The sign bits are applied through capacitors 731 which generate positive pulses ("1" data) when "negative sign" bits are applied. These pulses are applied as the add-1 signals to the register 729 through delay circuits 733.

The reject data from "or" gates 719 is also used to inhibit the operation of the decoding matrix 711 when a reject is indicated. The decoding matrix requires a "1" signal in its input lead 735 if an output is to be presented. This signal is inhibited by an "and" gate 737 when a flip-flop 739 is reset. This flip-flop is reset prior to identification by waveshape C and is set by a signal generated by an inverter 741 when no reject is indicated. This signal is applied to set the flip-flop through an "and" gate 743 when the "and" gate is conditioned by waveshape Y as applied through a delay 745 after sufficient time has elapsed for the identification circuits and reject circuits to stablize in operation.

A binary to decimal decoding matrix is shown in detail in FIGURE 43. Binary data is applied along the horizontal input lines and the corresponding equipment decimal data is generated on one of the vertical output lines. The diodes associated with each vertical line in combination with the resistor in series with the vertical line form an "and" gate and provides a "1" output signal when "1" input signals are applied on each horizontal line which is connected to the vertical line by a diode. For example, the output line "5" contains a signal when the $2^2$ and $2^0$ input signals are applied and when the $2^1$ and $2^3$ input signals are not present (as signified by the presence of signals on the leads labelled $\overline{2^1}$ and $\overline{2^3}$). A decimal to binary coding matrix is shown in detail in FIGURE 44. This circuit converts decimal data to binary data. Each vertical output lead and the diodes and the resistor associated with the lead form an "or" gate, such that an output signal is provided on each vertical lead that is connected by a diode to horizontal lead which contains the signal. For example, when a signal is present on the horizontal input lead 5, an output signal is generated on leads $2^2$ and $2^0$ and not on leads $2^3$ and $2^1$.

While the invention has been particularly shown and described with reference to preferred embodiments thereof, it will be understood by those skilled in the art that various changes in form and details may be made therein without departing from the spirit and scope of the invention.

What is claimed is:

1. An adaptive recognition system for identifying a specimen based on its similarity to members of a set of reference patterns comprising, in combination:

means for generating nonrandom functions of the specimens;

means for linearly comparing the generated functions with reference functions to provide an indication of the reference pattern that is the most similar to the specimen for each specimen, where each reference function corresponds to a member of the set of reference patterns;

and selectively-controllable means responsive to the comparison means for altering the reference functions during a training mode of operation to improve the comparison between the generated functions and a corresponding reference function that is most similar, and to lessen the comparison between the generated functions and at least one other noncorresponding reference function and for providing an indication of the identity of the specimens based on their similarity to the members of the set of reference patterns, as determined by the comparison means, during an operating mode of operation.

2. The system described in claim 1, wherein the functions of the specimens are functions of autocorrelation functions.

3. The system described in claim 1, wherein the functions of the specimens are autocorrelation functions.

4. The system described in claim 1, wherein the means for altering the reference functions during the training mode linearly combine a function of the specimen with at least one reference function.

5. The system described in claim 1, wherein the means for altering the reference functions during the training mode linearly combines the nonrandom function of the specimen with at least one reference function.

6. The system described in claim 1, wherein the means for altering the reference functions during the training mode adds a function of the specimen to the corresponding reference function and subtracts a function of the specimen from at least one noncorresponding reference function.

7. The system described in claim 1, wherein the means for altering the reference functions during the training mode adds a function of the specimen to the corresponding reference function.

8. The system described in claim 1, wherein the means for altering the reference functions during the training mode subtracts a function of the specimen from a noncorresponding reference function.

9. The system described in claim 1, wherein the means for altering the reference functions during the training mode adds the nonrandom function of the specimen to the corresponding reference function and subtracts this function of the specimen from at least one noncorresponding reference function.

10. The system described in claim 1, wherein the means for altering the reference functions during the training mode adds the nonrandom function of the specimen to the corresponding reference function.

11. The system described in claim 1, wherein the means for altering the reference functions during the training mode subtracts the nonrandom function of the specimen from a noncorresponding reference function.

12. The system described in claim 4, wherein a function of the specimen is linearly combined with only those reference functions which, upon comparison, provide output signals from the comparing means which have predetermined values.

13. The system described in claim 5, wherein the function of the specimen is linearly combined with only those reference functions which, upon comparison, provide output signals from the comparing means which have predetermined values.

14. The system described in claim 1, wherein the means for altering the reference functions during the training mode adds a function of the specimen to the corresponding reference function only when the comparison to this reference function provides an output signal from the comparing means that is within a predetermined range of values, and subtracts a function of the specimen only from those noncorresponding reference functions which, upon comparison, provide output signals from the comparing means that are within a second and different predetermined range of values.

15. The system described in claim 1, wherein the means for altering the reference functions during the training mode adds the nonrandom function of the specimen to the corresponding reference function only when the comparison to this reference function provides an output signal from the comparing means that is within a predetermined range of values, and subtracts this function of the specimen from only those noncorresponding reference functions which, upon comparison, provide output signals from the comparing means that are within a second and different predetermined range of values.

16. The system described in claim 2, wherein the means for altering the reference functions during the training mode linearly combines a function of the specimen with at least one reference function.

17. The system described in claim 2, wherein the means for altering the reference functions during the training mode linearly combines the function of the specimen with at least one reference function.

18. The system described in claim 2, wherein the means for altering the reference functions during the training mode adds a function of the specimen to the corresponding reference function and subtracts a function of the specimen from at least one noncorresponding reference function.

19. The system described in claim 2, wherein the means for altering the reference functions during the training mode adds a function of the specimen to the corresponding reference function.

20. The system described in claim 2, wherein the means for altering the reference functions during the training mode subtracts a function of the specimen from a noncorresponding reference function.

21. The system described in claim 2, wherein the means for altering the reference functions during the training mode adds the nonrandom function of the specimen to the corresponding reference function and subtracts this function of the specimen from at least one noncorresponding reference function.

22. The system described in claim 2, wherein the means for altering the reference functions during the training mode adds the nonrandom function of the specimen to the corresponding reference function.

23. The system described in claim 2, wherein the means for altering the reference functions during the training mode substracts the nonrandom function of the specimen from a noncorresponding reference function.

24. The system described in claim 16, wherein a function of the specimen is linearly combined with only those reference functions which, upon comparison, provide output signals from the comparing means with predetermined values.

25. The system described in claim 17, wherein the function of the specimen is linearly combined with only those reference functions which, upon comparison, provide output signals from the comparing means with predetermined values.

26. The system described in claim 2, wherein the means for altering the reference functions during the training mode adds a function of the specimen to the corresponding reference function only when the comparison to this reference function provides an output signal from the comparing means that is within a predetermined range of values, and subtracts a function of the specimen from only those noncorresponding reference functions which, upon comparison, provide output signals from the comparing means that are within a second and different predetermined range of values.

27. The system described in claim 2, wherein the means for altering the reference functions during the training mode adds the nonrandom function of the specimen to the corresponding reference function only when the comparison to this reference function provides an output signal from the comparing means that is within a predetermined range of values, and subtracts this function of the specimen from only those noncorresponding reference functions which, upon comparison, provide output signals from the comparing means that are within a second and different predetermined range of values.

28. An adaptive recognition system for identifying specimen input patterns based on their similarity to members of a set of reference patterns comprising, in combination:

means for generating nonrandom functions of input patterns;

means for linearly comparing the generated functions with adaptively-stored reference functions to provide an indication of the degree of similarity between each input pattern and each reference function, where each reference function corresponds to a member of the set of reference patterns;

a plurality of measuring means that are operative in a training mode of operation, one for each reference pattern, each responsive to the corresponding similarity indications from the comparing means as sample reference patterns are applied as input patterns, and each for providing an indication when corresponding sample patterns are not sufficiently similar and when noncorresponding sample patterns are not sufficiently dissimilar to the corresponding reference functions;

reference function adaptation means that is operative in the training mode of operation and responsive to the indications of the measuring means for altering those reference functions corresponding to the measuring means that provide indications to improve the comparison of said corresponding sample patterns and to lessen the comparison of said noncorresponding sample patterns;

and system output means that is operative in an operating mode of operation and responsive to the comparing means as specimen patterns are applied as input patterns, for providing an indication of the identity of the applied specimen patterns.

29. The system described in claim 28, wherein the functions of the specimens are functions of autocorrelation functions.

30. The system described in claim 28, wherein the functions of the specimens are autocorrelation functions.

31. The system described in claim 28, wherein the adaptation means alters the reference functions by linearly combining them with a function of the sample patterns.

32. The system described in claim 28, wherein the adaptation means alters the reference functions by linearly combining them with the nonrandom function of the sample patterns.

33. The system described in claim 28, wherein the adaptation means alters the reference function that corresponds to the identity of each sample pattern by adding a function of the sample pattern to the reference function when the corresponding measuring means provides an indication and alters the reference functions that do not correspond to the identity of each sample pattern by subtracting a function of the sample pattern from the reference functions that correspond to measuring means that provide indications.

34. The system described in claim 28, wherein the adaptation means alters the reference function that corresponds to the identity of each sample pattern by adding a function of the sample pattern to the reference function when the corresponding measuring means provides an indication.

35. The system described in claim 28, wherein the adaptation means alters the reference functions that do not correspond to the identity of each sample pattern by subtracting a function of the sample pattern from the reference functions that corresponds to measuring means that provide indications.

36. The system described in claim 28, wherein the adaptation means alters the reference function that corresponds to the identity of each sample pattern by adding the systematic, nonrandom function of the sample pattern to the reference function when the corresponding measuring means provides an indication and alters the reference functions that do not correspond to the identity of each sample pattern by subtracting the nonrandom function of the sample pattern from the reference functions that corresponds to measuring means that provide indications.

37. The system described in claim 28, wherein the adaptation means alters the reference function that corresponds to the identity of each sample pattern by adding the nonrandom function of the sample pattern to the reference function when the corresponding measuring means provides an indication.

38. The system described in claim 28, wherein the adaptation means alters the reference functions that do not correspond to the identity of each sample pattern by subtracting the non-random function of the sample pattern from the reference functions that correspond to measuring means that provide indications.

39. The system described in claim 28, wherein the measuring means corresponds to the reference function which is similar to the sample pattern compares the corresponding indication of the degree of similarity between the sample pattern and the reference function to a first threshold and provides an indication when the threshold is not exceeded which is indicative of insufficient similarity, and wherein each measuring means corresponding to the reference functions which are dissimilar to the sample pattern compares the corresponding indication of the degree of similarity between the sample pattern and the reference functions to a second threshold and provides an indication when the threshold is exceeded which is indicative of insufficient dissimilarity.

40. The system described in claim 29, wherein the adaptation means alters the reference functions by linearly combining them with a function of the sample patterns.

41. The system described in claim 29, wherein the adaptation means alters the reference functions by linearly combining them with the nonrandom function of the sample patterns.

42. The system described in claim 29, wherein the adaptation means alters the reference function that corresponds to the identity of each sample pattern by adding a function of the sample pattern to the reference function when the corresponding measuring means provides an indication and alters the reference functions that do not correspond to the identity of each sample pattern by subtracting a function of the sample pattern from the reference functions that correspond to measuring means that provide indications.

43. The system described in claim 29, wherein the adaptation means alters the reference function that corresponds to the identity of each sample pattern by adding a function of the sample pattern to the reference function when the corresponding measuring means provides an indication.

44. The system described in claim 29, wherein the adaptation means alters the reference functions that do not correspond to the identity of each sample pattern by subtracting a function of the sample pattern from the reference functions that correspond to measuring means that provide indications.

45. The system described in claim 29, wherein the adaptation means alters the reference function that corresponds to the identity of each sample pattern by adding the generated function of the sample pattern to the reference function when the corresponding measuring means provides an indication and alters the reference functions that do not correspond to the identity of each sample pattern by subtracting the generated function of the sample pattern from the reference functions that correspond to measuring means that provide indications.

46. The system described in claim 29, wherein the adaptation means alters the reference function that corresponds to the identity of each sample pattern by adding the generated function of the sample pattern to the reference function when the corresponding measuring means provides an indication.

47. The system described in claim 29, wherein the adaptation means alters the reference functions that do not correspond to the identity of each sample pattern by subtracting the generated function of the sample pattern from the reference functions that correspond to measuring means that provide indications.

48. The system described in claim 29, wherein the measuring means corresponding to the reference function which is similar to the sample pattern compares the corresponding indication of the degree of similarity between the sample pattern and the reference function to a first threshold and provides an indication when the threshold is not exceeded which is indicative of insufficient similarity, and wherein each measuring means corresponding to the reference functions which are dissimilar to the sample pattern compares the corresponding indication of the degree of similarity between the sample pattern and the reference functions to a second threshold and provides an indication when the threshold is exceeded which is indicative of insufficient dissimilarity.

49. An adaptive recognition system for identifying specimens based on their similarity to members of a set of reference patterns comprising, in combination:

means for generating nonrandom functions of the specimens;

means for linearly comparing the generated functions with reference functions to provide an indication of the reference pattern that is the most similar to the specimen, for each specimen;

and selectively-controllable means responsive to the comparison means for altering the reference functions during a training mode of operation to improve the comparison between the generated functions and a corresponding reference function that is most similar, and to lessen the comparison between the generated functions and at least one other noncorresponding reference function.

50. The system described in claim 49, wherein the functions of the specimens are functions of autocorrelation functions.

51. The system described in claim 49, wherein the functions of the specimens are autocorrelation functions.

52. The system described in claim 49, wherein the means for altering the reference functions during the training mode linearly combines a function of the specimen with at least one reference function.

53. The system described in claim 49, wherein the means for altering the reference functions during the training mode linearly combines the nonrandom functions of the specimen with at least one reference function.

54. The system described in claim 50, wherein the means for altering the reference functions during the training mode linearly combines a function of the specimen with at least one reference function.

55. The system described in claim 50, wherein the means for altering the reference functions during the training mode linearly combines the nonrandom function of the specimen with at least one reference function.

56. The system described in claim 52, wherein the functions are linearly combined by the process of addition.

57. The system described in claim 52, wherein the functions are linearly combined by the process of subtraction.

58. The system described in claim 53, wherein the functions are linearly combined by the process of addition.

59. The system described in claim 53, wherein the functions are linearly combined by the process of subtraction.

60. The system described in claim 54, wherein the functions are linearly combined by the process of addition.

61. The system described in claim 54, wherein the functions are linearly combined by the process of subtraction.

62. The system described in claim 55, wherein the functions are linearly combined by the process of addition.

63. The system described in claim 55, wherein the functions are linearly combined by the process of subtraction.

64. The system described in claim 52, wherein a function of the specimen is linearly combined with only those reference functions which, upon comparison, provide output signals from the comparing means which have predetermined values.

65. The system described in claim 53, wherein the function of the specimen is linearly combined with only those reference functions which, upon comparison, provide output signals from the comparing means which have predetermined values.

66. An adaptive recognition system for identifying specimens based on their similarity to reference functions, where each member of a set of reference patterns corresponds to a unique combination of reference functions comprising, in combination:

means for generating nonrandom functions of the specimens;

means for linearly comparing the generated functions with reference functions to provide indications of the similarity of the functions of the specimens to the reference functions;

and selectively-controllable means responsive to the similarity indications from the comparison means for altering the reference functions during a training mode of operation to improve the comparison between the generated functions and a corresponding reference function that is most similar, and to lessen the comparison between the generated functions and at least one other non-corresponding reference function and for providing an indication of identity of the specimens during an operating mode of operation.

67. The system described in claim 66, wherein the functions of the specimens are functions of autocorrelation functions.

68. The system described in claim 66, wherein the functions of the specimens are autocorrelation functions.

69. The system described in claim 66, wherein the means for altering the reference functions during the training mode linearly combines a function of the specimen with at least one reference function.

70. The system described in claim 66, wherein the means for altering the reference functions during the training mode linearly combines the nonrandom function of the specimen with at least one reference function.

71. The system described in claim 69, wherein a function of the specimen is linearly combined with only those reference functions which, upon comparison, provide indications from the comparing means which have predetermined values.

72. The system described in claim 70, wherein the function of the specimen is linearly combined with only those reference functions which, upon comparison, provide indications from the comparing means which have predetermined values.

73. The system described in claim 66, wherein the means for altering the reference functions during the training mode adds a function of the specimen to those reference functions within the combination of reference functions which correspond to the identity of the specimen when the comparison indications have predetermined values.

74. The system described in claim 66, wherein the means for altering the reference functions during the training mode adds a function of the specimen to those reference functions within the combination of reference functions which correspond to the identity of the specimen when the comparison indications are below a predetermined threshold.

75. The system described in claim 66, wherein the means for altering the reference functions during the training mode subtracts a function of the specimens to those reference functions within the combination of reference functions which correspond to the identity of the specimen when the comparison indications have predetermined values.

76. The system described in claim 66, wherein the means for altering the reference functions during the training mode subtracts a function of the specimen to those reference functions within the combination of reference functions which correspond to the identity of the specimen when the comparison indications are above a predetermined threshold.

77. The system described in claim 66, wherein the functions of the specimens are functions of autocorrelation functions.

78. The system described in claim 77, wherein the means for altering the reference functions during the training mode adds a function of the specimen to those reference functions within the combination of reference functions which correpond to the identity of the specimen when the comparison indications have predetermined values.

79. The system described in claim 77, wherein the means for altering the reference functions during the training mode adds a function of the specimen to those reference functions within the combination of reference functions which correspond to the identity of the specimen when the comparison indications are below a predetermined threshold.

80. The system described in claim 77, wherein the means for altering the reference functions during the training mode substracts a function of the specimen to those reference functions within the combination of reference functions which correspond to the identity of the specimen when the comparison indications have predetermined values.

81. The system described in claim 77, wherein the means for altering the reference functions during the training mode substracts a function of the specimen to those reference functions within the combination of reference functions which correspond to the identity of the specimen when the comparison indications are above a predetermined threshold.

82. The system described in claim 1, wherein the means for altering the reference functions during the training mode adds a function of the specimen to the corresponding reference function only when the comparison to this reference function provides an output signal from the comparing means that is within a predetermined range of values.

83. The system described in claim 1, wherein the means for altering the reference functions during the training mode substracts a function of the specimen from only those noncorresponding reference functions which, upon comparison, provide output signals from the comparing means that are within a predetermined range of values.

84. The system described in claim 2, wherein the means for altering the reference functions during the training mode adds a function of the specimen to the corresponding reference function only when the comparison to this reference function provides an output signal from the comparing means that is within a predetermined range of values.

85. The system described in claim 2, wherein the means for altering the reference functions during the training mode substracts a function of the specimen from only those noncorresponding reference functions, which upon comparison, provide output signals from the comparing means that are within a predetermined range of values.

86. An adaptive recognition system for identifying specimens based on their similarity to reference functions, where each member of a set of reference patterns corresponds to a unique combination of reference functions comprising, in combination:

means for generating nonrandom functions of input patterns, means for linearly comparing the generated functions of the input patterns with the adaptively-stored reference functions to provide indications of the degree of similarity between the nonrandom function of each input pattern and each reference function;

a plurality of measuring means that are operative in a training mode of operation, one for each reference function, each responsive to the corresponding similarity indications from the comparing means as sample reference patterns are applied as input patterns, and each for providing an indication when the reference function is within the combination of reference functions which corresponds to the sample pattern and is not sufficiently similar to the nonrandom function of the sample pattern, and for providing and indication when the reference function is not within the combination of reference functions which corresponds to the sample pattern and is not sufficiently dissimilar to the nonrandom function of the sample pattern;

reference function adaptation means that is operative in the training mode of operation and responsive to the indications of the measuring means for altering those reference functions corresponding to the measuring means that provide indications to improve the comparison of said reference function which is not sufficiently similar, and to lessen the comparison of said reference function which is not sufficiently dissimilar;

and system output means that is operative in an operating mode of operation and responsive to the indications from the comparing means as specimen patterns are applied as input patterns, for providing indications of the identities of the applied specimen patterns.

87. The system described in claim 86, wherein the functions of the specimens are functions of autocorrelation functions.

88. The system described in claim 86, wherein the adaptation means alters the reference functions by linearly combining them with a function of the sample patterns.

89. The system described in claim 86, wherein the adaptation means alters the reference functions by linearly combining them with the nonrandom function of the sample patterns.

90. The system described in claim 87, wherein the adaptation means alters the reference functions by linearly combining them with a function of the sample patterns.

91. The system described in claim 87, wherein the adaptation means alters the reference functions by linearly combining them with the nonrandom function of the sample patterns.

92. The system described in claim 86, wherein the adaptation means alters the reference function that corresponds to the identity of each sample pattern to the reference function when the corresponding measuring means provides an indication and alters the reference functions that do not correspond to the identity of each sample pattern by subtracting a function of the sample pattern from the reference functions that correspond to measuring means that provide indications.

93. The system described in claim 86, wherein the adaptation means alters the reference function that corresponds to the identity of each sample pattern by adding a function of the sample pattern to the reference function when the corresponding measuring means provides an indication.

94. The system described in claim 86, wherein the adaptation means alters the reference functions that do not correspond to the identity of each sample pattern by subtracting a function of the sample pattern from the reference functions that corresponds to measuring means that provide indications.

95. The system described in claim 87, wherein the adaptation means alters the reference function that corresponds to the identity of each sample pattern by adding a function of the sample pattern to the reference function when the corresponding measuring means provides an indication and alters the reference functions that do not correspond to the identity of each sample pattern by subtracting a function of the sample pattern from the reference functions that correspond to measuring means that provide indications.

96. The system described in claim 87, wherein the adaptation means alters the reference function that corresponds to the identity of each sample pattern by adding a function of the sample pattern to the reference function when the corresponding measuring means provides an indication.

97. The system described in claim 87, wherein the adaptation means alters the reference functions that do not correspond to the identity of each sample pattern by subtracting a function of the sample pattern from the reference functions that corresponds to measuring means that provide indications.

98. The system described in claim 86, wherein the adaptation means alters the reference functions that corresponds to the identity of each sample pattern by adding the nonrandom function of the sample pattern to the reference function when the corresponding measuring means provides an indication and alters the reference functions that do not correspond to the identity of each sample pattern by subtracting the nonrandom function of the sample pattern from the reference functions that corresponds to measuring means that provide indications.

99. The system described in claim 86, wherein the adaptation means alters the reference function that corresponds to the identity of each sample pattern by adding the nonrandom function of the sample pattern to the reference function when the corresponding measuring means provides an indication.

100. The system described in claim 86, wherein the adaptation means alters the reference functions that do not correspond to the identity of each sample pattern by subtracting the nonrandom function of the sample pattern from the reference functions that correspond to measuring means that provide indications.

101. The system described in claim 87, wherein the adaptation means alters the reference function that corresponds to the identity of each sample pattern by adding the generated function of the sample pattern to the reference function when the corresponding measuring means provides an indication and alters the reference functions that do not correspond to the identity of each sample pattern by subtracting the generated function of the sample pattern from the reference functions that correspond to measuring means that provide indications.

102. The system described in claim 87, wherein the adaptation means alters the reference function that corresponds to the identity of each sample pattern by adding the generated function of the sample pattern to the reference function when the corresponding measuring means provides an indication.

103. The system described in claim 87, wherein the adaptation means alters the reference functions that do not correspond to the identity of each sample pattern by subtracting the generated function of the sample pattern from the reference functions that correspond to measuring means that provide indications.

104. The system described in claim 86, wherein the system output means comprises a decoder for converting the combination of indications from the comparing means into indications of the identities of the specimen patterns.

105. The apparatus described in claim 1, wherein each nonrandom function contains at least one common value.

106. The apparatus described in claim 28, wherein each nonrandom function contains at least one common value.

107. The apparatus described in claim 49, wherein each nonrandom function contains at least one common value.

108. The apparatus described in claim 66, wherein each nonrandom function contains at least one common value.

109. The apparatus described in claim 86, wherein each nonrandom function contains at least one common value.

110. The apparatus described in claim 1, wherein the output of the comparison means includes, in addition to the results of the comparisons of the nonrandom functions of the specimens and the reference functions, a value that is independent of the specimens and that is alterable during the training mode of operation.

111. The apparatus described in claim 28, wherein the output of the comparison means includes, in addition to the results of the comparisons of the nonrandom functions of the specimens and the reference functions, a value that is independent of the specimens and that is alterable during the training mode of operation.

112. The apparatus described in claim 49, wherein the output of the comparison means includes, in addition to the results of the comparisons of the nonrandom functions of the specimens and the reference functions, a value that is independent of the specimens and that is alterable during the training mode of operation.

113. The apparatus described in claim 66, wherein the output of the comparison means includes, in addition to the results of the comparisons of the nonrandom functions of the specimens and the reference functions, a value that is independent of the specimens and that is alterable during the training mode of operation.

114. The apparatus described in claim 86, wherein the output of the comparison means includes, in addition to the results of the comparisons of the nonrandom functions of the specimens and the reference functions, a value that is independent of the specimens and that is alterable during the training mode of operation.

References Cited by the Examiner

UNITED STATES PATENTS

| | | | |
|---|---|---|---|
| 3,074,050 | 1/1963 | Shultz | 340—146.3 |
| 3,103,648 | 9/1963 | Hartmanis | 340—172.5 |
| 3,106,699 | 10/1963 | Kamentsky | 340—172.5 |
| 3,114,884 | 12/1963 | Jakowatz | 340—172.5 |

OTHER REFERENCES

"Computer Simulation of a Perceptual Learning Model for Sensory Pattern Recognition, Concept Formation, and Symbol Transformation," by Charles Vossler, and Leonard Uhr, August 1962.

"Variable-Network Perceptron Almost Completed at GD/E" Electronic Design, pages 38–39, Sept. 13, 1961.

DARYL W. COOK, *Acting Primary Examiner.*

MALCOLM A. MORRISON, *Examiner.*

J. E. SMITH, *Assistant Examiner.*